United States Patent
Komori et al.

(10) Patent No.: US 7,451,595 B2
(45) Date of Patent: Nov. 18, 2008

(54) DRIVE DEVICE

(75) Inventors: Noriyuki Komori, Tokyo (JP); Ichihiro Abe, Tokyo (JP); Hiroyuki Miyake, Tokyo (JP); Hideki Kunishio, Tokyo (JP); Yuji Tadano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 472 days.

(21) Appl. No.: 10/554,498

(22) PCT Filed: Apr. 30, 2004

(86) PCT No.: PCT/JP2004/006319

§ 371 (c)(1),
(2), (4) Date: Oct. 26, 2005

(87) PCT Pub. No.: WO2004/099611

PCT Pub. Date: Nov. 18, 2004

(65) Prior Publication Data

US 2006/0207250 A1   Sep. 21, 2006

(30) Foreign Application Priority Data

May 12, 2003 (JP) ............................. 2003-132506
Sep. 9, 2003 (JP) ............................. 2003-316444

(51) Int. Cl.
*F01B 29/10* (2006.01)
(52) U.S. Cl. .......................................... 60/527; 60/528
(58) Field of Classification Search ............ 60/527–529
See application file for complete search history.

(56) References Cited

U.S. PATENT DOCUMENTS 4,055,955 A * 11/1977 Johnson ....................... 60/527
4,275,561 A * 6/1981 Wang .......................... 60/527
4,551,975 A   11/1985 Yamamoto et al.
4,761,955 A * 8/1988 Bloch .......................... 60/528
4,965,545 A * 10/1990 Johnson ....................... 337/140

(Continued)

FOREIGN PATENT DOCUMENTS

JP     61-85079 A    4/1986

(Continued)

OTHER PUBLICATIONS

Microfilm of the specification and drawings annexed to the request of Japanese Utility Model Application No. 96594/1985 (Laid-open No. 6481/1987) (NKK Corp.), Jan. 16, 1987.

*Primary Examiner*—Hoang M Nguyen
(74) *Attorney, Agent, or Firm*—Birch, Stewart, Kolasch & Birch, LLP

(57) ABSTRACT

The driving device includes a bendable shape memory alloy member, a resilient member for applying a tension to the shape memory alloy member in a longitudinal direction thereof, a bending member for bending the shape memory alloy member, and a movable body moved by a displacement of the shape memory alloy member. The bending member contacts the shape memory alloy member, so that the tension is applied to the shape memory alloy member in the longitudinal direction thereof. Compared with the driving device in which the shape memory alloy member is linearly disposed, the decrease in the amount of displacement can be suppressed, so that a space efficiency can be enhanced and the downsizing of the driving device can be accomplished.

17 Claims, 43 Drawing Sheets

U.S. PATENT DOCUMENTS

| | | | |
|---|---|---|---|
| 5,396,769 A * | 3/1995 | Brudnicki | 60/528 |
| 5,685,148 A | 11/1997 | Robert | |
| 6,242,841 B1 * | 6/2001 | Williams | 310/306 |
| 6,247,678 B1 | 6/2001 | Hines et al. | |
| 6,449,434 B1 | 9/2002 | Fuss | |

FOREIGN PATENT DOCUMENTS

| | | |
|---|---|---|
| JP | 62-6481 U | 1/1987 |
| JP | 63243256 A | 10/1988 |
| JP | 5-224136 A | 9/1993 |
| JP | 8-77674 A | 3/1996 |
| JP | 8-226376 A | 9/1996 |
| JP | 10-123585 A | 5/1998 |
| JP | 10-148174 A | 6/1998 |
| JP | 2000-310181 A | 11/2000 |
| JP | 2002-130114 A | 5/2002 |
| JP | 2002-244015 A | 8/2002 |

* cited by examiner

FIG.17(a)
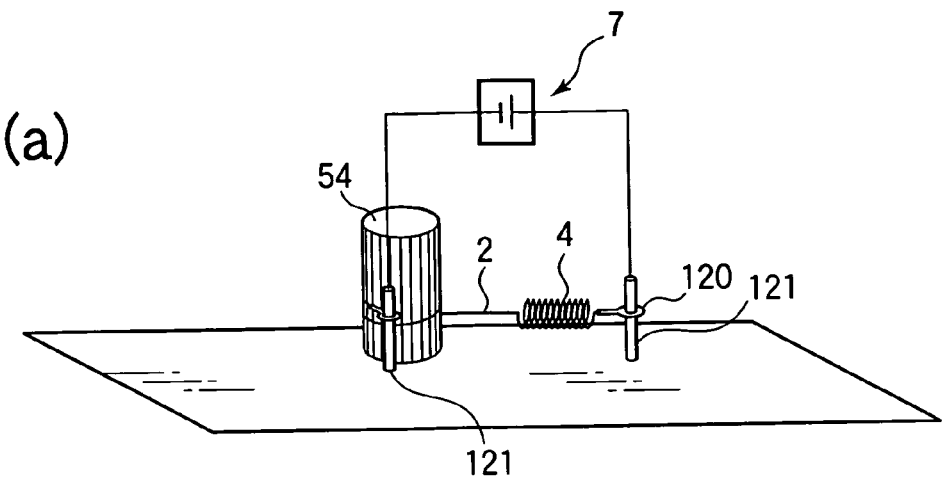
FIG.17(b)
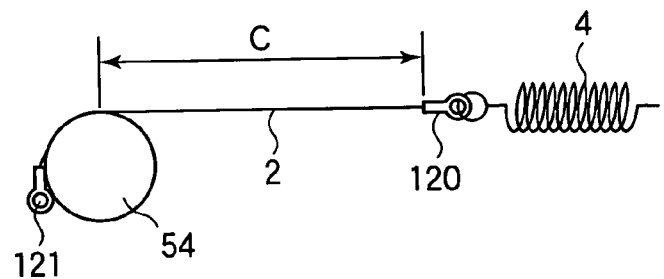
FIG.18(a)
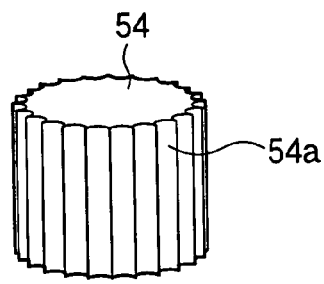
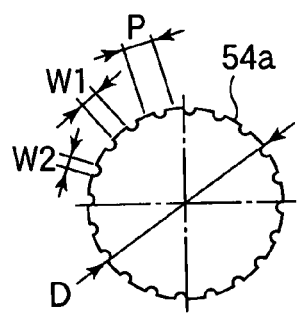
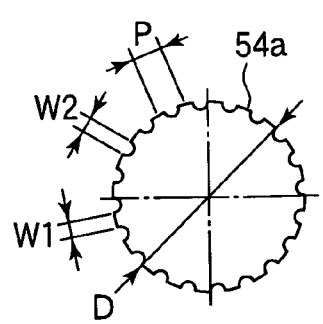
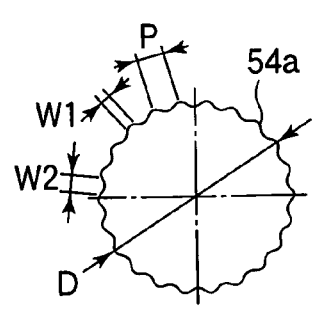
FIG.18(b)     FIG.18(c)     FIG.18(d)

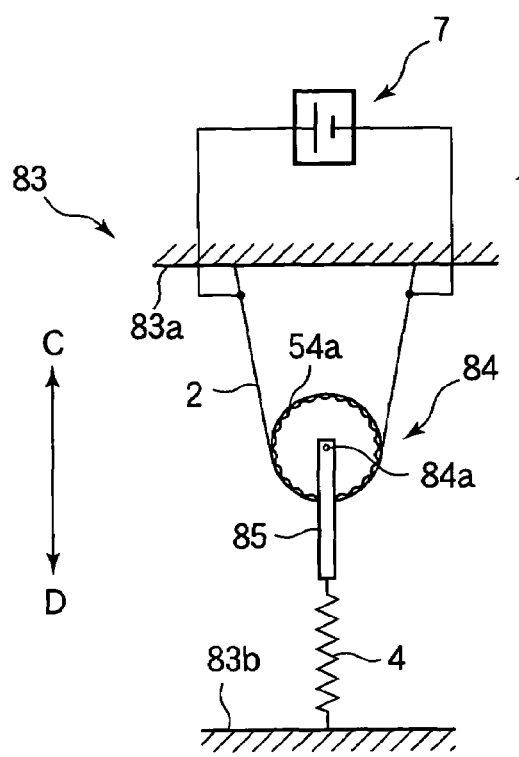
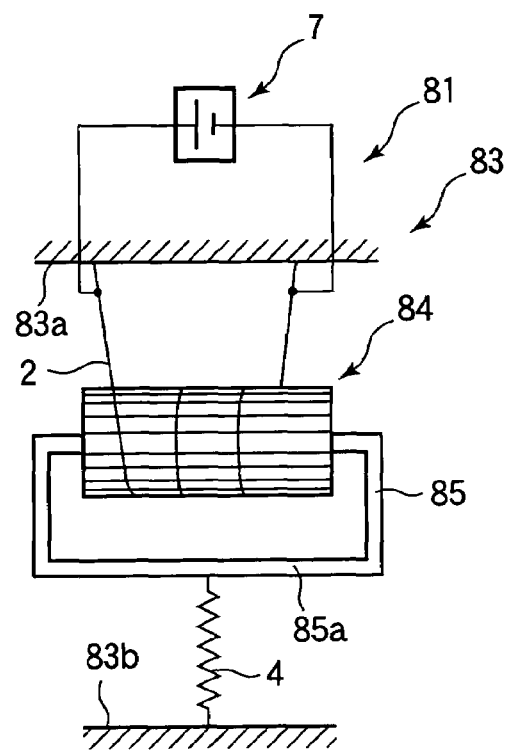

DRIVE DEVICE

TECHNICAL FIELD

This invention relates to a driving device, and particularly relates to a driving device that utilizes the characteristics of a shape memory alloy to generate a driving force.

BACKGROUND ART

Conventionally, there is known a driving device using a shape memory alloy in the form of a wire, as disclosed in, for example, Japanese Laid-Open Patent Publication Nos. 2000-310181 (see Page 2, FIG. 11) and HEI 5-224136 (see Page 3, FIG. 3). Such a driving device utilizes the characteristics of the shape memory alloy member that changes to a memorized shape when the shape memory alloy member is heated to a temperature higher than a transformation temperature, and returns to its original shape when the shape memory alloy member is cooled to a temperature lower than the transformation temperature. The amount of displacement of the shape memory alloy member is several percents of the entire length of the shape memory alloy member, and therefore it is necessary to increase the entire length of the shape memory alloy member in order to obtain the sufficient output (the amount of displacement) of the driving device. However, if the shape memory alloy member is linearly disposed, it is necessary to provide a large space.

Therefore, a driving device is recently proposed, in which the shape memory alloy member is wound around a winding member so that the shape memory alloy member whose entire length is long can be disposed in a small space. Such a driving device is disclosed in, for example, Japanese Laid-Open Patent Publication Nos. 2000-31018 (see Page 6, FIG. 1), HEI 8-226376 (see Pages 3-5, FIG. 1), HEI 10-148174 (see Pages 2-3, FIG. 1), and HEI 8-77674 (see Page 5, FIG. 5).

However, if the shape memory alloy member is wound around the winding member as disclosed in these publications, the amount of displacement of the shape memory alloy member decreases, compared with the case in which the shape memory alloy member is linearly disposed.

DISCLOSURE OF INVENTION

The present invention is intended to solve the above described problems, and an object of the present invention is to provide a driving device capable of suppressing the decrease in the amount of displacement compared with a driving device in which a shape memory alloy member is linearly disposed, and capable of being disposed in small space (i.e., capable of enhancing a space efficiency).

A driving device according to the present invention includes a bendable shape memory alloy member, an urging means that applies a tension to the shape memory alloy member in a longitudinal direction thereof, a bending means which bends the shape memory alloy member and has a plurality of contact portions contacting the shape memory alloy member, the contact portions being disposed along a closed path, wherein the contact. portions contact the shape memory alloy member so that the tension is applied to the shape memory alloy member in the longitudinal direction thereof.

According to the present invention, it becomes possible to suppress the decrease in the amount of displacement of a shape memory alloy member, and capable of enhancing a space efficiency so as to accomplish the downsizing of the driving device.

BRIEF DESCRIPTION OF DRAWINGS

FIG. 17($a$) is a perspective view for illustrating an experiment on the driving device according to Embodiment 6 of the present invention, with the winding angle of the shape memory alloy member being further varied, and FIG. 17($b$) is a plan view thereof;

FIG. 18($a$) is a perspective view for illustrating the shape of a bending member according to Embodiment 6 of the present invention, and FIGS. 18($b$), 18($c$) and 18($d$) are plan views showing concrete shapes of the bending member;

FIG. 24(a) is a perspective view showing a driving device according to Embodiment 9 of the present invention, and FIG. 24(b) is a side view thereof;

BEST MODE FOR CARRYING OUT THE INVENTION

Embodiment 1

Figure 1:
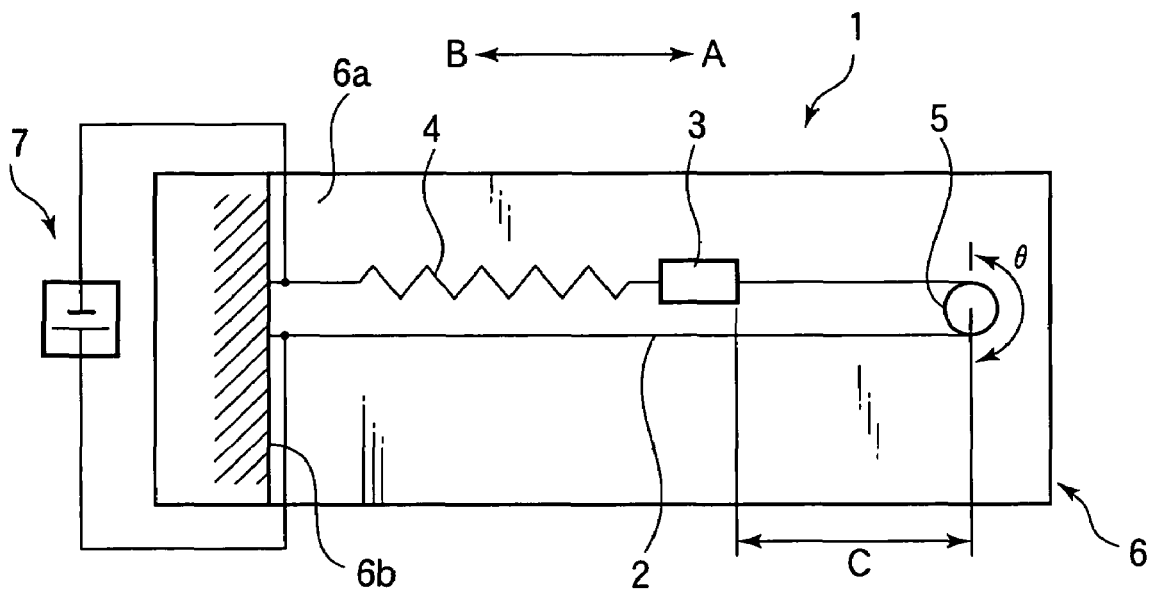
FIG. 1 is a plan view showing a driving device according to Embodiment 1 of the present invention.
Figure 2:
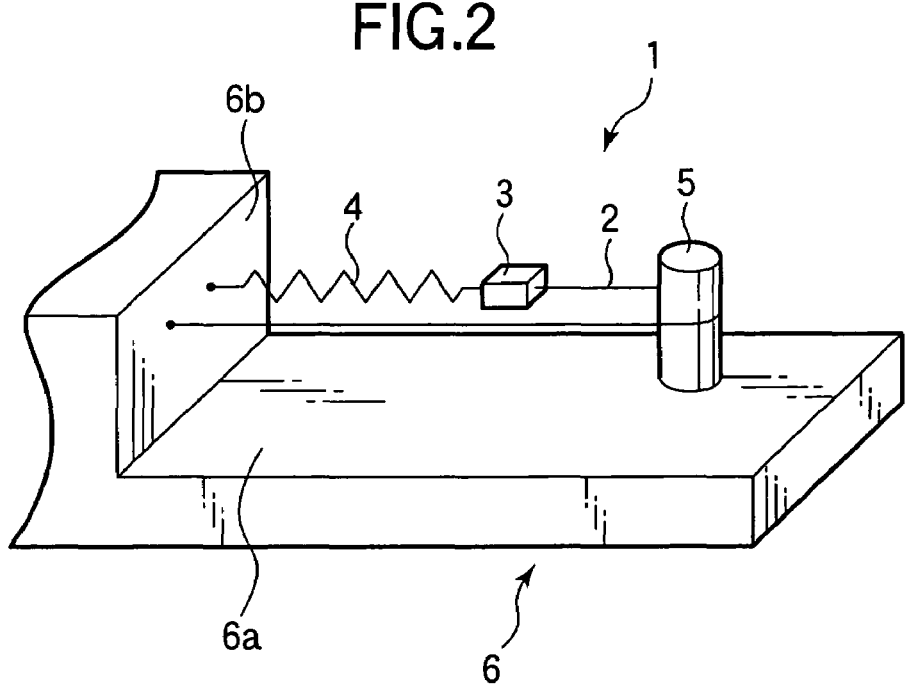
FIG. 2 is a perspective view showing the driving device according to Embodiment 1 of the present invention.

FIGS. 1 and 2 are a plan view and a perspective view showing a driving device 1 according to Embodiment 1 of the present invention. As shown in FIGS. 1 and 2, a base 6 of the driving device 1 has a placing surface 6a and a wall surface 6b perpendicular to the placing surface 6a. On the placing surface 6a, a pin-shaped bending member 5 is planted on a position distanced from the wall surface 6b. A shape memory alloy member 2 is wound around the circumferential surface of the bending member 5 at a winding angle θ of 180 degrees, with one end (fixed end) being fixed to a wall surface 6b, with the other end (movable end) being fixed to a side of a movable body 3. The expression that the winding angle is 180 degrees means that the shape memory alloy member 2 contacts the bending member 5 and is bent at 180 degrees. An end of a resilient member 4 made of a tension coil spring is fixed to the wall surface 6b, and the other end of the resilient member 4 is fixed to the other side (the side opposite to the side fixed to the shape memory alloy member 2) of the movable body 3 in such a manner that the resilient member 4 is slightly stretched to cause a predetermined tension.

In the driving device 1, an energizing circuit 7 causes a direct current to flow between the fixed end of the shape memory alloy 2 and the fixed end (the end fixed to the wall surface 6b) of the resilient member 4, so as to heat the shape memory alloy member 2 by means of heat (Joule heat) caused by the electric resistance of the shape memory alloy member 2. For this purpose, a conducting material is used for the resilient member 4 and the movable body 3. However, the method for heating the shape memory alloy member 2 is not limited to this method. It is possible that the movable body 3 contacts the placing surface 6a. In such a case, the friction generated between the movable body 3 and the placing surface 6a when the movable body 3 moves is negligible compared to the tension applied to the shape memory alloy member 2.

The bending member 5 constitutes a bending means that bends the shape memory alloy member 2. A portion of the circumferential surface of the bending member 5 contacting the shape memory alloy member 2 constitutes a contact portion of the bending means contacting the shape memory alloy member 2. The base 6 constitutes a holding means that holds the bending member 5.

In the above constructed driving device 1, when the energizing circuit 7 causes a predetermined direct current (for example, 100 mA) to flows through the shape memory alloy member 2, the shape memory alloy member 2 is heated and contracted, so that the movable body 3 moves in the direction of an arrow A resisting the urging force of the resilient member 4. When the energization of the shape memory alloy member 2 is stopped, the temperature of the shape memory alloy member 2 decreases and the shape memory alloy member 2 is expanded to its original length, so that the movable body 3 moves in the direction of an arrow B by the urging force of the resilient member 4.

Figure 3:
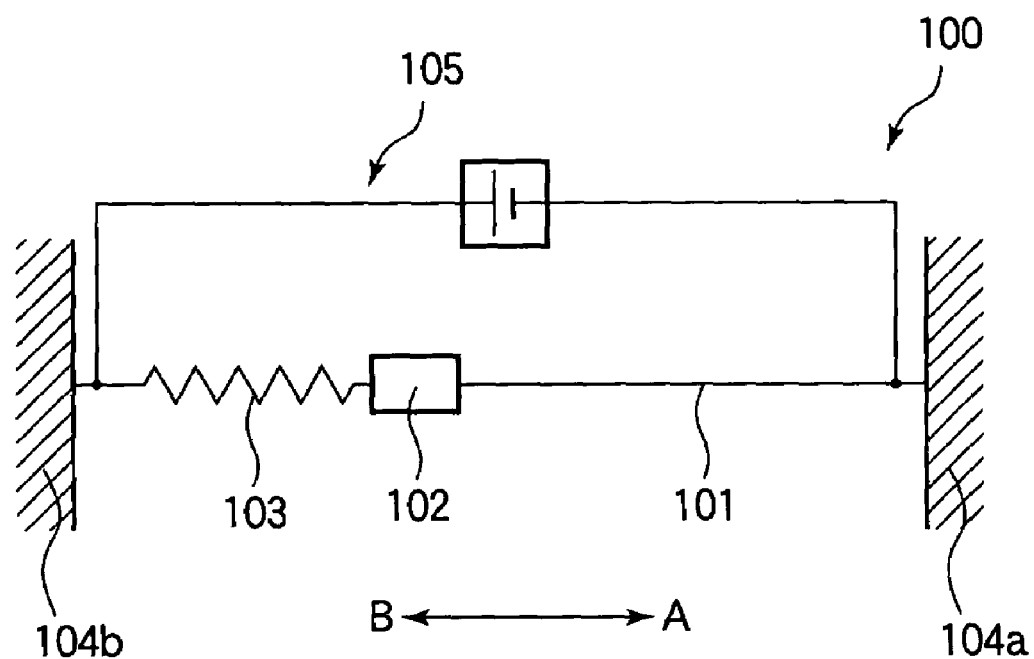
FIG. 3 is a perspective view showing a driving device according to a comparative example with respect to Embodiment 1 of the present invention.

FIG. 3 is a plan view showing a driving device according to a comparative example with respect to this embodiment, i.e., a driving device 100 in which a shape memory alloy member 101 is linearly disposed. An end of the shape memory alloy member 101 is fixed to a fixed wall 104a, and the other end is fixed to a side (a right side in FIG. 3) of a movable body 102. The other side (a left side in FIG. 3) of the movable body 102 is fixed to an end of a resilient member 103. The other end of the resilient member 103 is fixed to another fixed wall 104b. Due to the urging force of the resilient member 103, a tension is applied to the shape memory alloy member 101 in the longitudinal direction thereof, so that the shape memory alloy member 101 is linearly disposed without slackening. The heating of the shape memory alloy member 101 is carried out by the energization of an energizing circuit 105. When the shape memory alloy member 101 is energized by the energizing circuit 105, the shape memory alloy member 101 is contracted, so that the movable body 102 moves in a direction shown by an arrow A. When the energization of the shape memory alloy member 101 is stopped, the movable body 102 moves in a direction. shown by an arrow B. However, in the driving device 100, since the shape memory alloy member 101 is linearly disposed, it is difficult to reduce the dimension of the device in the longitudinal direction of the shape memory alloy member 101.

Figure 4:
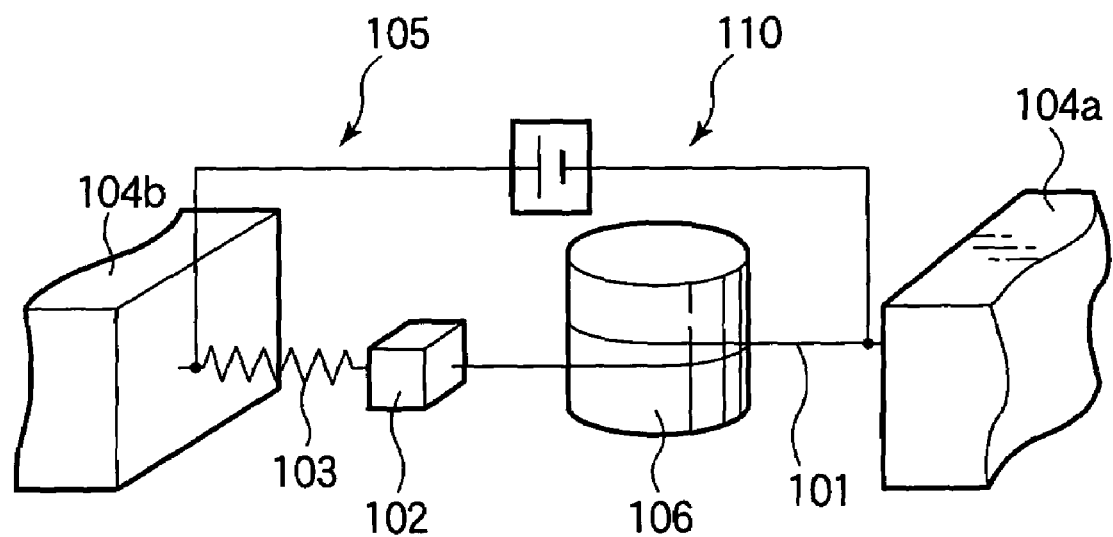
FIG. 4 is a perspective view showing a driving device according to another comparative example with respect to Embodiment 1 of the present invention.

FIG. 4 is a view showing another comparative example with respect to the embodiment, i.e., a driving device 110 in which a shape memory alloy member 101 is wound around a cylindrical winding member 106 having a large diameter (for example, a diameter of 10 mm) at about 360 degrees. By winding the shape memory alloy member 101 around the winding member 106 at about 360 degrees, the shape memory alloy member 101 whose entire length is long can be disposed in a small space (i.e., the space efficiency can be enhanced). However, the amount of displacement of the movable body 102 becomes smaller compared with the driving device 100 shown in FIG. 3.

Figure 5:
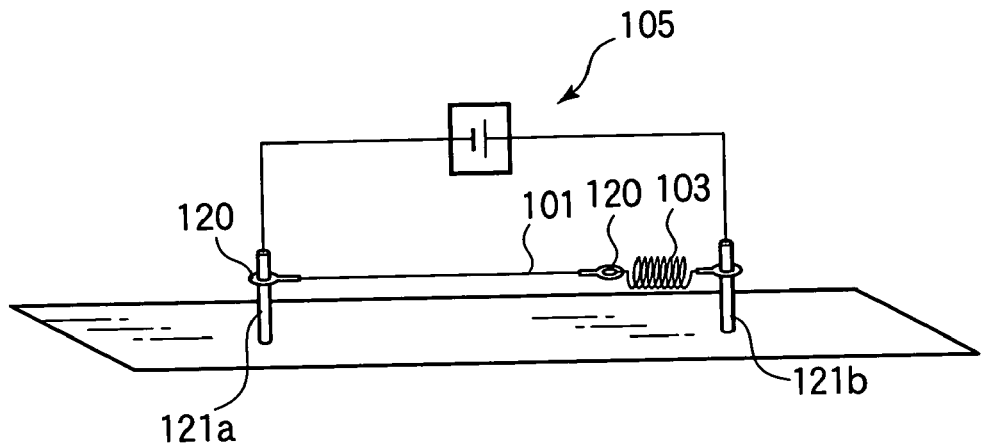
FIG. 5 is a perspective view for illustrating an experiment regarding the driving device shown in FIG. 3.

An experimental result on the driving devices 100 and 110 according to the comparative examples will be described. FIG. 5 shows an experimental method in the case where a shape memory alloy member 101 is linearly disposed (corresponding to the driving device 100 of FIG. 3). Crimp contacts 120 are fixed to both ends of the shape memory alloy member 101 in the form of a wire having a diameter of 60 μm and a length of 50 mm. One of the crimp contacts 120 is fixed to a fixing pin 121a, and the other of the crimp contacts 120 is fixed to an end of a resilient member 103. The other end of the resilient member 103 is fixed to another fixing pin 121b. The amount of displacement of the movable body 102 (FIG. 3) is evaluated by measuring the amount of displacement of the crimp contact 120 connecting the shape memory alloy member 101 and the resilient member 103. The resilient member 103 (tension coil spring) is expanded by 1 mm in a state where the shape memory alloy member 101 is not energized. A resilient member 103 causes the tension of about $49 \times 10^{-3}$ N when the resilient member 103 is expanded by 1 mm, and causes the tension of about $98 \times 10^{-3}$ N when the resilient member 103 is further expanded by 1 mm (i.e., when the shape memory alloy member 2 is contracted by 1 mm).

Figure 6A:
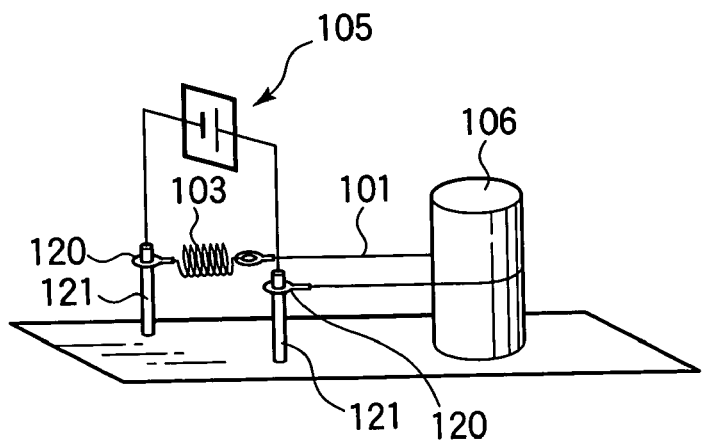
FIG. 6($a$) is a perspective view for illustrating an experiment on the driving device shown in FIG. 4, and FIG. 6($b$) is a plan view thereof.
Figure 7A:
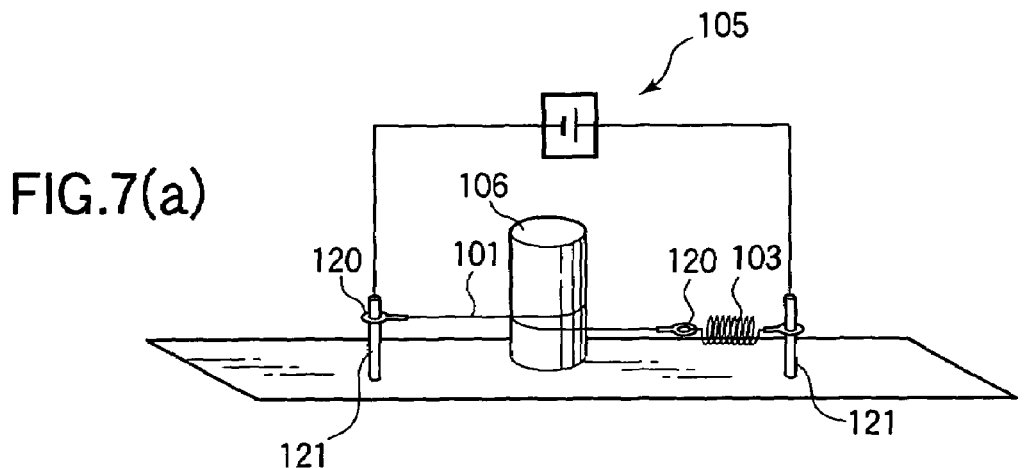
FIG. 7($a$) is a perspective view for illustrating an experiment on the driving device shown in FIG. 4 with a winding pattern of a shape memory alloy member being varied, and FIG. 7($b$) is a plan view thereof.
Figure 8A:
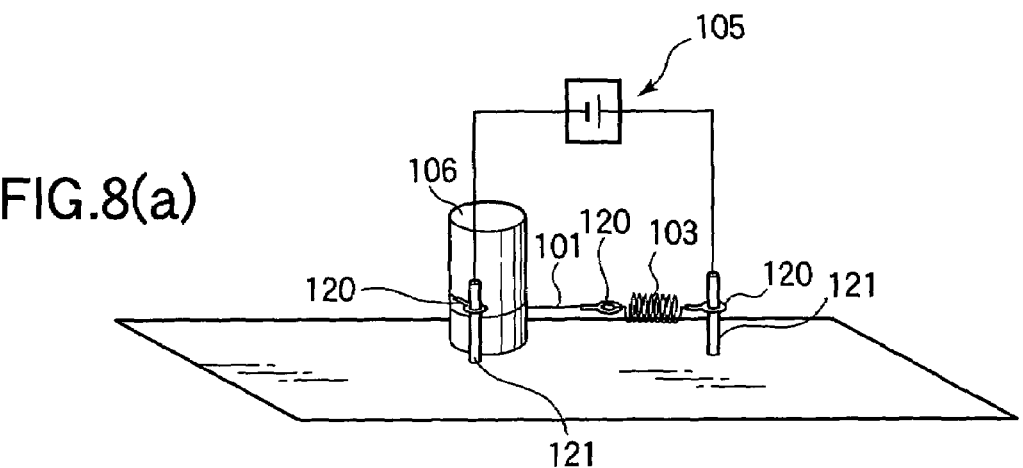
FIG. 8($a$) is a perspective view for illustrating an experiment on the driving device shown in FIG. 4 with the winding pattern of the shape memory alloy member being varied, and FIG. 8($b$) is a plan view thereof.

Moreover, as shown in FIGS. 6(a) and (b), the same experiment is carried out in such a manner that the shape memory alloy member 101 in the form of a wire is wound around a cylindrical winding member 106 having a diameter of 10 mm at about 180 degrees. The winding member 106 is made of POM (polyoxymethylene) or ABS (Acrylonitrile-Butadiene-Styrene resin). The length C of the shape memory alloy member 101 from the winding member 106 to each crimp contact 120 is set to be 17.1 mm. Further, as shown in FIGS. 7(a) and (b), the same experiment is carried out in such a manner that the shape memory alloy member 101 is wound around the winding member 106 at 360 degrees. The lengths C1 and C2 of the shape memory alloy member 101 from the winding member 106 to the respective crimp contacts 120 are set to be 9.3 mm. Furthermore, as shown in FIGS. 8(a) and (b), the same experiment is carried out in such a manner that the shape memory alloy member 101 is wound around the winding member 106 at 450 degrees. The length C of the shape memory alloy member 101 from the winding member 106 to each crimp contact 120 is set to be 11 mm.

Figure 6B:
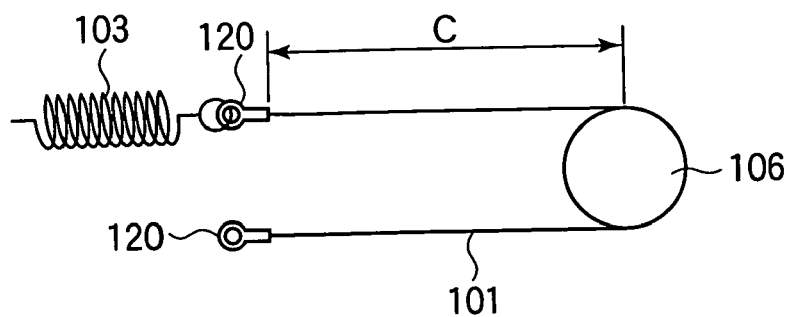
Figure 7B:
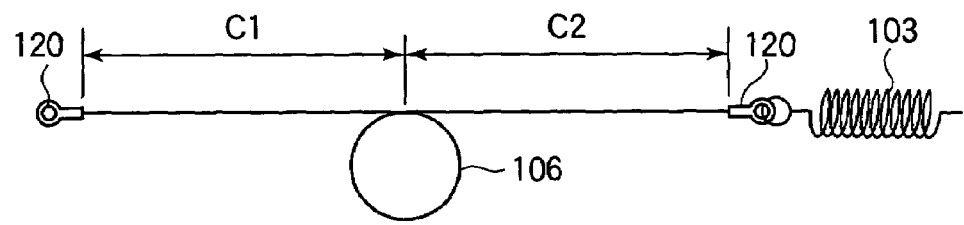
Figure 8B:
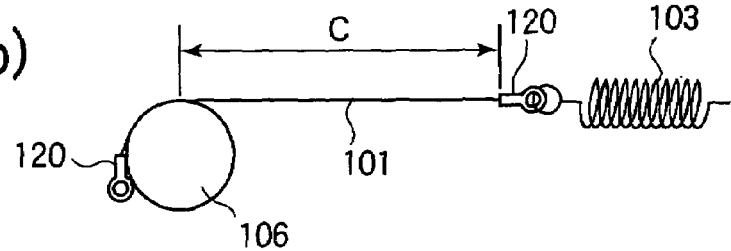

As a result of the experiment, when the shape memory alloy member 101 is linearly disposed as shown in FIG. 5, the amount of displacement of the end of the shape memory alloy member 101 is 1.6 mm. In contrast, in the experiment in which the shape memory alloy member 101 is wound around the winding member 106 having a diameter of 10 mm at about 180 degrees as shown in FIG. 6, the amount of displacement is about 1.0 mm in each of cases where POM and ABS are used. Moreover, in the experiment in which the shape memory alloy member 101 is wound at about 360 degrees as shown in FIG. 7, the amount of displacement is 0.5 mm (when the winding member 106 is POM) and 1.0 mm (when the winding member 106 is ABS). Moreover, in the experiment in which the shape memory alloy member 101 is wound at about 450 degrees as shown in FIG. 8, the amount of displacement is 0.3 mm (when the winding member 106 is POM) and 0.6 mm (when the winding member 106 is ABS). That is, it is understood that the amount of displacement of the shape memory alloy member 101 decreases to about 35% (POM) and about 61% (ABS) when the winding angle is 360 degrees, and decreases to about 20% (POM) and about 36% (ABS) when the winding angle is 450 degrees, compared with the case in which the shape memory alloy member 101 is linearly disposed (FIG. 5).

Next, the result of the same experiment on the driving device 1 according to the embodiment (FIGS. 1 and 2) will be described. The experiment is carried out in the same method as that shown in FIG. 5. The bending member 5 is a pin-shaped member made of metal having a diameter of 1 mm. The shape memory alloy member 2 is formed in the form of a wire having a diameter of about 60 μm and the length of 50 mm. When the shape memory alloy member 2 is not energized, the length of the shape memory alloy member 2 from the movable body 3 (the crimp contact) to the pin 5 is 11.8 mm. The resilient member 4 causes the tension of about $49 \times 10^{-3}$ N when the resilient member 4 is expanded by 1 mm, and causes the tension of about $98 \times 10^{-3}$ N when the resilient member 4 is further expanded by 1 mm (i.e., when the shape memory alloy member 2 is contracted by 1 mm).

In the experiment using the driving device 1 according to the embodiment, when the direct current of 100 mA flows through the shape memory alloy member 2 so that the shape memory alloy member 2 is heated and contracted, the amount of displacement of the end of the shape memory alloy member 2 is 1.5 mm. That is, the amount of displacement of about 94% is obtained, with respect to the amount (1.6 mm) of displacement when the shape memory alloy member is linearly disposed. In other words, it is understood that, by bending the shape memory alloy member 2 using the winding member 5 (a metal pin having a diameter of 1 mm), it is possible to obtain the amount of displacement of about 94% with respect to the case in which the shape memory alloy member 2 is linearly disposed.

As described above, according to the driving device 1 of the embodiment, the shape memory alloy member 2 is bent by the bending member 5 so that the tension is applied to the shape memory alloy member 2 in the longitudinal direction thereof, and therefore the decrease in the amount of displacement of the movable body 3 can be suppressed, and the shape memory alloy member 2 whose entire length is long can be disposed in a smaller space. In other words, the space efficiency can be enhanced.

Embodiment 2

Figure 9:
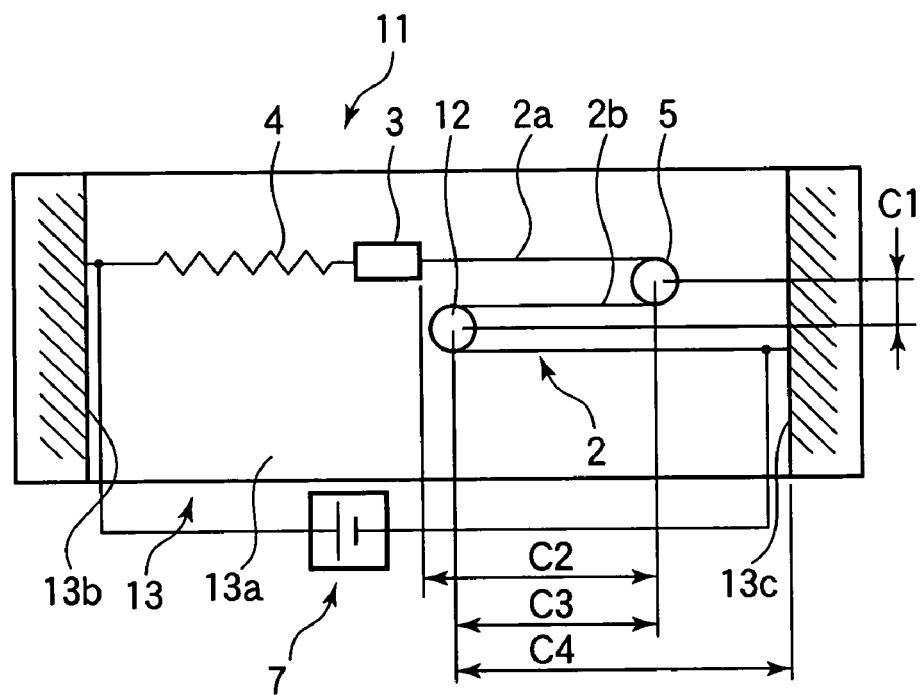
FIG. 9 is a plan view showing a driving device according to Embodiment 2 of the present invention.

FIG. 9 is a plan view showing a driving device 11 according to Embodiment 2 of the present invention. The driving device 11 is different from the driving device 1 of the above described Embodiment 1 (FIGS. 1 and 2) in that an additional bending member 12 is added for bending the shape memory alloy member 2 at two positions and two wall portions 13b and 13c are formed on a base 13. In the driving device 11, parts in common with the driving device 1 of Embodiment 1 are assigned the same reference numerals.

In this driving device 11, the wall portions 13b and 13c are formed on both sides of the base 13. In addition to the bending member 5, a bending member 12 is planted on the placing surface 13a of the base 13 on the wall portion 13b side with respect to the bending member 5. An end (fixed end) of the shape memory alloy member 2 is fixed to the wall portion 13c. The shape memory alloy member 2 is wound around the bending members 5 and 12 so that each winding angle is about 180 degrees. The other end (movable end) of the shape memory alloy member 2 is fixed to the movable body 3.

The bending member 5 is disposed on a position so that opposing portions 2a and 2b of the shape memory alloy member 2 bent around the bending member 5 become almost parallel to each other and do not interfere with the movement of the movable body 3. As an example of dimension, in the direction in which the opposing portions 2a and 2b extend (the moving direction of the movable body 3), an interval C2 between the movable member 3 and the bending member 5 is 12.6 mm, an interval C3 between the bending members 5 and 12 is 10 mm, an interval C4 between the bending member 12 and the wall portion 13c is 22.5 mm. An interval C1 between the bending portions 5 and 12 in a direction perpendicular to the direction in which the opposing part 2a and 2b extend is 5 mm.

The bending members 5 and 12 constitute a bending means which bends the shape memory alloy member 2. Portions of the circumferential surfaces of the bending members 5 and 12 contacting the shape memory alloy member 2 constitute a contact portion of the bending means contacting the shape memory alloy member 2. The base 13 constitutes a holding means which holds the bending members 5 and 12.

In the above described configuration, the experiment that has been described with reference to FIG. 5 is carried out. In this case, the pin-shaped bending members 5 and 12 each having a diameter of 1 mm are used. The other measurement conditions are the same as those described with reference to FIG. 5. When the direct current of 100 mA flows through the shape memory alloy member 2 so that the shape memory alloy member 2 is heated and contracted, the amount of displacement of the movable body 3 is about 1.3 mm.

In other words, the amount of displacement of the movable body 3 becomes about 81% with respect to the case in which the shape memory alloy member 2 is linearly disposed. It is understood that the decrease in the amount of displacement (which may accompany the enhancement of the space efficiency) can be suppressed.

As described above, according to the driving device of this embodiment, since the shape memory alloy member 2 is bent two times by means. of two pin-shaped bending members 5 and 12, it becomes possible to suppress the decrease in the amount of displacement of the movable body 3, and to enhance the space efficiency. Further, since two bending members 5 and 12 are used, it becomes possible to dispose the walls 13b and 13c closer to each other, and therefore the space efficiency can be further enhanced.

Embodiment 3

Figure 10:
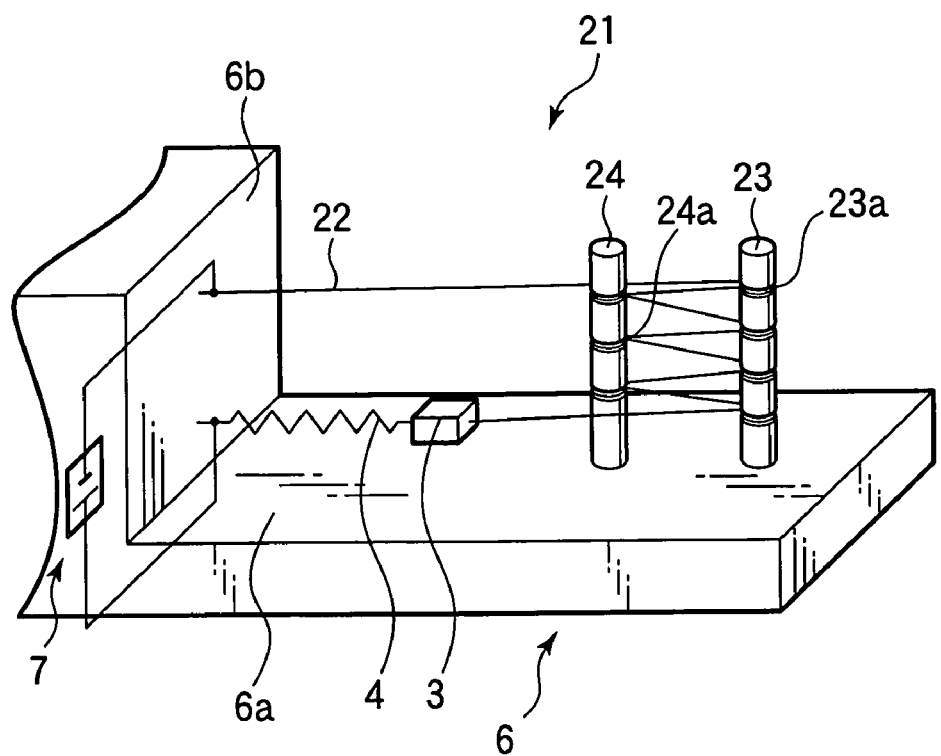
FIG. 10 is a perspective view showing a driving device according to Embodiment 3 of the present invention.

FIG. 10 is a perspective view showing the driving device 21 according to Embodiment 3 of the present invention. This driving device 21 is different from the driving device 1 of Embodiment 1 (FIGS. 1 and 2) in that two bending portions are provided and a plurality of portions for bending the shape memory alloy member 22 (guide grooves) are formed on the respective bending members 23 and 24. In the driving device 21, parts in common with the driving device 1 of Embodiment 1 are assigned the same reference numerals.

In this driving device 21, two bending members 24 and 23 are planted on the base 6 in this order from the side closer to the wall portion 6b. Four guide grooves 23a are formed on the circumferential surface of the bending member 23 at intervals in the axial direction of the bending member 23. Three guide grooves 24a are formed on the circumferential surface of the bending member 24 at intervals in the axial direction of the bending member 24. An end (fixed end) of the shape memory alloy member 22 is fixed to the wall portion 6b, and the other end (movable end) is fixed to the movable body 3. The shape memory alloy member 22 is wound around four guide grooves 23a of the bending member 23 and three guide grooves 24a of the bending member 24 so that each winding angle is about 180 degrees. In other words, two bending member 23 and 24 have contact portions at seven positions in total, which contact the shape memory alloy member 22 so as to bend the shape memory alloy member 22. In this embodiment, in order to avoid the short circuit of the shape memory alloy member 22, the bending members 23 and 24 are made of insulation material or the like.

Two bending members 23 and 24 constitute a bending means which bends the shape memory alloy member 22. Portions of the respective guide grooves 23a and 24a contacting the shape memory alloy member 22 constitute a contact portion of the bending means contacting the shape memory alloy member 22. The base 6 constitutes a holding means which holds the bending members 23 and 24. The resilient member 4 constitutes an urging means that urges the shape memory alloy member 22.

In the above described configuration, as is the case with Embodiment 1, the movable body 3 can be displaced by causing a predetermined direct current (for example, 100 mA) to flow through the shape memory alloy member 22 by means of the energizing circuit 7 so that the shape memory alloy member 22 is heated and contracted.

As described above, according to the driving device 21 of this embodiment, it is possible to efficiently dispose the longer shape memory alloy member 22, and therefore it is possible to suppress the decrease in the amount of displacement of the movable body 3 and to further enhance the space efficiency.

Moreover, since the guide grooves 23a and 24a are formed on the bending members 23 and 24, the shape memory alloy member 22 can be easily wound, the deviation of the winding position of the shape memory alloy member 22 can be prevented, and the short circuit of the shape memory alloy member 22 can be prevented.

Embodiment 4

Figure 11:
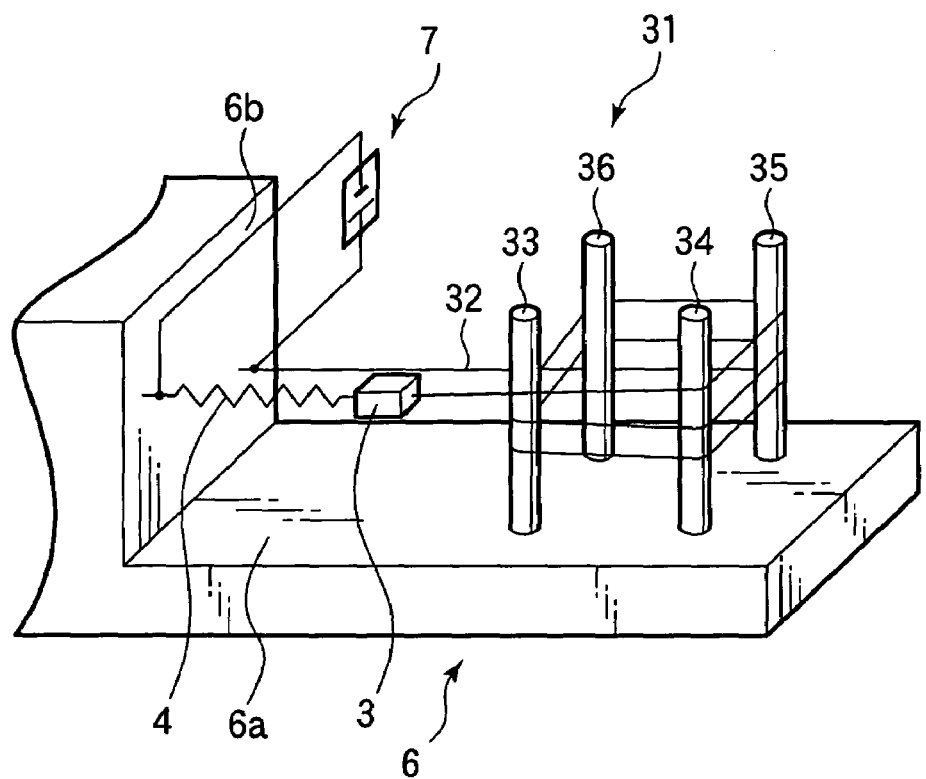
FIG. 11 is a perspective view showing a driving device according to Embodiment 4 of the present invention.

FIG. 11 is a perspective view showing a driving device 31 according to Embodiment 4 of the present invention. This driving device 31 is different from the driving device 1 (FIGS. 1 and 2) of Embodiment 1 in that four pin-shaped bending member 33, 34, 35 and 36 are provided. In the driving device 31, parts in common with the driving device 1 of Embodiment 1 are assigned the same reference numerals.

In this driving device 31, four pin-shaped. bending members 33 through 36 are provided at positions corresponding to four corners of a rectangle of the placing surface 6a of the base 6. An end (fixed end) of the shape memory alloy member 32 is fixed to the wall portion 6b, and the shape memory alloy member 32 is wound around the bending members 33 through 36 in about two turns and half so that each winding angle is 90 degrees. The other end (movable end) of the shape memory alloy member 32 is fixed to the movable body 3. The shape memory alloy member 32 is wound around the bending members 34 and 35 at three positions axially apart from each other, and wound around the bending members 33 and 36 at two positions axially apart from each other. That is, four bending members 33 through 36 have ten contact portions in total that contact the shape memory alloy member 32 so as to bend the shape memory alloy member 32. For example, in this embodiment, in order to avoid the short circuit of the shape memory alloy member 32, the bending members 33 through 36 are made of insulating material. Moreover, it is possible to provide the guide groove (the guide grooves 23a and 24a shown in FIG. 10) described in Embodiment 3 on the bending members 33 and 36.

Four bending members 33 through 36 constitute a bending means which bends the shape memory alloy member 32. Portions of the bending members 33 through 36 contacting the shape memory alloy member 32 constitute a contact portion of the bending means. The base 6 constitutes a holding means which holds the bending members 33 through 36.

In the above described configuration, the movable body 3 can be displaced by causing a predetermined direct current (for example, 100 mA) to flow through the shape memory alloy member 32 using the energizing circuit 7 so that the shape memory alloy member 32 is heated and contracted.

Although the bending portions 33 and 36 are disposed on four apexes of the rectangle, it is also possible to properly change the number and positions of the bending members, as long as the contact portions contacting the shape memory alloy member 32 are formed along a closed path. Further, in this example, although four bending members 32 have contact portions at ten positions in total, it is also possible to properly change this.

As described above, according to the driving device 31 of this embodiment, it is possible to efficiently dispose the longer shape memory alloy member 32, and therefore it is possible to suppress the decrease in the amount of displacement of the movable body 3 and to further enhance the space efficiency.

Embodiment 5

Figure 12:
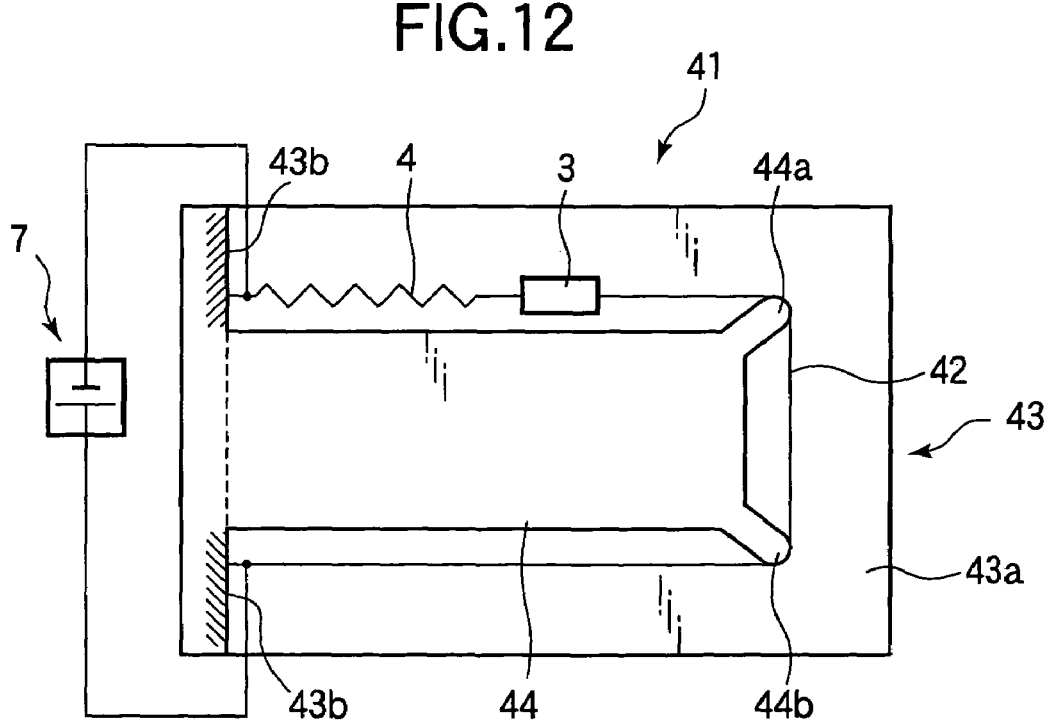
FIG. 12 is a plan view showing a driving device according to Embodiment 5 of the present invention.

FIG. 12 is a plan view showing a driving device 41 according to Embodiment 5 of the present invention. This driving device 41 is different from the driving device 1 (FIGS. 1 and 2) of Embodiment 1 in that a shape memory alloy member 42 is wound around projections 44a and 44b projecting from corners of a housing 44 so that each winding angle is 90 degrees. In the driving device 41, parts in common with the driving device 1 of Embodiment 1 are assigned the same reference numerals.

In the driving device 41, a housing 44 in the form of, for example, a rectangular parallelepiped is formed on a placing surface 43a of a base 43. The projections 44a and 44b are formed on two corners of the housing 44 on the sides farther from a wall portion 43b. The projections 44a and 44b project in directions almost perpendicular to each other, and have contact surfaces (for example, cylindrical surfaces) around which the shape memory alloy member 42 is wound. The shape memory alloy member 42 is wound around each contact surface of the projections 44a and 44b so that the winding angle (corresponding to a bending angle) is 90 degrees.

An end (fixed end) of the shape memory alloy member 42 is fixed to the wall portion 43b of the base 43, and the shape memory alloy member 42 is wound around projections 44a and 44b so that each winding angle is 90 degrees. The other end (movable end) of the shape memory alloy member 42 is fixed to the movable body 3.

The projections 44a and 44b constitute a bending means which bends the shape memory alloy member 42. Portions of the respective projections 44a and 44b contacting the shape memory alloy member 42 constitute a contact portion of the bending means that contacts the shape memory alloy member 42. The base 43 constitutes a holding means which holds the housing 44 having the projections 44a and 44b.

In the above described configuration, the movable body 3 can be displaced by causing a predetermined direct current (for example, 100 mA) to flow through the shape memory alloy member 42 by means of the energizing circuit 7 as in Embodiment 1 so that the shape memory alloy member 42 is heated and contracted.

In this embodiment, the projections 44a and 44b project from the corners of the housing 44. However, the projections 44a and 44b are is not limited to this configuration, but can be fixed to proper positions (in terms of designing) on the housing 44. The winding angle of the shape memory alloy member 42 is not limited to 90 degrees.

Moreover, it is possible to form the guide grooves 23a and 24a (FIG. 10) described in Embodiment 3 on the projections 44a and 44b. Further, it is also possible to form a step 44c on a position where the shape memory alloy member 42 is wound, so that it becomes easy to wind the shape memory alloy member 42.

As described above, according to the driving device 41 of this embodiment, since the shape memory alloy member 42 is bent two times (at 90 degrees for each) by a pair of projections 44a and 44b, the longer shape memory alloy member 42 can be efficiently disposed. Further, the housing 44 constituting a part of the driving device 41 can be utilized, and therefore the space efficiency can be further enhanced.

Embodiment 6

Figure 14:
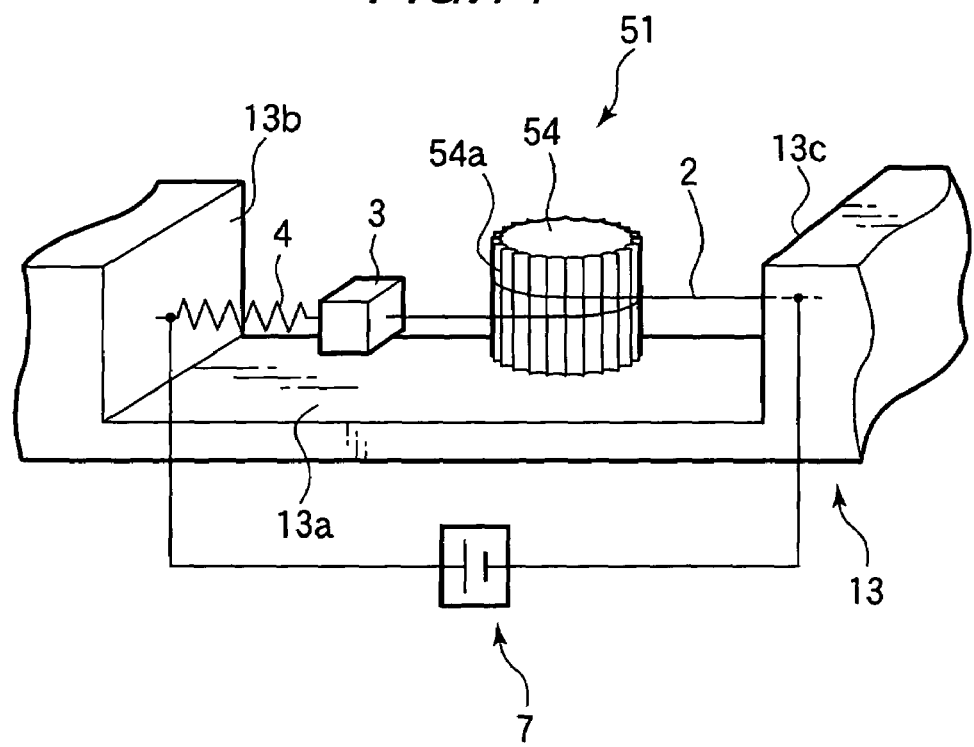
FIG. 14 is a perspective view showing a driving device according to Embodiment 6 of the present invention.

FIG. 14 is a perspective view showing a driving device 51 according to Embodiment 6 of the present invention. This driving device 51 is different from the driving device 11 (FIG. 9) of Embodiment 2 in that a bending member 54 having convex portions on a circumferential surface thereof is provided. In the driving device 51, parts in common with the driving device 11 of Embodiment 2 are assigned the same reference numerals.

As shown in FIG. 14, the bending member 54 is formed on the placing surface 13a of the base, and the bending member 54 is approximately in the form of a cylinder having minute convex portions on the circumferential surface thereof. The minute convex portions of the bending member 54 constitute contact portions 54a that contact the shape memory alloy member 2. The contact portions 54 are elongated in the axial direction of the bending member 54, and a large number of the contact portions 54a are disposed in the circumferential direction of the bending member 54.

An end (fixed end) of the shape memory alloy member 2 is fixed to the wall portion 13c, and the shape memory alloy member 2 is wound around the bending member 54 in one turn so that the total of the bending angles at the respective contact portions 54a is 360 degrees. The other end (movable end) of the shape memory alloy member 2 is fixed to one side of the movable body 3. The other side of the movable body 3 is fixed to an end of the resilient member 4, and the other end of the resilient member 4 is fixed to the wall portion 13b.

The bending member 54 constitutes a bending means which bends the shape memory alloy member 2. The contact portions 54a constitute contact portions (convex portions) that contacts the shape memory alloy member 2 in the bending means. The base 31 constitutes a holding means which holds the bending member 54.

In the above described configuration, the movable body 3 can be displaced by causing a predetermined direct current (for example, 100 mA) to flow through the shape memory alloy member 2 using the energizing circuit 7 so that the shape memory alloy member 2 is heated and contracted, as is the case with Embodiment 1.

Next, the experiment on the driving device 51 according to this embodiment will be described. As is the case with the experiments shown in the above described FIGS. 5 through 8, the crimp contacts 120 and the fixing pins 121 are arranged as shown in FIGS. 15 through 17.

Figure 15A:
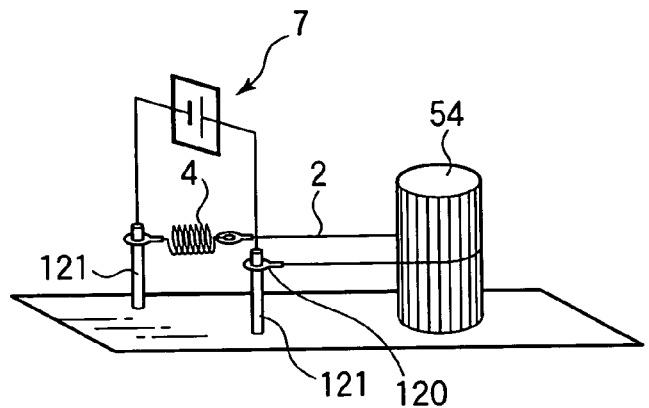
FIG. 15($a$) is a perspective view for illustrating an experiment on the driving device according to Embodiment 6 of the present invention, and FIG. 15($b$) is a plan view thereof.
Figure 15B:
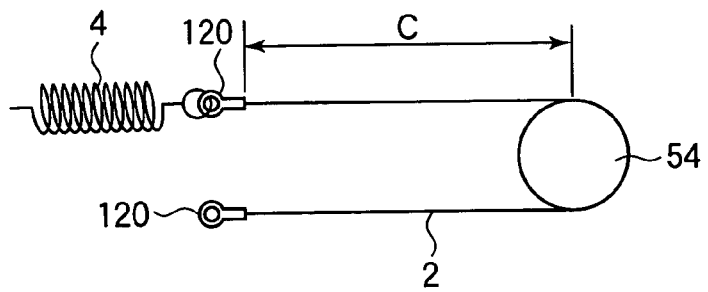

As shown in FIGS. 15(a) and (b), the shape memory alloy member 2 in the form of a wire is wound around the bending member 54 (having the contact portions 54a) at about 180 degrees, and the bending member 54 is made of POM or ABS in the form of a cylinder having a diameter of 10 mm.

Figure 16A:
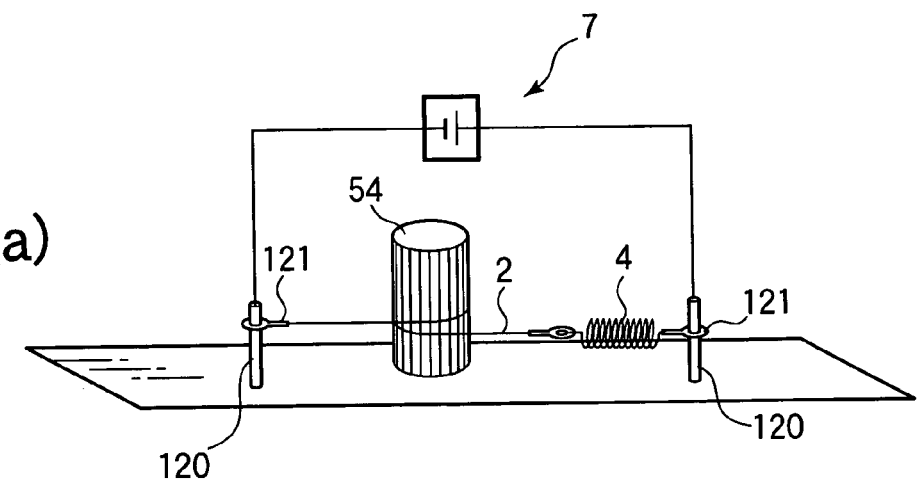
FIG. 16($a$) is a perspective view for illustrating an experiment on the driving device according to Embodiment 6 of the present invention, with a winding angle of a shape memory alloy member being varied, and FIG. 16($b$) is a plan view thereof.
Figure 16B:
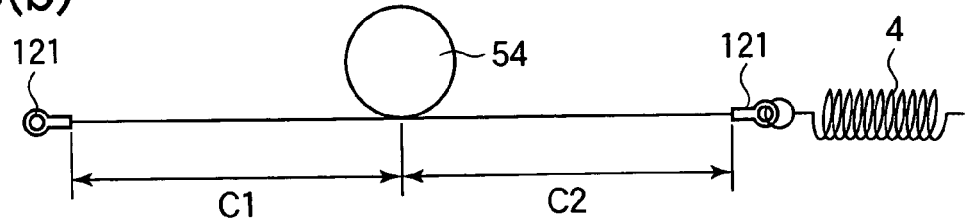

The crimp contact 120 at an end of the shape memory alloy member 2 is fixed to the fixing pin 121, and the crimp contact 120 at the other end of the shape memory alloy member 2 is fixed to another fixing pin 121 via a resilient member 4. The length C of the shape memory alloy member 2 from the bending member 54 to the crimp contacts 120 at both ends of the shape memory alloy member 2 are set to be 17.1 mm. As shown in FIGS. 16(a) and (b), the shape memory alloy member 2 is wound around the bending member 54 at 360 degrees, and the experiments are carried out similarly. The lengths C1 and C2 of the shape memory alloy member 2 from the bending member 54 to the crimp contacts 120 at both ends are set to be 9.3 mm. As shown in FIGS. 17(a) and (b), the shape memory alloy member 2 is wound around the bending member 54 at 450 degrees, and the experiment is carried out similarly. The length C of the shape memory alloy member 2 from the bending member 54 to the crimp contacts 120 are set to be 11 mm.

FIG. 18(a) is a perspective view showing an outline shape of the bending member used in the respective experiments. FIGS. 18(b) through (d) are plan views showing three kinds of shapes used in the respective experiments. The bending member 54 is an approximately cylindrical member having a diameter D of 10 mm, and has the contact portions 54a formed on the circumferential surface thereof with a pitch (P) of 1.56 mm. Each contact portion 54a has a circular-arc cross section having a radius of 5 mm. The widths W1 of the contact portion 54a are, respectively, 1.05 mm (FIG. 18(b)), 0.78 mm (FIG. 18(c)) and 0.52 mm (FIG. 18(d)). Moreover, the widths W2 of the grooves between adjacent contact portions 54a are, respectively, 0.52 mm (FIG. 18(b)), 0.78 mm (FIG. 18(c)) and 1.05 mm (FIG. 18(d)).

The other experimental conditions are the same as those of Embodiment 1. The direct current of 100 mA flows through the shape memory alloy member 2 so that the shape memory alloy member 2 is heated and contracted, and the displacement of the movable end is measured. The result of the measurement is shown in Tables 1 and 2. Table 1 shows the case where the bending member 54 is made of ABS, Table 2 shows the case where the bending member 54 is made of POM.

TABLE 1

| CONTACT RATIO | DISPLACEMENT RATIO (%) | | | CONTACT RATIO | DISPLACEMENT AMOUTN (mm) | | |
|---|---|---|---|---|---|---|---|
| (%) | 450 | 360 | 180 | (%) | 450 | 360 | 170 |
| 33 | 82 | 86 | 90 | 33 | 1.3 | 1.3 | 1.4 |
| 50 | 77 | 85 | 82 | 50 | 1.2 | 1.3 | 1.3 |
| 67 | 71 | 73 | 81 | 67 | 1.1 | 1.2 | 1.3 |
| 100 | 36 | 61 | 62 | 100 | 0.6 | 1.0 | 1.0 |

TABLE 2

| CONTACT RATIO | DISPLACEMENT RATIO (%) | | | CONTACT RATIO | DISPLACEMENT AMOUTN (mm) | | |
|---|---|---|---|---|---|---|---|
| (%) | 450 | 360 | 180 | (%) | 450 | 360 | 170 |
| 33 | 86 | 91 | 87 | 33 | 1.3 | 1.4 | 1.4 |
| 50 | 65 | 68 | 79 | 50 | 1.0 | 1.0 | 1.2 |
| 67 | 52 | 55 | 72 | 67 | 0.8 | 0.8 | 1.1 |
| 100 | 20 | 35 | 62 | 100 | 0.3 | 0.5 | 1.0 |

Figure 19:
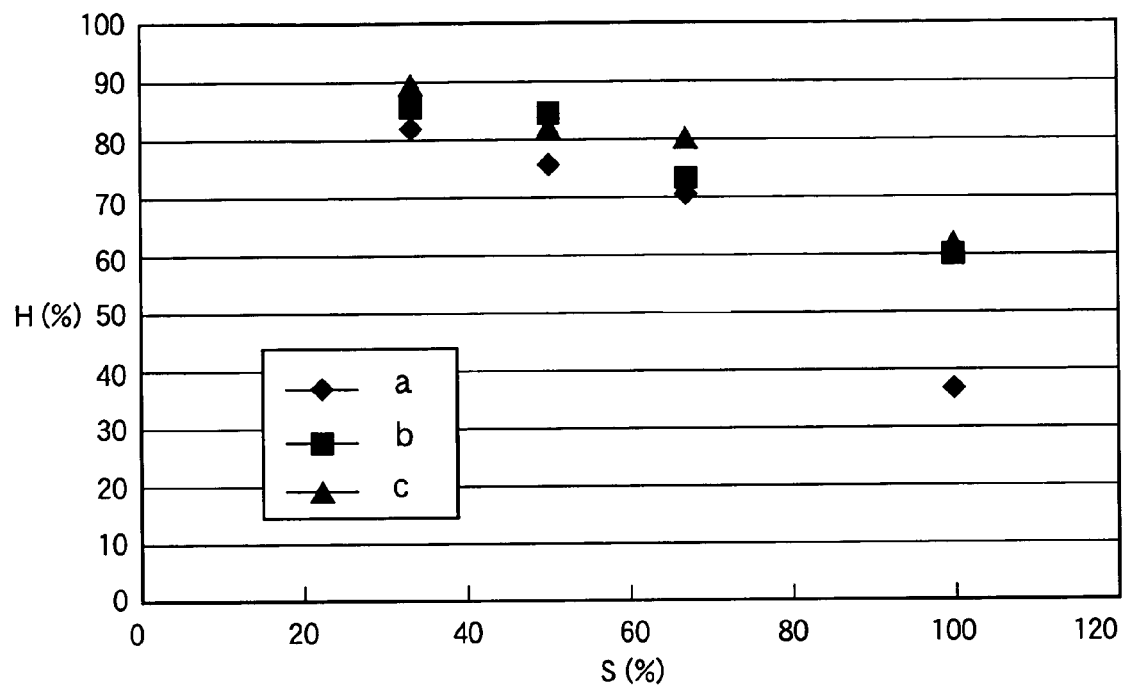
FIG. 19 is a graph showing a relationship between a contact ratio and a displacement ratio, which corresponds to Table 1.
Figure 20:
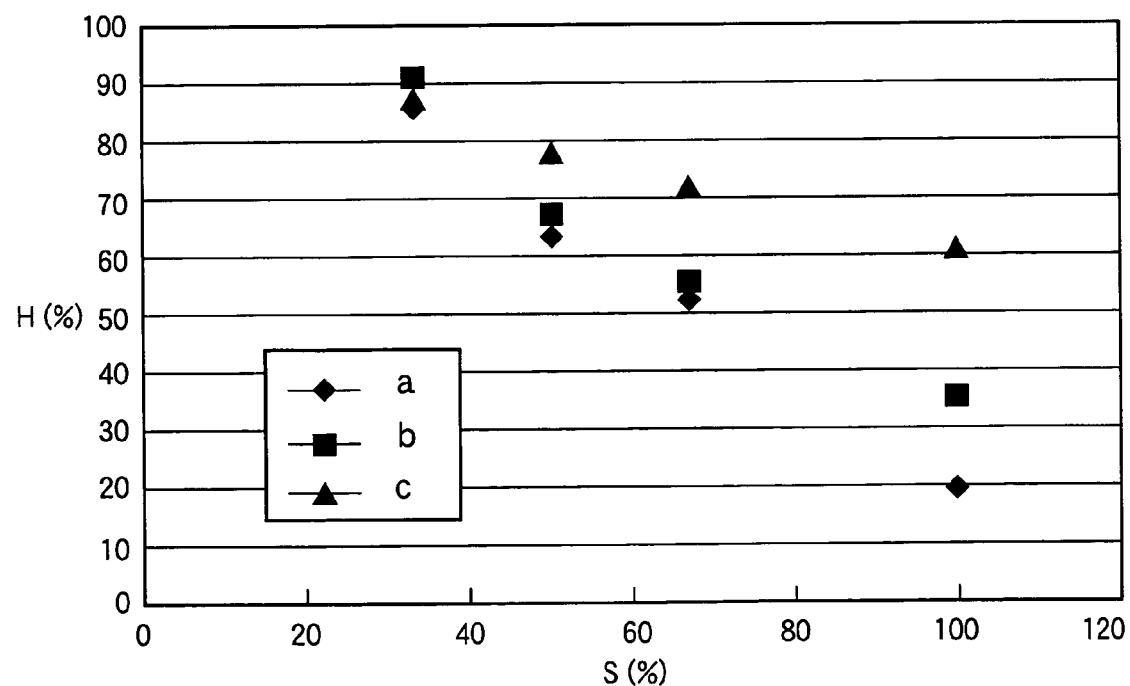
FIG. 20 is a graph showing the relationship between the contact ratio and the displacement ratio, which corresponds to Table 2.

FIG. 19 is a graph showing the experimental result when ABS is used as the bending member 54, which corresponds to Table 1. FIG. 20 is a graph showing the experiment result when POM is used as the bending member 54, which corresponds to Table 2. In FIGS. 19 and 20, a vertical axis indicates a displacement ratio H (%), i.e., a ratio of the measured displacement of the movable body 3 with respect to the displacement when the shape memory alloy member 2 is linearly disposed. A horizontal axis indicates a contact ratio S (%), i.e., a ratio of the width W1 of the contact portion 54a with respect to the pitch P (1.56 mm) of the contact portion 54a. For example, if the width W1 of the contact portion 54a is 0.52 mm (FIG. 18(d)), the contact ratio S is 100×0.52 mm/1.56 mm=33%. In FIGS. 19 and 20, marks a, b, and c indicate data respectively when the winding angle of the shape memory alloy member 2 around the bending member 54 is 450 degrees, 360 degrees and 180 degrees.

According to FIGS. 19 and 20 (Tables 1 and 2), the displacement ratio H of the movable body 3 becomes close to 100% (i.e., the amount of displacement when the shape memory alloy member 2 is linearly disposed), as the width W1 of the contact portion 54a becomes small. Moreover, as the width W1 of the contact portion 54a becomes small, the difference in amount of displacement caused by the difference in winding angle or material of the bending members 54 (ABS or POM) becomes small. In particular, when the width W1 of the contact portion 54a is ⅓ of the pitch P (the contact ratio S is about 35%), the displacement ratio H further becomes closer to 100%, and the difference in amount of displacement caused by the difference in winding angle or material of the bending members (ABS or POM) almost disappears. In the above described FIGS. 6 through 8, the amount of displacement of the movable body 3 largely changes according to the difference in material of the winding member 106 or winding angle of the shape memory alloy member 2. Conversely, in this embodiment, it is possible to suppress the deviation of the amount of displacement caused by the difference in winding angle of the shape memory alloy member 2 or material of the bending members 54. Therefore, the space efficiency can be enhanced, the configuration of the driving device can be simplified, and the operation efficiency of the manufacturing process can be enhanced.

Figure 21A:
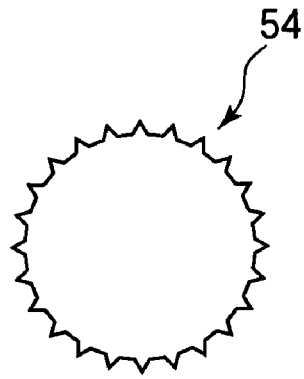
FIG. 21($a$) is a plan view showing the shape of the bending member according to Embodiment 6 of the present invention, and FIGS. 21($b$) and 21($c$) are plan views illustrating other configuration examples of the bending member.
Figure 21B:
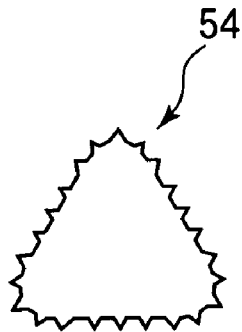

In this embodiment, although the contact portions 54a are formed along the approximately circular circumference of the contact member 54 as shown in FIG. 21(a), the contact portions 54a are not limited to this configuration. For example, the contact portions 54a can be formed along a closed path (the circumference of the closed figure), such as a circumference of a approximately rounded triangle or oval, as shown in FIGS. 21(b) and (c).

Embodiment 7

Figure 22:
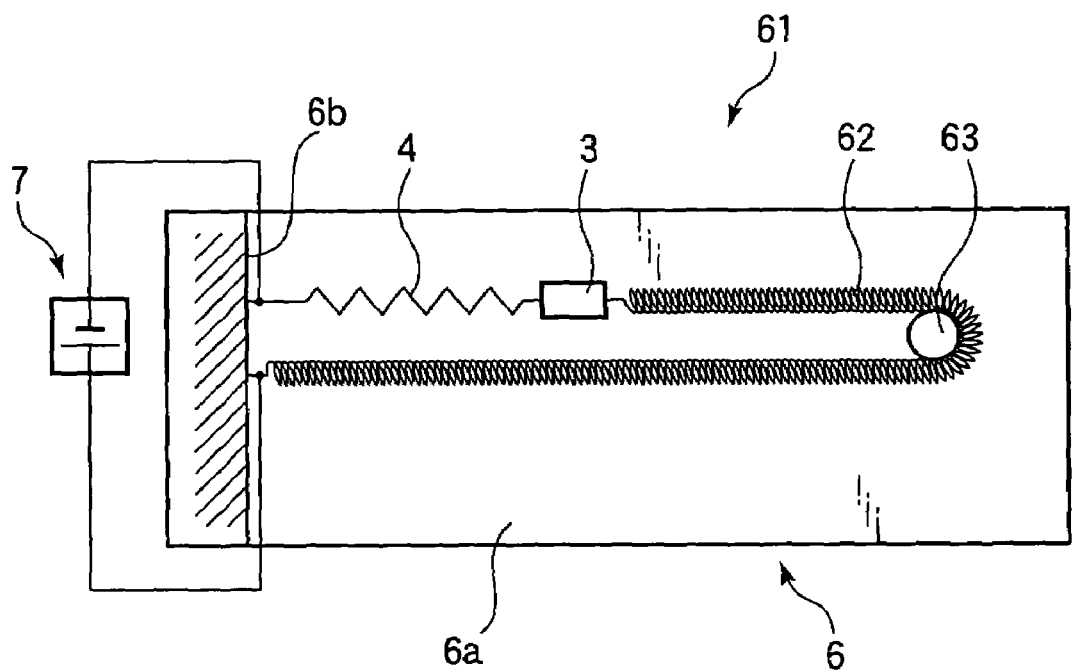
FIG. 22 is a plan view showing a driving device according to Embodiment 7 of the present invention.

FIG. 22 is a plan view showing a driving device 61 according to Embodiment 7 of the present invention. This driving device 61 is different from the driving device 1 (FIG. 1) in that a shape memory alloy member 62 is made in the form of a coil spring. In the driving device 61, parts in common with the driving device 1 of Embodiment 1 are assigned the same reference numerals.

As shown in FIG. 22, the shape memory alloy member 62 is made in the form of a coil spring, and is wound around a pin-shaped bending member 63 planted on a placing surface 6a of a base 6 so that the winding angle is 180 degrees. An end of the shape memory alloy member 62 is fixed to wall portion 6b, and the other end is fixed to the movable body 3.

The pin-shaped bending member 63 constitutes a bending means which bends the shape memory alloy member 62. A portion of the circumferential surface of the bending member 63 contacting the shape-memory alloy member 62 constitutes a contact portion of the bending means contacting the shape memory alloy member 62. The base 6 constitutes a holding means which holds the bending member 63.

In the above described configuration, the movable body 3 can be displaced by causing a predetermined direct current (for example, 100 mA) to flow through the shape memory alloy member 62 by means of the energizing circuit 7 so that the shape memory alloy member 62 is heated and contracted. Since the shape memory alloy member 62 takes the form of a coil spring, the amount of expansion and contraction of the shape memory alloy member 62 becomes large, with the result that the amount of displacement of the movable body 3 can be largely increased.

In this embodiment, although the bending member 63 is pin-shaped, the bending member 63 is not limited to the pin shape, but it is possible to chose the shape of the bending member 63 suitable for the shape memory alloy member 62 (in the form of the coil-spring) in terms of designing.

As described above, according to the driving device 61 of this embodiment, since the shape memory alloy member 62 is made in the form of the coil spring, the amount of expansion and contraction of the shape memory alloy member 62 becomes larger, and therefore the amount of displacement of the movable body 3 can be largely increased. Therefore, the space efficiency can be further enhanced, and the downsizing of the driving device 61 can be accomplished.

Embodiment 8

Figure 23:
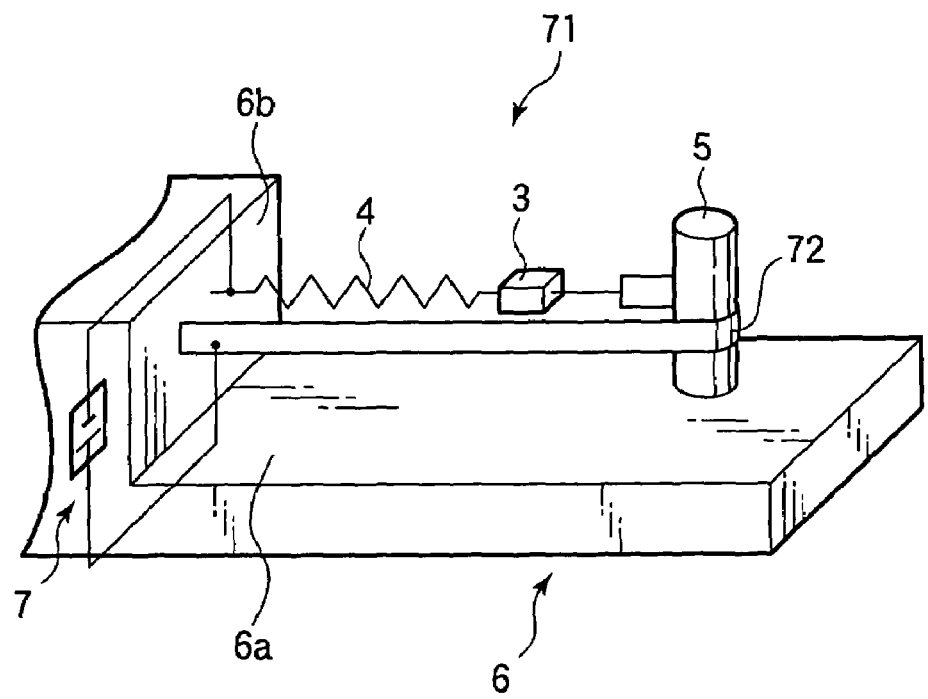
FIG. 23 is a perspective view showing a driving device according to Embodiment 8 of the present invention.

FIG. 23 is a perspective view showing a driving device 71 according to Embodiment 8 of the present invention. This driving device 71 is different from the driving device 1 of Embodiment 1 (FIGS. 1 and 2) in that a shape memory alloy member 72 in the form of a band is used. In the driving device 71, parts in common with the driving device 1 of Embodiment 1 are assigned the same reference numerals.

In the driving device 71, the shape memory alloy member 72 is not in the form of a wire but in the form of a band. The shape memory alloy member 72 is wound around a pin-shaped bending member 5 planted on a base 6 so that the winding angle is 180 degrees. An end of the shape memory alloy member 72 is fixed to a wall portion 6b, and the other end is fixed to a movable body 3.

The pin-shaped bending member 5 constitutes the bending means which bends the shape memory alloy member 72. A part of the circumferential surface of the bending member 5 contacting the shape memory alloy member 72 constitutes a contact portion of the bending means contacting the shape memory alloy member 72. The base 6 constitutes a holding means which holds the bending member 5.

In the above described configuration, the movable body 3 can be displaced by causing a predetermined direct current (for example, 100 mA) to flow through the shape-memory alloy member 72 by means of the energizing circuit 7 so that the shape memory alloy member 72 is heated and contracted.

In this embodiment, although the bending member. 5 is pin-shaped, the bending member 5 is not limited to the pin shape. It is possible to chose the shape of the bending member 5 suitable for the shape memory alloy member 72 (in the form of the band) in terms of designing.

As described above, according to the driving device 71 of this embodiment, in addition to the advantage of Embodiment 1 that enhances the space efficiency, it becomes possible to generate a large force because the shape memory alloy 72 is in the form of a band. Therefore, it becomes possible to move the movable body 3 with a large force.

Embodiment 9

FIGS. 24(a) and (b) are a front view and a side view showing a driving device 81 according to Embodiment 9 of the present invention. As shown in FIGS. 24(a) and (b), a base 83 has a pair of fixing walls 83a and 83b opposing to each other. Both ends of the shape memory alloy member 2 are fixed to one fixing wall 83a. The center part of the shape memory alloy member 2 is wound around a bending member 84 in a plurality of turns (2.5 turns) so that the winding angle is about 900 degrees. The bending member 84 is approximately in the form of a cylinder. This bending member 84 is composed by adding a rotation axis 84a to the above described bending member 54 (FIG. 14) having a plurality of contact portions 54a. Both ends of the rotation axis 84a are rotatably supported by a holding frame 85. A resilient member 4 is stretched between the center of a connecting portion 85a of the holding frame 85 and the fixing wall 83b of the base 83, so that the shape memory alloy member 2 is kept in a state where the shape memory alloy member 2 is not slackened. By the above described configuration, the shape memory alloy member 2 is not slackened, and the position of the bending member 84 is stably determined.

The bending member 84 constitutes a bending means which bends the shape memory. alloy member 2. A part of the circumferential surface of the bending member 84 contacting the shape memory alloy member 2 constitutes a contact portion of the bending means that contacts the shape memory alloy member 2. The base 83 constitutes a holding means which holds the bending member 84.

Figure 21C:
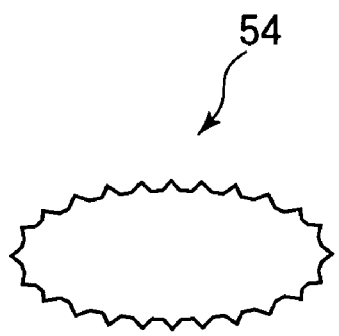

In the above described configuration, when the energizing circuit 7 causes a current to flow through the shape memory alloy member 2, the shape memory alloy member 2 is heated and contracted, so that the bending member 84 (and the holding frame 85) is displaced in the direction of an arrow C resisting the force of the resilient member 4. When the energization of the shape memory alloy member 2 is stopped, the shape memory alloy member 2 is expanded to its original length, and the bending member 84 (and the holding frame 85) is displaced in the direction of an arrow D due to the force of the resilient member 4. Here, although the direction of the movement of a movable body (the bending member 83 and the holding frame 85) shown by arrows C and D is aligned with the direction of the gravity, the direction is not necessarily aligned with the direction of the gravity, as long as the movable body 3 is able to smoothly move in the direction indicated by the arrows C and D. Further, in this embodiment, the bending member 84 uses an approximately cylindrical member having contact portions 54a on a circumferential surface thereof. However, as was described with reference to FIG. 21 (Embodiment 6), it is possible to freely design the shape of the bending member 84 such as oval shape, rounded triangle or the like, according to the conditions of the driving device 81.

As described above, according to the driving device 81 of this embodiment, it is possible to suppress the decrease in the amount of displacement of the movable body (bending member 84 and holding frame 85). Further, by using the shape memory alloy member 2 whose entire length is long, it is possible to obtain a large driving force and to accomplish the downsizing of the driving device 81.

Embodiment 10

Figure 25A:
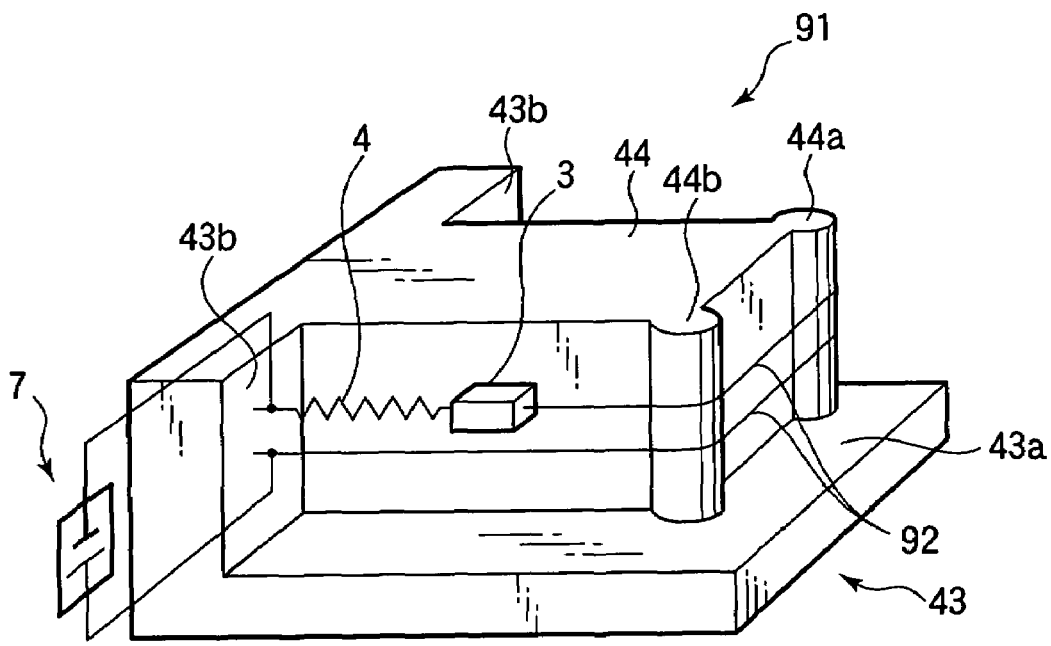
FIG. 25(a) is a perspective view showing a driving device according to Embodiment 10 of the present invention.

FIGS. 25(a) and (b) are perspective views showing a driving device 91 according to Embodiment 10 of the present invention, as seen from different directions. This driving device 91 is different from the driving device 41 of the Embodiment 5 in that a pin 93 is further provided on a housing 44 for further bending a shape memory alloy member 92, in addition to the projections 44a and 44b. In the driving device 91, parts in common with the driving device 41 of Embodiment 5 are assigned the same reference numerals.

Figure 25B:
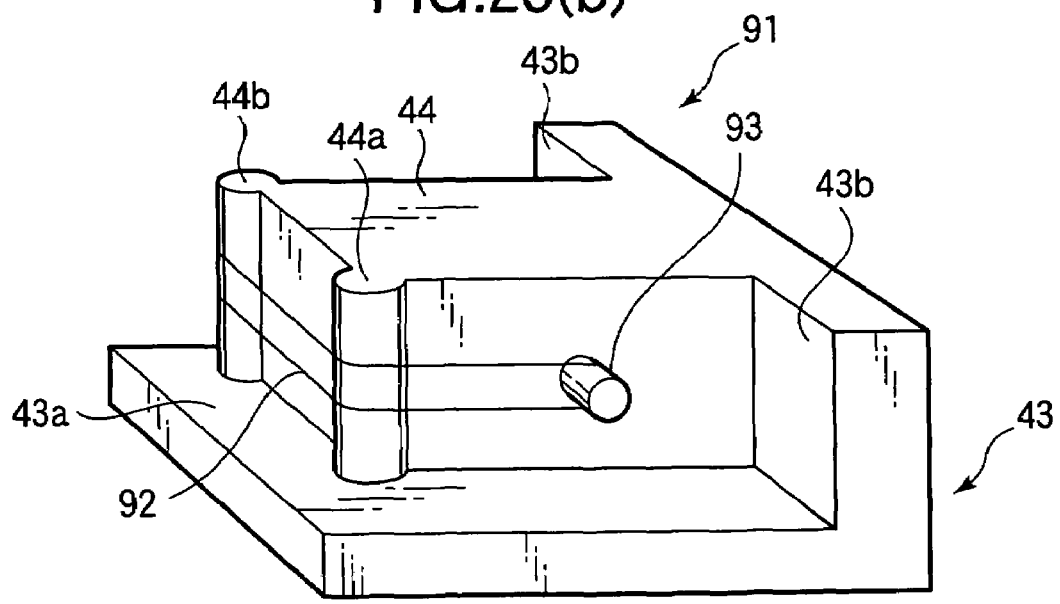
FIG. 25(b) is a perspective view seen in the different direction.

As shown in FIG. 25(a), the housing 44 is provided on, for example, a placing surface 43a of a base 43. The projections 44a and 44b described in Embodiment 5 are formed on the corners of this housing 44. In addition, the pin 93 (protrusion) is planted on the side surface of the housing 44 as shown in FIG. 25(b).

An end (fixed end) of the shape memory alloy member 92 is fixed to a wall portion 43b of the base 43. The shape memory alloy member 92 is wound around the projections 44a and 44b so that each winding angle is 90 degrees, then bent by the pin 93 at 180 degrees, and again wound around the projections 44a and 44b so that each winding angle is 90 degrees. The other end (movable end) of the shape memory alloy 92 is fixed to the movable body 3.

The housing 44 with the projections 44a and 44b constitutes a bending means which bends the shape memory alloy member 92. Portions of the circumferential surfaces of the projections 44a and 44b contacting the shape memory alloy member 92 constitutes a contact portion of the bending means that contacts the shape memory alloy member 92. The base 43 constitutes a holding means which holds the housing 44 with the projections 44a and 44b.

In the above described configuration, the movable body 3 can be displaced by causing a current to flow through the shape memory alloy member 92 by means of the energizing circuit 7 so that the shape memory alloy member 92 is heated and contracted.

The driving device 91 according to this embodiment has the pin 93 and the protruding portions 44a and 44b, so that the shape memory alloy member 92 is wound around a pair of projections 44a and 44b and the pin 93 in five turns (90 degrees and 180 degrees). Therefore, the shape memory alloy member 92 whose entire length is long can be disposed in a small space. Additionally, since a part of the housing 44 constituting the driving device 91 can be utilized, the downsizing of the driving device can be accomplished, while the decrease in the amount of displacement of the movable body 3 can be suppressed and the space efficiency can be enhanced.

Embodiment 11

Figure 13:
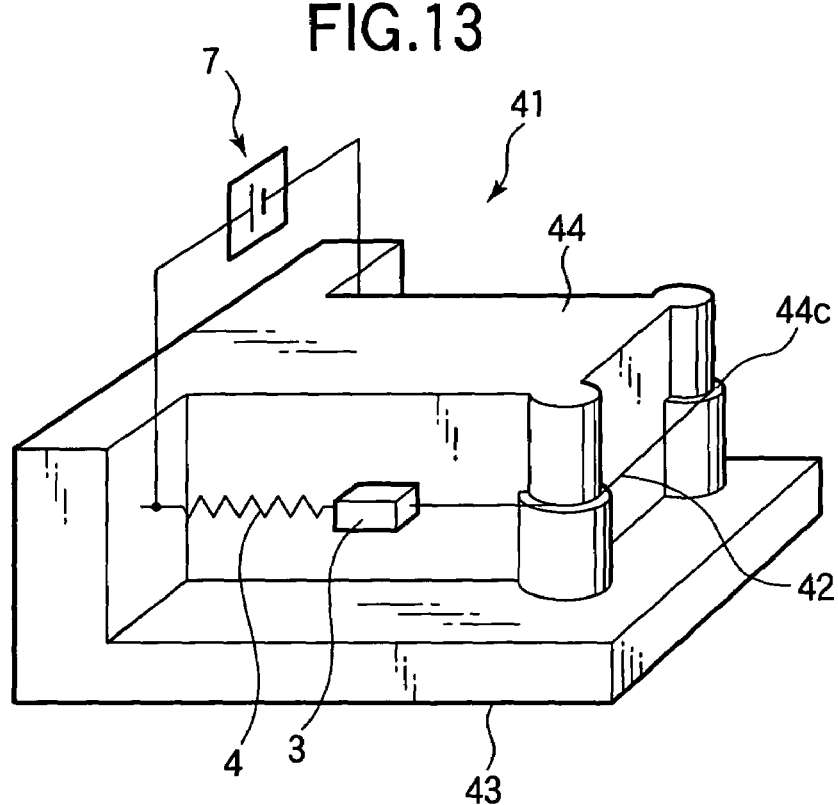
FIG. 13 is a plan view showing another configuration example of a driving device according to Embodiment 5 of the present invention.
Figure 26:
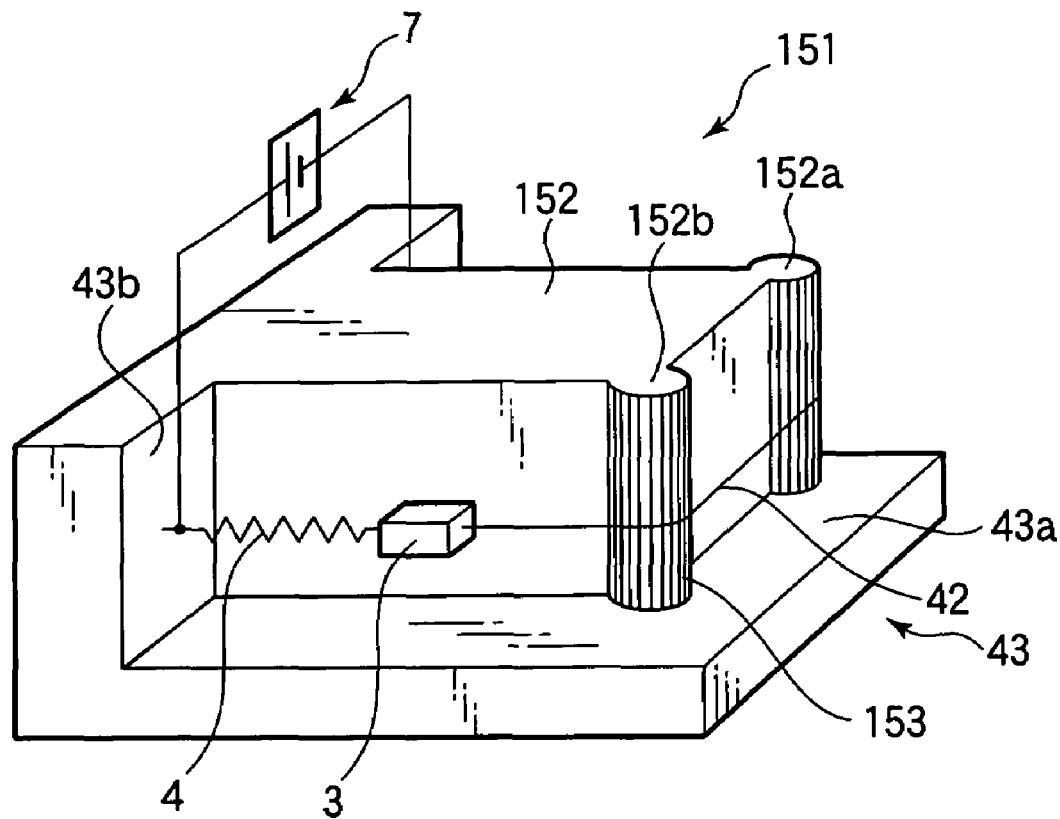
FIG. 26 is a perspective view showing a driving device according to Embodiment 11 of the present invention.

FIG. 26 is a perspective view showing a driving device 151 according to Embodiment 11 of the present invention. This driving device 151 is different from the driving device 41 (FIGS. 12 and 13) of Embodiment 5 in that minute convex portions 153 are formed on the circumferential surfaces of projections 152a and 152b of a housing 152. In the driving device 151, parts in common with the driving device 41 of Embodiment 5 are assigned the same reference numerals.

In the driving device 41, the housing 152 is provided on, for example, a placing surface 43a of a base 43. The projections 152a and 152b are formed on corners of the housing 152 and project in directions perpendicular to each other. Minute convex portions 153 are formed on the circumferences of the projections 152a and 152b, and elongated in the vertical direction. An end (movable end) of the shape memory alloy member 42 is fixed to the wall portion 43b of the base 43, and the shape-memory alloy member 42 is wound around the projections 152b and 152a (in contact with the convex portions 153) so that each winding angle is 90 degrees. The other end (fixed end) of the shape memory alloy member 42 is fixed to a movable body 3.

The housing 152 with the projections 152a and 152b constitutes a bending means which bends the shape memory alloy member 42. Convex portions 153 of the projections 152a and 152b constitute a contact portion of the bending means that contacts the shape memory alloy member 42. The base 43 constitutes a holding means which holds the housing 152.

In the above described configuration, the movable body 3 can be displaced by causing the direct current to flow through the shape memory alloy member 42 by means of the energizing circuit 7 so that the shape memory alloy member 42 is heated and contracted.

When the shape memory alloy member 42 is to be bent, it is necessary to prevent the stress concentration caused by the rapid change of the stress, and to prevent a bent habit to thereby enhance a reliability. For this purpose, the diameters of the projections 152a and 152b (in the case where the projections 152a and 152b have circular-arc cross sections) are preferably from 20 to 40 times the diameter of the shape memory alloy member 42. However, in such a case, a contact length with which the shape memory alloy member 42 contacts the projections 152a and 152b increases, and therefore there is a possibility that the amount of displacement may decrease compared with the case in which the shape memory alloy member 42 is linearly disposed.

However, in this embodiment, the convex portions 153 are formed on the projections 152a and 152b in the direction perpendicular to the winding direction of the shape memory alloy member 42, so that the contact length between the shape memory alloy member 42 and the projections 152a and 152b (the convex portions 153) is short. Therefore, even when the diameters of the projections 152a and 152b are set to be large, it is possible to prevent the decrease in the amount of displacement of the shape memory alloy member 42.

Figure 27:
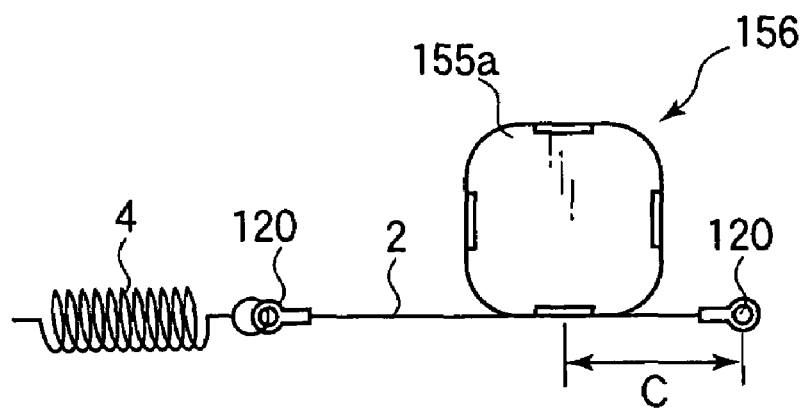
FIG. 27 is a plan view for illustrating an experiment on the driving device according to Embodiment 11 of the present invention.

FIG. 27 is a plan view showing an experimental method for verifying the effect by the provision of the convex portions 153. As shown in FIG. 27, in this experiment, the shape memory alloy member 2 with the crimp contacts 120 fixed to both ends thereof is wound around a bending member 155a at 360 degrees. The crimp contact 120 at an end (movable end) is fixed to a resilient member 4, and the crimp contact 120 at the other end (fixed end) is fixed to the fixing pin 121 (FIG. 7(a)). The other end of the resilient member 4 is fixed to another fixing pin 121 (FIG. 7(a)). The energizing circuit 105(FIG. 7(a)) causes a current to flow between two fixing pins 121. The shape memory alloy member 2 has a length of 50 mm, and a diameter of 60 μm. The length C of the shape memory alloy member 2 from the bending member 155a to the fixing pin 121 on the fixed end is set to be about 8 mm. Moreover, the tension of about $392 \times 10^{-3}$ N is applied to the shape memory alloy member 2 on a normal condition (when the shape memory alloy member 2 is not energized). Under such a condition, when the direct current of 140 mA flows through the shape memory alloy member 2, the amount of displacement (for example, the amount of displacement of the crimp contact 120 connected to the resilient member 4) of the movable end of the shape memory alloy member 2 is measured.

The bending member 155a is a rectangular column having a square cross section with projections 156 formed on the four corners, and each projection 156 has a circular-arc cross section. The projections 156 correspond to the projections 152a and 152b of the driving device 151 (FIG. 26) of Embodiment 11. By measuring the amount of displacement when the shapes of the projections 156 is varied, it is possible to determine the tendency of the change in the amount of displacement when the respective shapes are adopted to the projections 152a and 152b (FIG. 26).

Figure 28A:
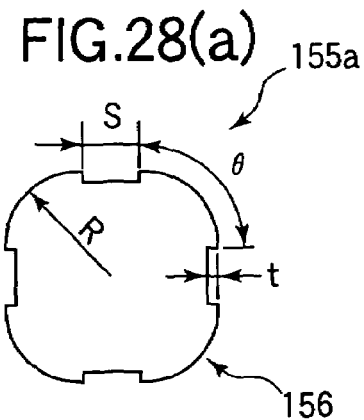
FIGS. 28(a), 28(b), 28(c) and 28(d) are plan views of winding members used in the experiment of FIG. 27.

FIGS. 28(a) and (d) show plan views showing the respective shapes of the bending members 155a through 155d used in this experiment. The bending member 155a through 155d are made of POM.

The bending member 155a shown in FIG. 28(a) is a rectangular column having an approximately square cross section, and the projections 156 (having a radius R of 3.3 mm) are formed on four corners of the rectangular column. Concaves having a depth t of 0.2 mm are formed between the projections 156. The ratio of the length of four projections 156 contacting the shape memory alloy member 2 with respect to the entire circumferential length of the bending member 155a, i.e., the contact ratio is 66%. Each projection 156 is in the form of sector whose central angle θ is 90 degrees. In the experiment using this bending member 155 a, the amount of displacement of the movable end of the shape memory alloy member 2 is 1.16 mm, and the ratio (i.e., the displacement ratio) thereof to the amount of displacement on the same condition in the case where the shape memory alloy member 2 is linearly disposed (2.1 mm) is 55.2%.

Figure 28B:
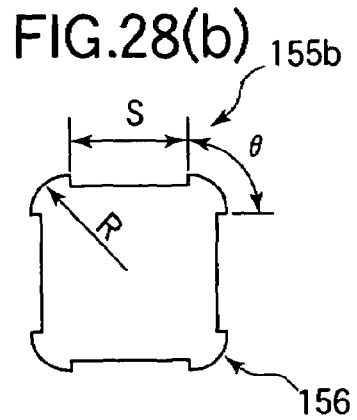

The bending member 155b shown in FIG. 28(b) is a rectangular column with an approximately square cross section, and the projections 156 (having a radius R of 1.6 mm) are formed on four corners of the rectangular column. Concaves having a depth t of 0.2 mm are formed between the projections 156. The ratio of the length of four projections 156 contacting the shape memory alloy member 2 with respect to the entire circumferential length of the bending member 155b (the contact ratio) is 33%. In the experiment using this bending member 155b, the amount of displacement of the movable end of the shape memory alloy member 2 is 1.48 mm, and the displacement ratio thereof to the amount of displacement in the case where. the shape memory alloy member 2 is linearly disposed (2.1 mm) is 70.5%.

Figure 28C:
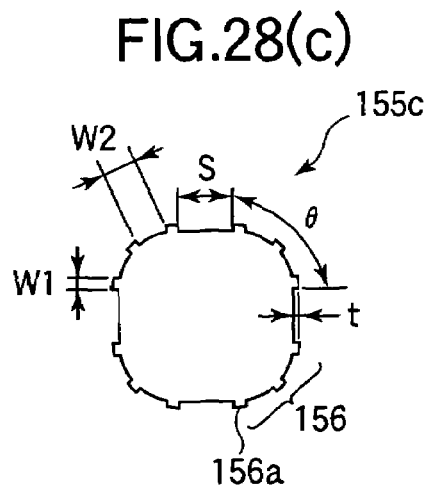

The bending member 155c shown in FIG. 28(c) is made by forming two concaves having a depth t of 0.2 mm (so as to form three convex portions 156a) on each projection 156 of the bending member 155a shown in FIG. 28(a). The ratio of the length of the convex portions 156a of four projections 156 contacting the shape memory alloy member 2 with respect to the entire circumferential length of the bending member 155c (the contact ratio) is 33%. In the experiment using this bending member 155c, the amount of displacement of the movable end of the shape memory alloy member 2 is 1.38 mm, and the displacement ratio thereof to the amount of displacement in the case where the shape memory alloy member 2 is linearly disposed (2.1 mm) is 65.7%.

Figure 28D:
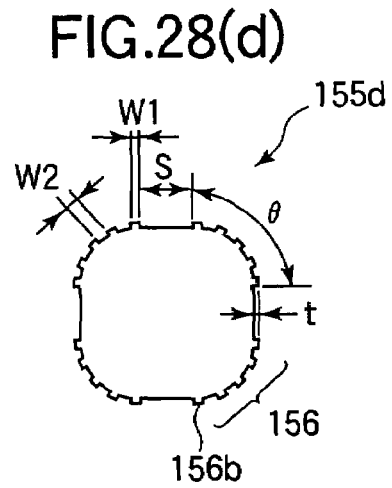

The bending member 155d shown in FIG. 28(d) is made by forming four concaves having a depth t of 0.2 mm (so as to form five convex portions 156b) on each projection 156 of the bending member 155a shown in FIG. 28(a). The ratio of the length of the convex portions 156b of four projections 156 contacting the shape memory alloy member 2 with respect to the entire circumferential length of the bending member 155c (the contact ratio) is 33%. In the experiment using this bending member 155d, the amount of displacement of the movable end of the shape memory alloy member 2 is 1.42 mm, and the displacement ratio thereof to the amount of displacement in the case where the shape memory alloy member 2 is linearly disposed (2.1 mm) is 67.6%.

Figure 29:
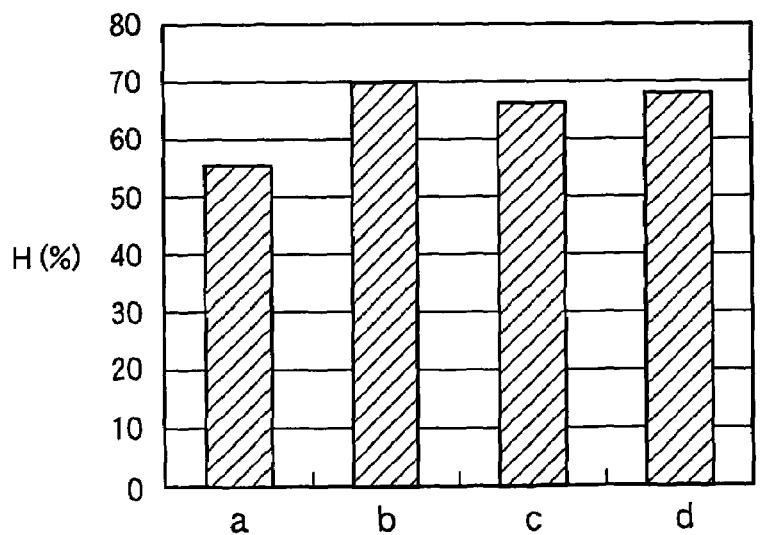
FIG. 29 is a graph showing a result of the experiment on the driving device according to Embodiment 11 of the present invention.

The result of the above described experiment is shown in Table 3 and FIG. 29. In FIG. 29, the vertical axis indicates the displacement ratio H (%). Marks a, b, c, and d of a horizontal axis respectively indicate the experiment results when the bending members 155a, 155b, 155c, and 155d (FIG. 28(a) through (d)) are used.

TABLE 3

| CONTACT RATIO (%) | 66 | 33 | 33 (3 CONVEX PORTIONS) | 33 (5 CONVEX PORTIONS) |
|---|---|---|---|---|
| DISPLACEMENT RATIO (%) | 55.2 | 70.5 | 65.7 | 67.6 |

As seen from the experimental result shown in Table 3 and FIG. 29, it is understood that the amount of displacement of the movable body (the movable end of the shape memory alloy member 2) increases, as the contact. ratio of the shape memory alloy member decreases. Therefore, in driving device 151 (FIG. 26), it is understood that the amount of displacement of the movable body 3 can be increased by forming the convex portions 153 on the projections 152a and 152b so as to reduce the ratio of the contact portion contacting the shape memory alloy member 42 to the entire circumferential length.

As described above, according to the driving device 151 of this embodiment, since the minute convex portions 153 are formed on the projections 152a and 152b contacting the shape memory alloy member 42, the amount of displacement of the movable end of the shape memory alloy member 42 can be increased, and the stress concentration on the shape memory alloy member 42 can be prevented, so that the bent habit can be prevented.

Embodiment 12

Figure 30:
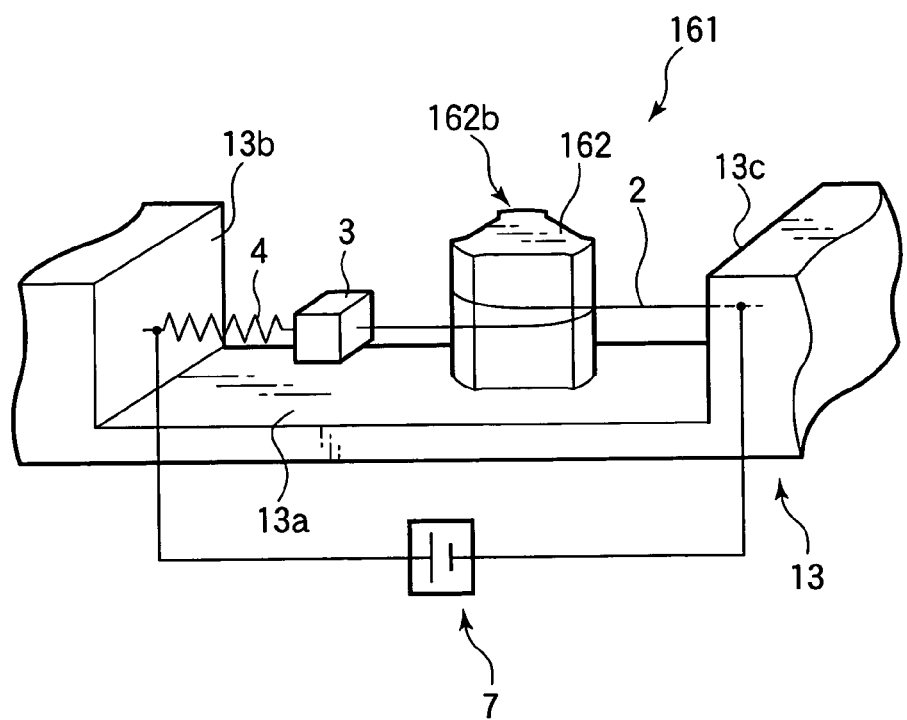
FIG. 30 is a perspective view showing a driving device according to Embodiment 12 of the present invention.

FIG. 30 is a perspective view showing the driving device 161 according to Embodiment 12 of the present invention. The driving device 161 is different from the driving device 51 (FIG. 14) according to Embodiment 6 of the present invention in that a bending member 162 having projections 162b is in the form of a multangular column. In the driving device 161, parts in common with the driving device 51 of Embodiment 6 are assigned the same reference numerals.

As shown in FIG. 30, the bending member 2 is planted on a placing surface 13a of a base 13, and has a plurality of projections 162b (contact portion) on the circumferential surface thereof. An end (fixed end) of the shape memory alloy member 2 is fixed to a wall portion 13c, and the shape memory alloy member 2 is wound around the circumferential surface of the bending portion 162 so that the total of bending angles at the respective projections 162b is 360 degrees. The other end (movable end) of the shape memory alloy member 2 is fixed to a movable body 3.

The bending member 162 constitutes a bending means which bends the shape memory alloy member 2. Portions of the circumferential surface of the bending member 162 contacting the shape memory alloy member 2 constitutes a contact portion of the bending means contacting the shape memory alloy member 2. The base 13 constitutes a holding means which holds the bending member 162.

In the above described configuration, the movable body 3 can be displaced by causing a current to flow through the shape memory alloy member 2 by means of the energizing circuit 7 so that the shape memory alloy member 2 is heated and contracted.

In the above described Embodiment 6 (FIGS. 14 through 20), it has been described that the decrease in the amount of displacement of the shape memory alloy member 2 can be suppressed by reducing the contact ratio of the shape memory alloy member 2 contacting the bending member 54. However, if the bending member 54 is made of resin, as a contact width of the projection 54a (a length with which the projection 54a contacts the shape memory alloy member 2) decreases, there is a possibility that the bending member 54 may be molten by the heat of the shape memory alloy member 2. Therefore, it is preferable to increase the contact width of each projection 54a and to reduce the contact ratio, if a resin or other material which does not have high heat resistance property is used as the bending member 54. In this respect, the experiment using the bending members of various sectional shapes will be described.

Figure 31:
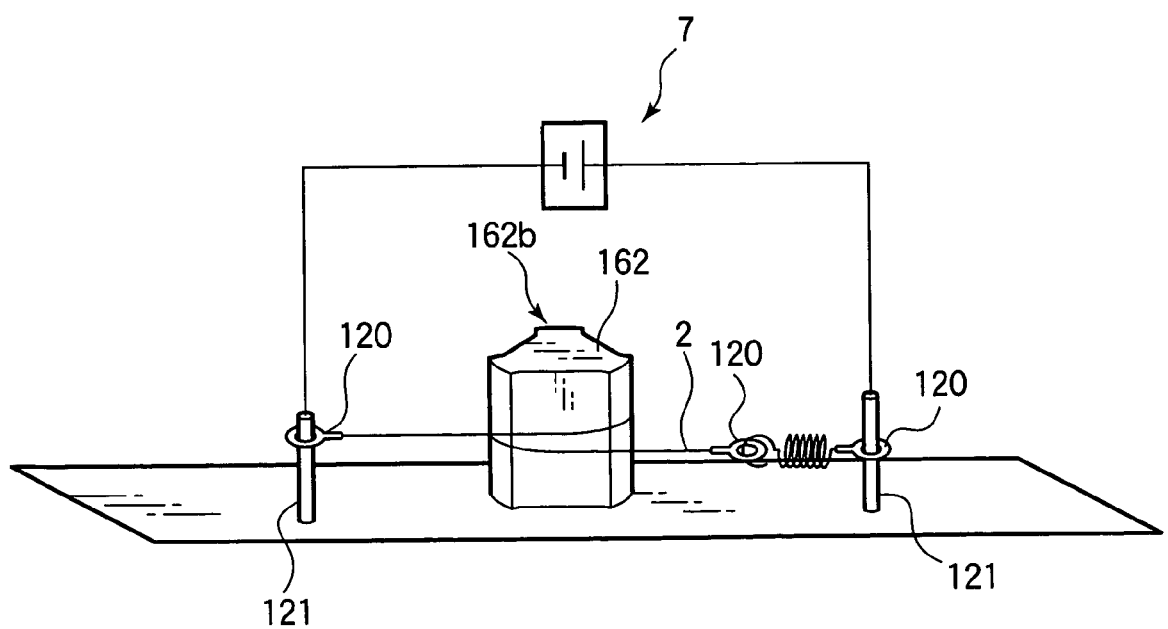
FIG. 31 is a perspective view for illustrating an experiment on the driving device according to Embodiment 12 of the present invention.
Figure 32A:
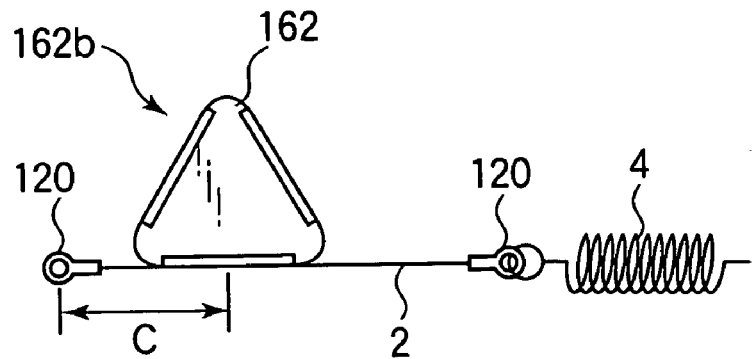
FIGS. 32(a), (b), (c) and (d) are plan views for respectively illustrating experiments using bending members having different sectional shapes.
Figure 32B:
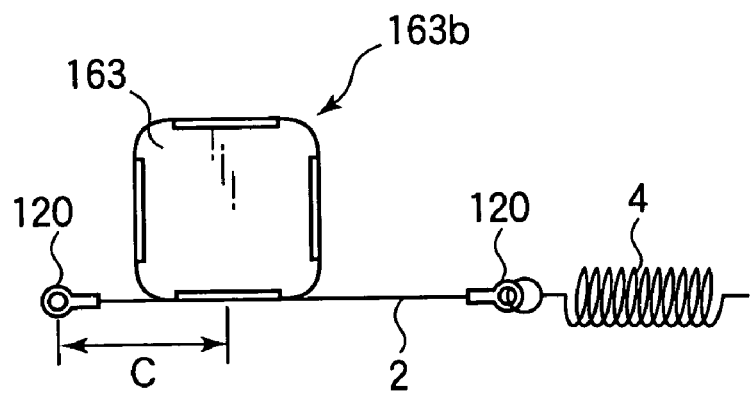
Figure 32C:
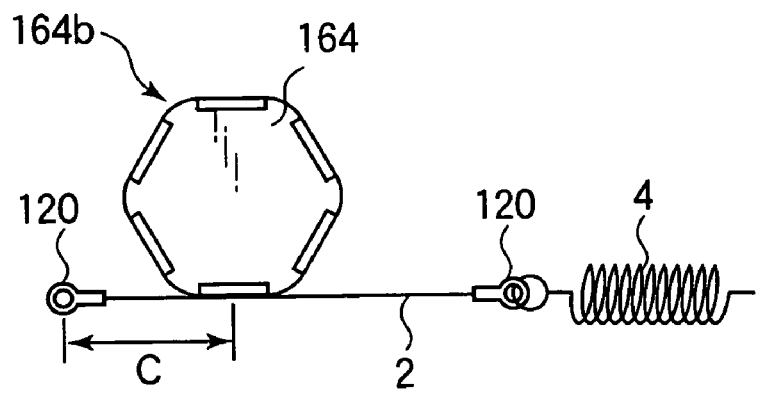
Figure 32D:
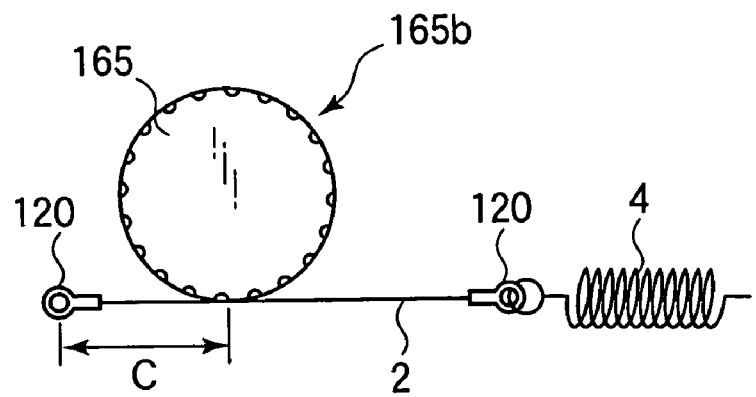

FIG. 31 is a perspective view of a main part of an experimental arrangement. As shown in FIG. 31, in this experiment, a crimp contact 120 is fixed to an end (fixed end) of the shape memory alloy member 2, and the crimp contact 120 is also fixed to a fixing pin 121. Another crimp contact 120 is fixed to another end (movable end) of the shape memory alloy member 2, and the crimp contact 120 is fixed to another fixing pin 121 via a resilient member 4. The shape memory alloy member 2 has a length of 50 mm and a diameter of 60 μm. The tension applied to the shape memory alloy member 2 is about $392 \times 10^{-3}$ N when the shape memory alloy member 2 is not energized.

When a direct current of 140 mA flows through the shape memory alloy member 2, the amount of displacement of the movable end (for example, the amount of displacement of the crimp contact 120 fixed to the resilient member 4) of the shape memory alloy member 2 is measured.

FIG. 32(a) through (d) are plan views for illustrating the experiments using four kinds of bending members 162 through 165. In the experiment shown in FIG. 32(a), the bending member 162 in the form of a column having an approximately triangular cross section is used. In the experiment shown in FIG. 32(b), the bending member 163 in the form of a column having an approximately rectangle cross section is used. In the experiment shown in FIG. 32(c), the bending member 164 in the form of a column having an approximately hexagonal cross section is used. In the experiment shown in FIG. 32(d), the bending member 165 in the form of a cylinder having an approximately circular cross section is used. The bending members 162 through 165 are made of POM. In each case, the distance C from the bending portion 162 through 165 to the fixed end of the shape memory alloy member 2 is 8 mm.

FIGS. 33 through 36 are plan views showing the concrete sectional shapes of the bending members 162 through 165.

Figure 33A:
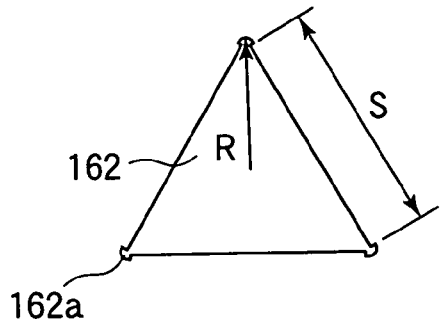
FIGS. 33(a), (b), (c) and (d) are plan views respectively showing four kinds of bending members in the form of approximately triangle column.
Figure 33B:
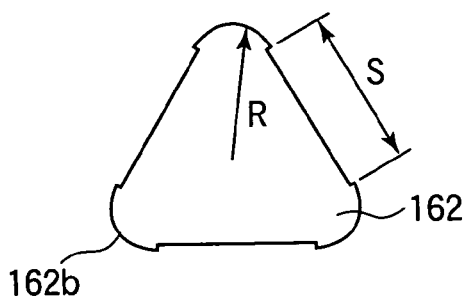
Figure 33C:
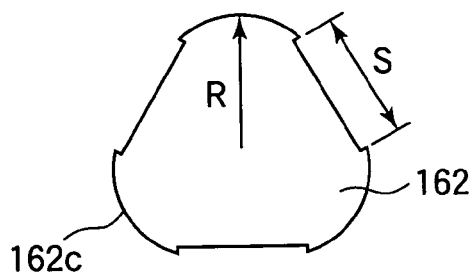
Figure 33D:
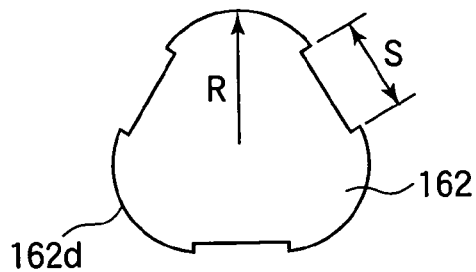

The bending member 162 shown in FIG. 33(a) is a triangular column with projections 162a having a radius R of 0.5 mm formed on the respective corners thereof, and the contact ratio is 10%. The interval S between the adjacent projections 162a is 9.4 mm. The bending member 162 shown in FIG. 33(b) is a triangular column with projections 162b having a radius R of 1.6 mm formed on the respective corners thereof, and the contact ratio is 33%. The interval S between the adjacent projections 162b is 9.4 mm. The bending member 162 shown in FIG. 33(c) is a triangular column with projections 162c having a radius R of 2.5 mm formed on the respective corners thereof, and the contact ratio is 50%. The interval S between the adjacent projections 162c is 5.2 mm. The bending member 162 shown in FIG. 33(d) is a triangular column with projections 162d having a radius R of 3.3 mm formed on the respective corners thereof, and the contact ratio is 66%. The interval S between the adjacent projections 162d is 3.6 mm. The above described FIGS. 29 and 30 show the cases in which the bending members shown in FIGS. 33(a) through (d) are used.

Figure 34A:
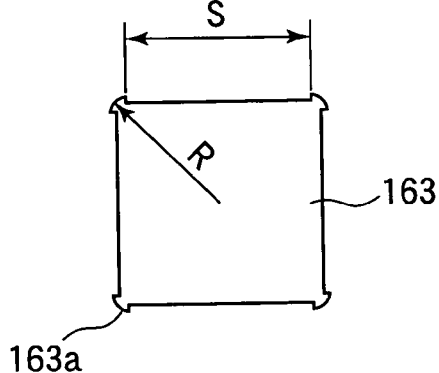
FIGS. 34(a), (b), (c) and (d) are plan views respectively showing four kinds of bending members in the form of approximately square column.
Figure 34B:
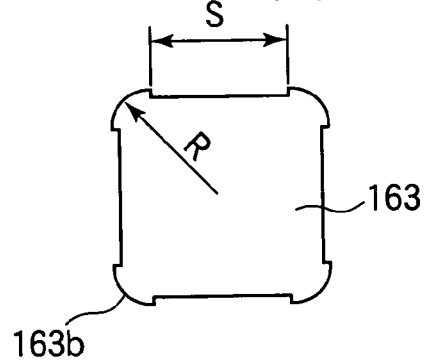
Figure 34C:
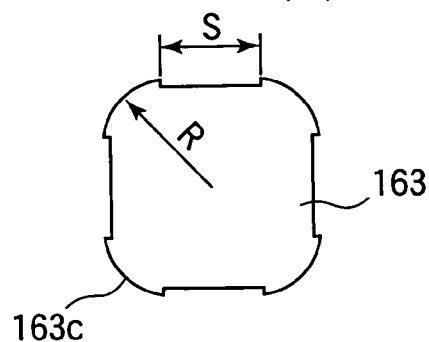
Figure 34D:
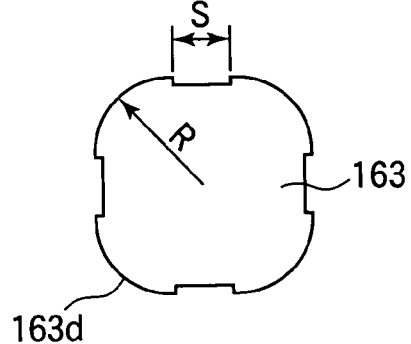

Similarly, the bending member 163 shown in FIG. 34(a) is a rectangular column with projections 163a having a radius R of 0.5 mm formed on the respective corners thereof, and the contact ratio is 10%. The interval S between the adjacent projections 163a is 7.1 mm. The bending member 163 shown in FIG. 34(b) is a rectangular column with projections 163b having a radius R of 1.6 mm formed on the respective corners thereof, and the contact ratio is 33%. The interval S between the adjacent projections 163b is 5.3 mm. The bending member 163 shown in FIG. 34(c) is a rectangular column with projections 163c ehaving a radius R of 2.5 mm formed on the respective corners thereof, and the contact ratio is 50%. The interval S between the adjacent projections 163c is 3.9 mm. The bending member 163 shown in FIG. 34(d) is a rectangular column with projections 163d having a radius R of 3.3 mm formed on the respective corners thereof, and the contact ratio is 66%. The interval S between the adjacent projections 163d is 2.7 mm.

Figure 35A:
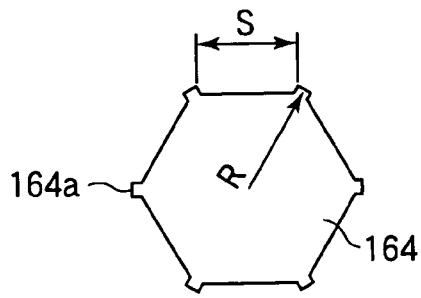
FIGS. 35(a), (b), (c) and (d) are plan views respectively showing four kinds of bending members in the form of approximately hexagonal column.
Figure 35B:
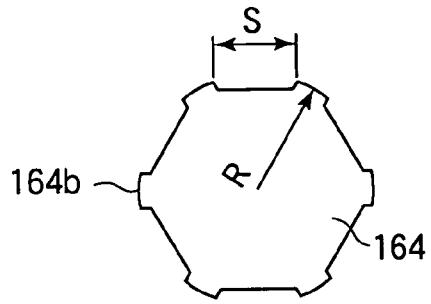
Figure 35C:
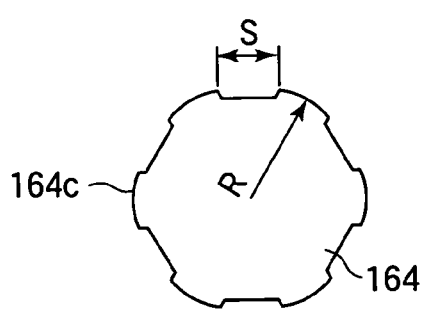
Figure 35D:
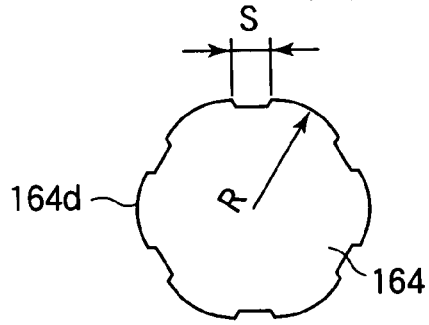

Similarly, the bending member 164 shown in FIG. 35(a) is a hexagonal column with projections 164a having a radius R of 0.5 mm formed on the respective corners thereof, and the contact ratio is 10%. The interval S between the adjacent projections 164a is 4.7 mm. The bending member 164 shown in FIG. 35(b) is a hexagonal column with projections 164b having a radius R of 1.6 mm formed on the respective corners thereof, and the contact ratio is 33%. The interval S between the adjacent projections 164b is 3.6 mm. The bending member 164 shown in FIG. 35(c) is a hexagonal column with projections 164c having a radius R of 2.6 mm formed on the respective corners thereof, and the contact ratio is 50%. The interval S between the adjacent projections 164c is 2.6 mm. The bending member 164 shown in FIG. 35(d) is a hexagonal column with projections 164d having a radius R of 3.3 mm formed on the respective corners thereof, and the contact ratio is 66%. The interval S between the adjacent projections 164d is 1.8 mm.

Figure 36A:
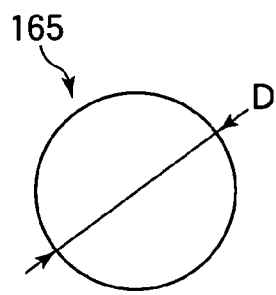
FIGS. 36(a), (b), (c) and (d) are plan views respectively showing four kinds of bending members in the form of approximate cylinder.

The bending member 165 shown in FIG. 36(a) is a cylinder having a diameter D of 10 mm, and the contact ratio is 100%. The bending member 165 shown in FIG. 35(b) is a cylinder having a diameter D of 10 mm on which 20 projections 165b having a width W1 of 0.52 mm are formed at a pitch of 1.56 mm, and the contact ratio is 33%. The width W2 of the groove between the adjacent projections 165b is 1.05 mm. The bending member 165 shown in FIG. 35(c) is a cylinder having a diameter D of 10 mm on which 20 projections 165c having a width W1 of 0.78 mm are formed at a pitch of 1.56 mm, and the contact ratio is 50%. The width W2 of the groove between the adjacent projections 165c is 0.78 mm. The bending member 165 shown in FIG. 35(d) is a cylinder having a diameter D of 10 mm on which 20 projections 165d having a width W1 of 1.05 mm are formed at a pitch of 1.56 mm, and the contact ratio is 66%. The width W2 of the groove between the adjacent projections 165d is 0.52 mm.

Figure 37:
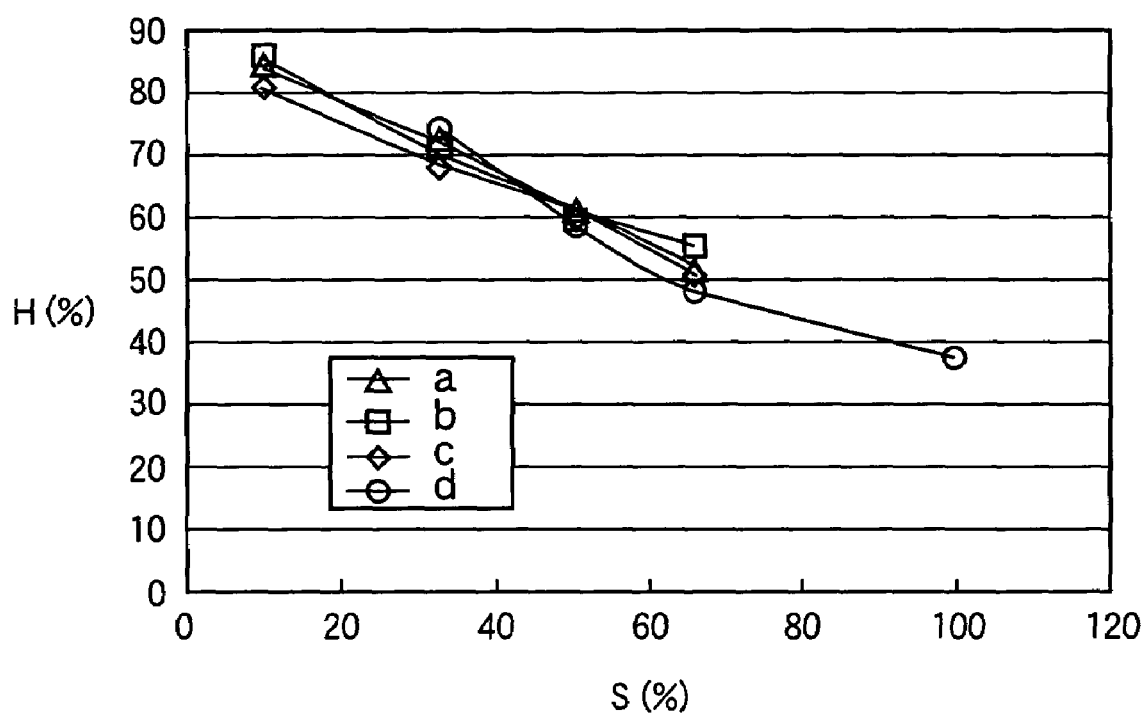
FIG. 37 is a graph showing a relationship between the contact ratio and the displacement ratio, which corresponds to Table 4.

Using these bending members 162 through 165, the displacement of the movable end of the shape memory alloy member 2 is measured as shown in FIGS. 32(a) through (d). The result is shown in Table 4 and FIG. 37. In FIG. 37, the vertical axis indicates the displacement ratio H, and the horizontal axis indicates the contact ratio S (%). Moreover, in FIG. 37, marks a, b, c and d respectively indicate the results of the experiments shown in FIGS. 32(a), (b), (c) and (d).

TABLE 4

| CONTACT RATIO (%) | DISPLACEMENT RATIO (%) | | | |
| --- | --- | --- | --- | --- |
| | TRIANGULAR COLUMN | RECTANGULAR COLUMN | HEXAGONAL COLUMN | CYLINDER |
| 10 | 84.2 | 85.7 | 80.5 | — |
| 33 | 72.1 | 70.5 | 68.1 | 73.7 |
| 50 | 61.9 | 60.7 | 60.9 | 58.6 |
| 67 | 52.2 | 55.2 | 51 | 48 |
| 100 | — | — | — | 37.6 |

Based on Table 4 and FIG. 37, it is understood that the amount of displacement of the shape memory alloy member 2 does not depend on the shape of the bending members 162 through 165 (triangular column, rectangular column or the like), but depends on the contact ratio S. Further, it is understood that the amount of displacement becomes larger, as the contact ratio S becomes smaller. Therefore, it is understood that it is preferable to chose the bending member 162 (FIG. 33) having a triangular cross section with small number of sides, in order to increase the amount of displacement of the shape memory alloy member 2 and to increase the width of the contact portion (for preventing the melting due to the heat of the shape memory alloy member 2).

As described above, according to the driving device 161 (FIG. 30) of this embodiment, since the bending member is approximately in the form of a multangular column, it is possible to suppress the decrease in the amount of displacement of the movable body 3 and to chose the width of the contact portion so as to prevent the melting. Thus, the melting of the projection of the bending member can be prevented, while the decrease in the amount of displacement of the movable body 3 can be suppressed and the space efficiency can be enhanced. That is, the downsizing of the driving device can be accomplished.

Embodiment 13

Figure 38A:
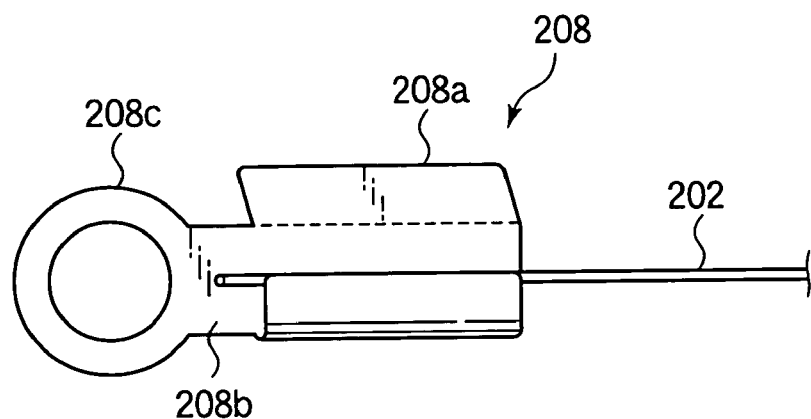
FIGS. 38(a) and (b) are views for illustrating steps of a method for fixing a shape memory alloy member according to Embodiment 13 of the present invention to a crimp contact, and FIGS. 38(c) and (d) are views for illustrating another example of the steps.
Figure 38B:
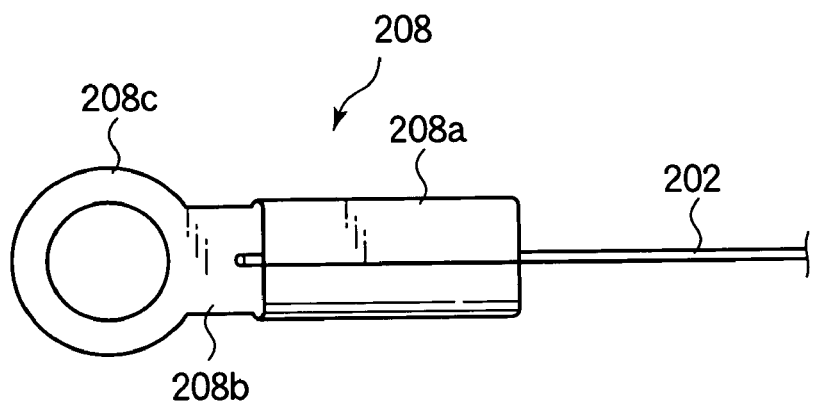
Figure 38C:
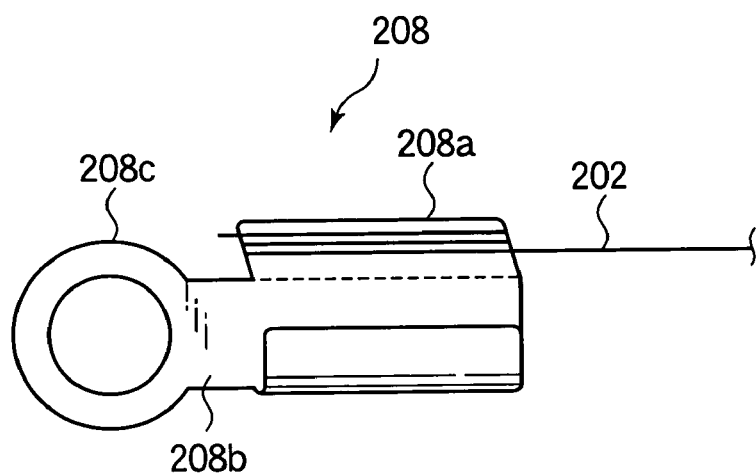
Figure 38D:
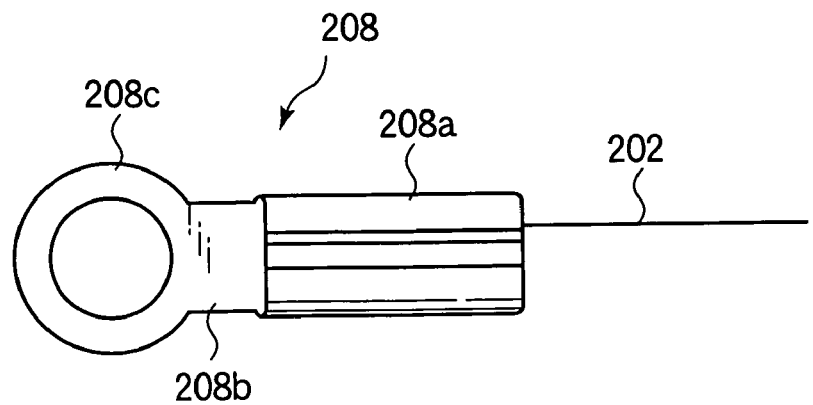
Figure 39:
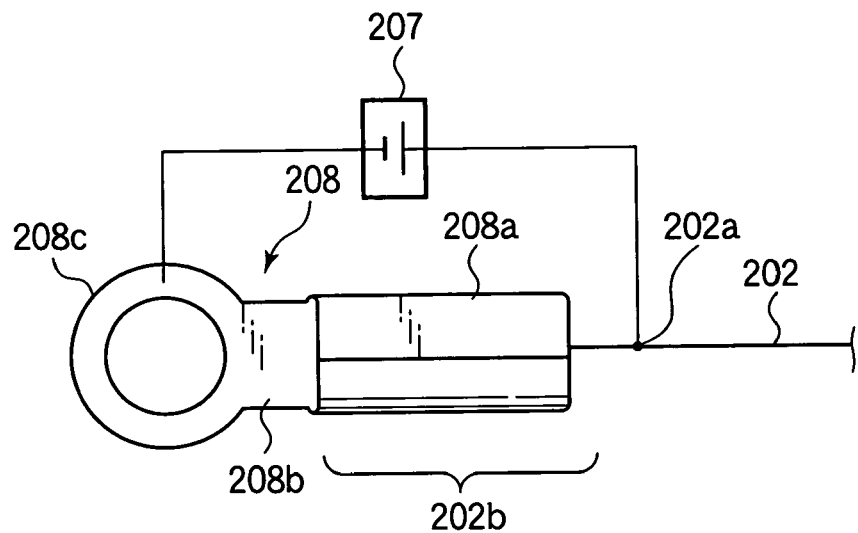
FIG. 39 is a view for illustrating the following step succeeding to the step shown in FIG. 38(b) or FIG. 38(d)

FIG. 38 and 39 are views for illustrating a fixing method (a crimping method) of a shape memory alloy member 202 and a crimp contact 208. The crimp contact 208 is used for fixing an end of the shape memory alloy member 202 to a resilient member (for example, the resilient member 4 shown in FIG. 1), a fixing pin or the like.

As shown in FIG. 38(a), the crimp contact 208 is composed of a plate-like member made of metal. The crimp contact 208 has a base portion 208b approximately in the form of oblong, a ring portion 208c formed on an end in the longitudinal direction of the base portion 208b, and crimp portions 208a formed on both sides in the width direction of the base portion 208b. An end of the shape memory alloy member 202 is placed on almost the center of the base portion 208b of the crimp contact 208, and then the crimp portions 208a are bent as shown in FIG. 38(b), so that the shape memory alloy member 202 and the crimp contact 208 are fixed (crimped) to each other. Moreover, as shown in FIG. 38(c), it is also possible to wind the shape memory alloy member 202 around one of the crimp portions 208a, and then bend the crimp portion 208a as shown in FIG. 38(d).

In this embodiment, as shown in FIG. 39, the energizing circuit 207 causes a current to flow between the crimp contact 208 and the shape memory alloy member 202. The energizing circuit 207 is connected to an arbitrary position on the crimp contact 208 (including a part 202b of the shape memory alloy member 202 fixed to the crimp contact 208) and to a position 202a on the shape memory alloy member 202 close to the crimp contact 208. The energizing circuit 207 causes the current (excess current) to flow through the shape memory alloy member 202, and the current is sufficient for heating the shape memory alloy member 202 to a temperature at which the shape memory alloy member 202 loses the memory of the shape. Therefore, on the crimp contact 208 side of the shape memory alloy member 202 with respect to the above described position 202a, the memory of the shape is lost.

The effect of this embodiment is as follows. If the shape memory alloy member 202 is simply fixed to the crimp contact 208, the reliability of the fixed part of the shape memory alloy member 202 and the crimp portion 208a may decreases when the shape memory alloy member 202 is repeatedly expanded and contracted due to the heating and cooling caused by the energizing (or the change in an environmental temperature). In such a case, there is a possibility that the shape memory alloy member 202 may be dropped out of the crimp portion 208a or may be cut. In this embodiment, the part 202b of the shape memory alloy member 202 fixed to the crimp contact 208 loses its memory of shape so that the part 202b is not expanded or contracted, utilizing the characteristics that the shape memory alloy member 202 loses its memory of shape when the shape memory alloy member 202 is heated to a predetermined temperature or higher. As a result, it is possible to enhance the reliability of the connection of the shape memory alloy member 202 and the crimp portion 208a, and to prevent that the shape memory alloy member 202 from being dropped out of the crimp contact 208 or being cut.

Embodiment 14

Figure 40:
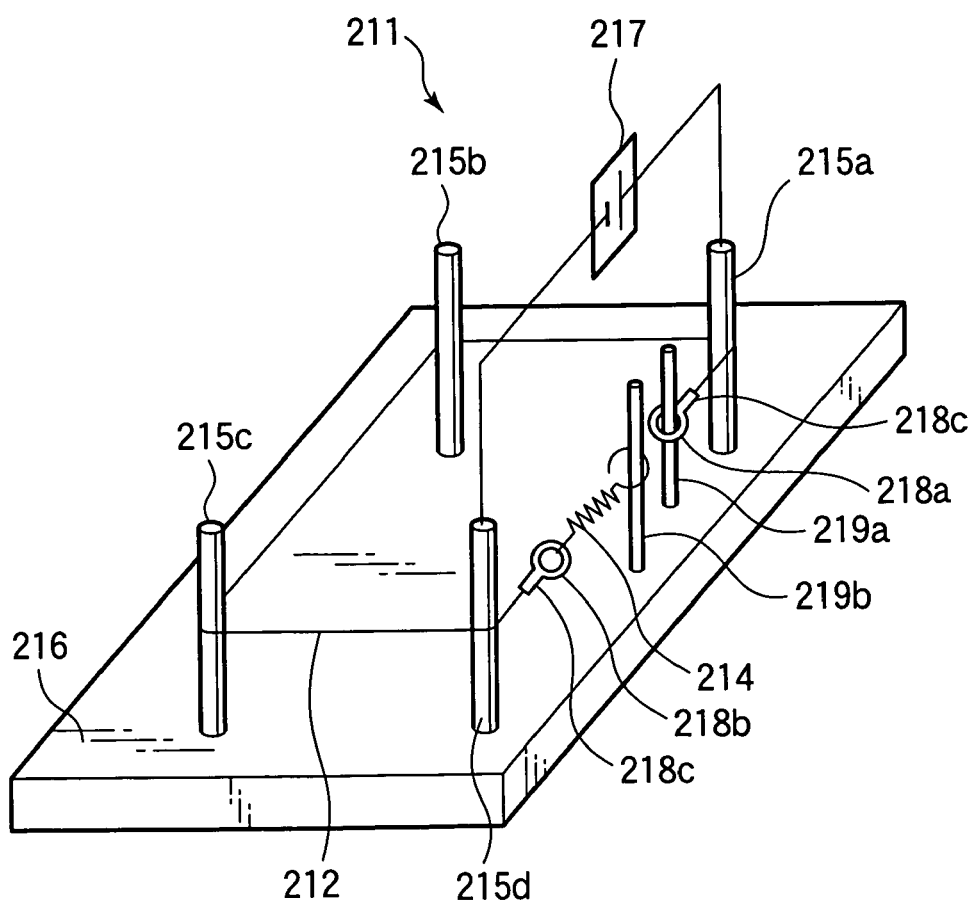
FIG. 40 is a perspective view of a driving device according to Embodiment 14 of the present invention.

FIG. 40 is a perspective view showing a driving device 211 according to Embodiment 14 of the present invention. The driving device 211 shown in FIG. 40 has pin-shaped bending members 215a, 215b, 215c and 215d planted on a base 216 so that the bending members 215a, 215b, 215c and 215d are disposed on four apexes of quadrangle. On the base 216, fixing pins 219a and 219b are planted in this order from the side closer to the bending member 215a. A shape memory alloy member 212 in the form of a wire is wound around the bending members 215a, 215b, 215c and 215d. A crimp contact 218a is fixed to an end (fixed end) of the shape memory alloy member 212, and the crimp contact 218a is fixed to the fixing pin 219a. A crimp contact 218b is fixed to the other end (free end) of the shape memory alloy member 212, and the crimp contact 218b is fixed to an end of a resilient member 214. The other end of the resilient member 214 is fixed to the fixing pin 219b. Among the bending members 215a through 215d, the energizing circuit 217 is connected to the bending member 215a which is the closest from the fixed end (the crimp contact 218a) of the shape memory alloy member 212 and to the bending member 215d which is the closest from the movable end (the crimp contact 218b). Other configuration is the same as Embodiment 1.

Here, the bending members 215a through 215d constitute a bending means which bends the shape memory alloy member 212. Portions of the circumferential surfaces of the bending members 215a through 215d contacting the shape memory alloy member 212 constitute a contact portion of the bending means contacting the shape memory alloy member 212. The base 216 constitutes a holding means which holds the bending members 215a through 215d.

In the above described configuration, the movable body (the crimp contact 218b) can be displaced by causing the current to flow through the shape memory alloy member 212 via the bending members 215a and 215b by means of the energizing circuit 217, so that the shape memory alloy member 212 is heated and contracted. The current flows through a part of the shape memory alloy member 212 between the bending member 215a and the bending member 215d, and does not flow through the crimp contacts 218a and 218b at both ends of the shape memory alloy member 212. Therefore, parts of the shape memory alloy member 212 fixed to crimp portions 218c of the crimp contacts 218a and 218b are not expanded or contracted. As a result, the connection between the crimp contacts 218a and 218b and the shape memory alloy member 212 is enhanced.

Figure 41A:
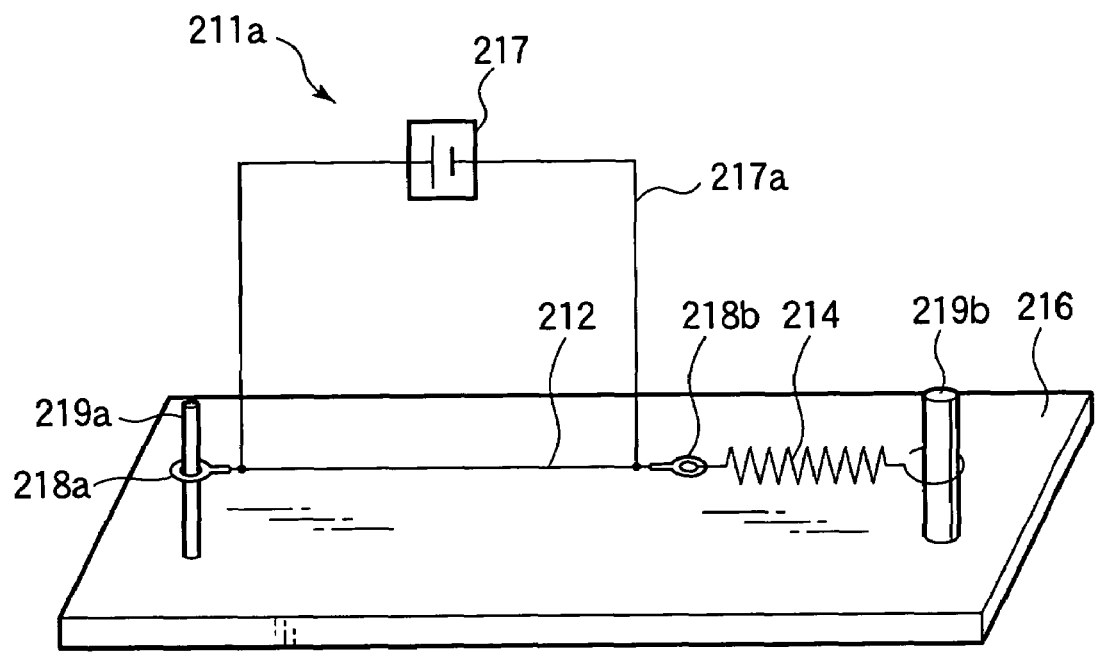
FIG. 41(a) is a perspective view showing a driving device according to a comparative example with respect to Embodiment 14 of the present invention.

In order to verify the effect of this embodiment, a comparative example shown in FIG. 41(a) will be described. In a driving device 211a, a shape memory alloy member 212 is linearly disposed, and crimp contacts 218a and 218b are fixed to both ends of the shape memory alloy member 212. One crimp contact 218a is fixed to a fixing pin 219a planted on a base 126, the other crimp contact 218b is fixed to an end of a resilient member 214. The other end of the resilient member 214 is fixed to a fixing pin 219b planted on the base 216. A wiring portion 217a (for example, a cable) of the energizing circuit 217 is connected to a fixed end (the crimp contact 218a) and a movable end (the crimp contact 218b) of the shape memory alloy member 212. The movable body (the crimp contact 218b) is displaced by causing the current to flow through the shape memory alloy member 212 by means of the energizing circuit 217.

However, in such a driving device 211a, the crimp contact 218b to which the wiring portion 217a of the energizing circuit 217 is connected moves, and therefore it is necessary to provide a space or the like so as to prevent an unnecessary external force from being exerted on the movable body (the crimp contact 218b). Further, there is a possibility that the reliability of the electrical connection (by soldering) between the wiring portion 217a and the crimp contact 218b may decrease.

Figure 41B:
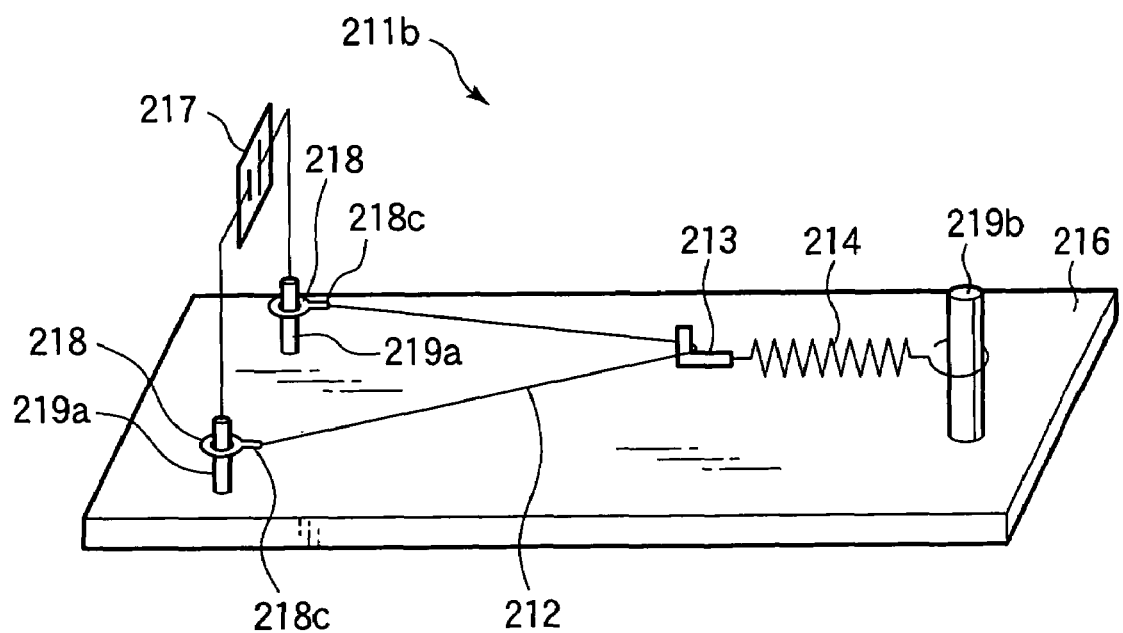
FIG. 41(b) is a perspective view showing a configuration example of the driving device as another comparative example.

Further, in a driving device 211b shown in FIG. 41(b), the shape memory alloy member 212 is bent in V-shape. Crimp contacts 218 are fixed to both ends of the shape memory alloy member 212, and the crimp contacts 218 are fixed to two fixing pins 219a planted on the base 216. A movable body 213 is fixed to a bent portion of V-shape of the shape memory alloy member 212. The movable body 213 is fixed to an end of a resilient member 214, and the other end of the resilient member 214 is fixed to another fixing pin 219b planted on the base 216. An energizing circuit 217 is connected to two fixing pin 219a, and supplies a current to the shape memory alloy member 212 via the fixing pins 219a and the crimp contacts 218.

However, in such a driving device 211b, the current flows through the crimp contacts 218, and therefore portions of the shape memory alloy member 212 fixed to the crimp contacts 218 are repeatedly expanded and contracted, with the result that the reliability of the connecting portion may decrease. Therefore, the problems such as the dropping of the shape memory alloy member 212 out of the crimp contacts 218 and the cutting of the shape memory alloy member 212 may easily occur.

In contrast, in the driving device 211 of this embodiment, the wiring portions of the energizing circuit 217 can be connected to the bending members 215a and 215d, and therefore it is possible to prevent the movable body (the crimp contact 218b) from being influenced by the wiring portions. Therefore, it is not necessary to provide a space or the like around the wiring portions. Thus, it becomes possible to simplify the configuration of the driving device 211, and to accomplish the downsizing of the driving device 211. Further, since the current does not flow through the crimp contacts 218a and 218b, the portions of the shape memory alloy member 212 fixed to the crimp contacts 218a and 218b is not expanded or contracted. Therefore, the reliability of the connection between the crimp contacts 218a and 218b and the shape memory alloy member 212 is enhanced.

Embodiment 15

Figure 42:
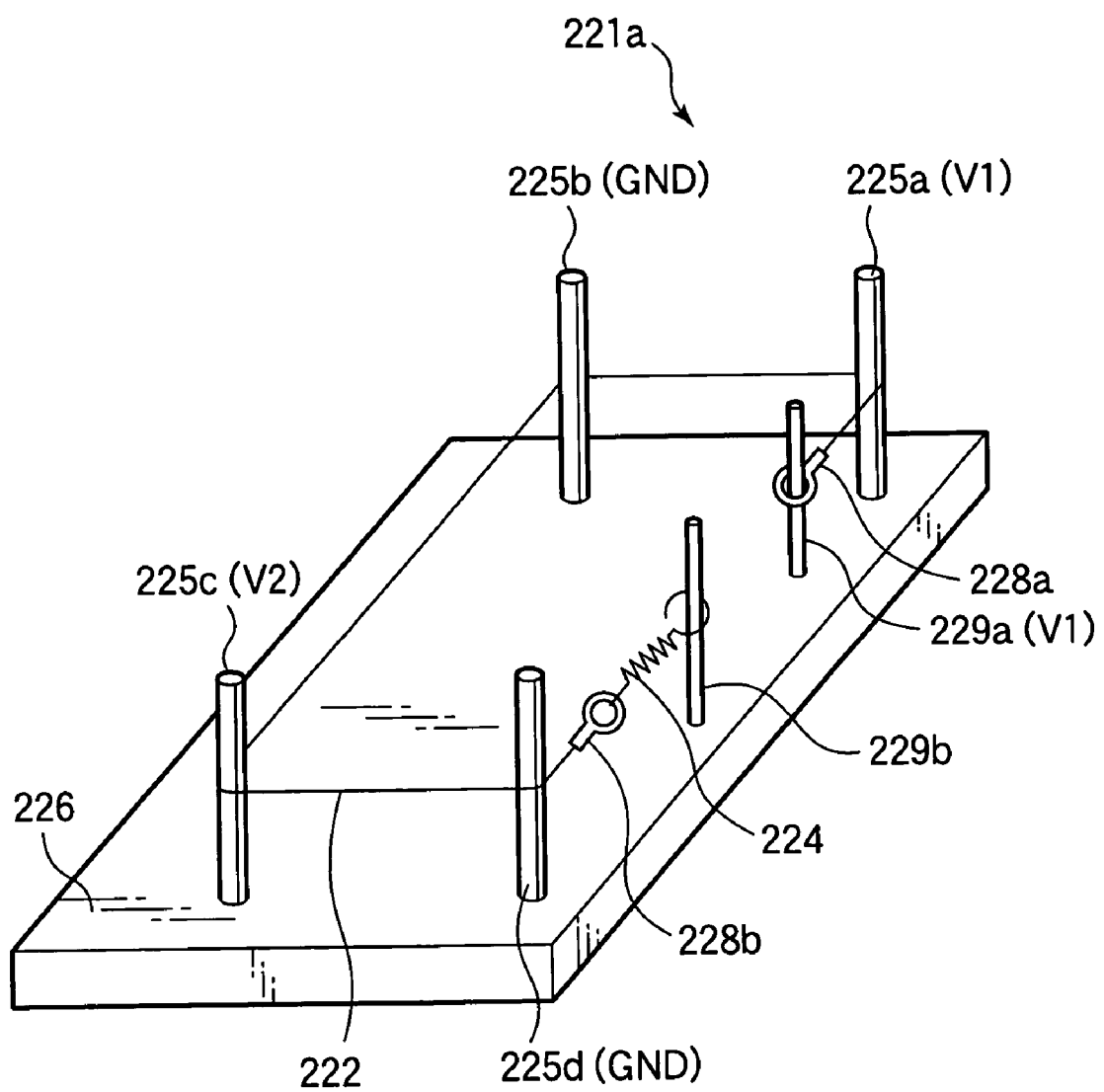
FIG. 42 is a perspective view showing a driving device according to Embodiment 15 of the present invention.

FIG. 42 is a perspective view showing a configuration of a driving device 221a according to Embodiment 15 of the present invention. In the above described Embodiment 14 (FIG. 40), the current is supplied through the bending members 215d and 215a respectively closest from the movable end and the fixed end of the shape memory alloy member 212. In this embodiment, an electric potential V1 is applied to a bending member 225a closest to the fixed end (the crimp contact 228a) of the shape memory alloy member 222, and its adjacent bending member 225b is grounded. Further, an electric potential V2 is applied to a further adjacent bending member 225c, and the bending member 225d closest to the movable end (the crimp contact 228b) of the shape memory alloy member 222 is grounded. The electric potential V1 is applied to a pin 229a to which the crimp contact 228a is fixed, so that a current does not flow through the crimp contact 228a. Other configuration is the same as Embodiment 14.

The bending members 225a through 225d constitute a bending means which bends the shape memory alloy member 222. Portions of the circumferential surfaces of the bending members 225a through 225d contacting the shape memory alloy member 222 constitute a contact portion of the bending means contacting the shape memory alloy member 222.

In the above described configuration, the current flows through a section of the shape memory alloy member 222 from the bending member 225c to the bending member 225b, a section from the bending member 225c to the bending member 225d, and a section from the bending member 225a to the bending member 225b. As a result, each section of the shape memory alloy member 222 is heated and contracted, so that the movable body (the crimp contact 228b) is displaced.

That is, the current does not flow uniformly throughout the shape memory alloy member 222, but flows respective sections independently. The resistance to the current flowing through the respective sections of the shape memory alloy member 222 is smaller than the case where the current flows uniformly. Therefore, even in the case of obtaining the same current to that of Embodiment 14, the required voltage can be reduced.

Further, it becomes possible to select a portion through which the current flows. For example, by setting the voltage applied to the bending member 225a to 0, the current flows through two sides of the shape memory alloy member 222 (between the bending members 225b and 225c and between the bending members 225c and 225d). With such an arrangement, only a portion of the shape memory alloy member 202 through which the current flows is expanded and contracted, and therefore it becomes to chose the amount of the displacement of the movable body (the crimp contact 228b).

In a configuration in which the amount of displacement is varied by causing the current flows partially in the longitudinal direction of the shape memory alloy member, the method of electrical supply by supplying electricity via the contact between the shape memory alloy member and the electric supply member such as pins (here, the bending members 225a through 225b) is effective. There is another considerable method in which lead wires are attached to the shape memory alloy member. However, in such a case, it is necessary to attach a multiple lead wires in order to increase the variation of the amount of displacement. Thus, in order to prevent the shape memory alloy member from being influenced by the external force, it is necessary to provide a large space for disposing the lead wires, and therefore the downsizing of the driving device becomes difficult. Further, if crimp contacts are used (in the case where the reliability of the soldering of the shape memory alloy member is not high), there is a problem that a large space is needed as the number of the crimp contacts increases. In contrast, in this embodiment, the method of supplying electricity via pin-shaped bending members 225a through 225d contacting the shape memory alloy member 222 is employed, it is not necessary to attach a multiple lead wires. Therefore, it is possible to enable the selection of the amount of displacement, and to accomplish the downsizing of the driving device.

In this embodiment, the shape memory alloy member 222 is wounded around the pin-shaped bending members 225a through 225d (electrical supply members) at about 90 degrees for each. However, the winding angle is not limited to about 90 degrees. Further, the bending members 225a through 225 are not limited to the pin-shape. Further, spring contacts or other contacts can be used to connect the shape memory alloy member 222 and the electrical supply members for electrical supply. With these arrangement, it is possible to accomplish the downsizing of the driving device.

Figure 43:
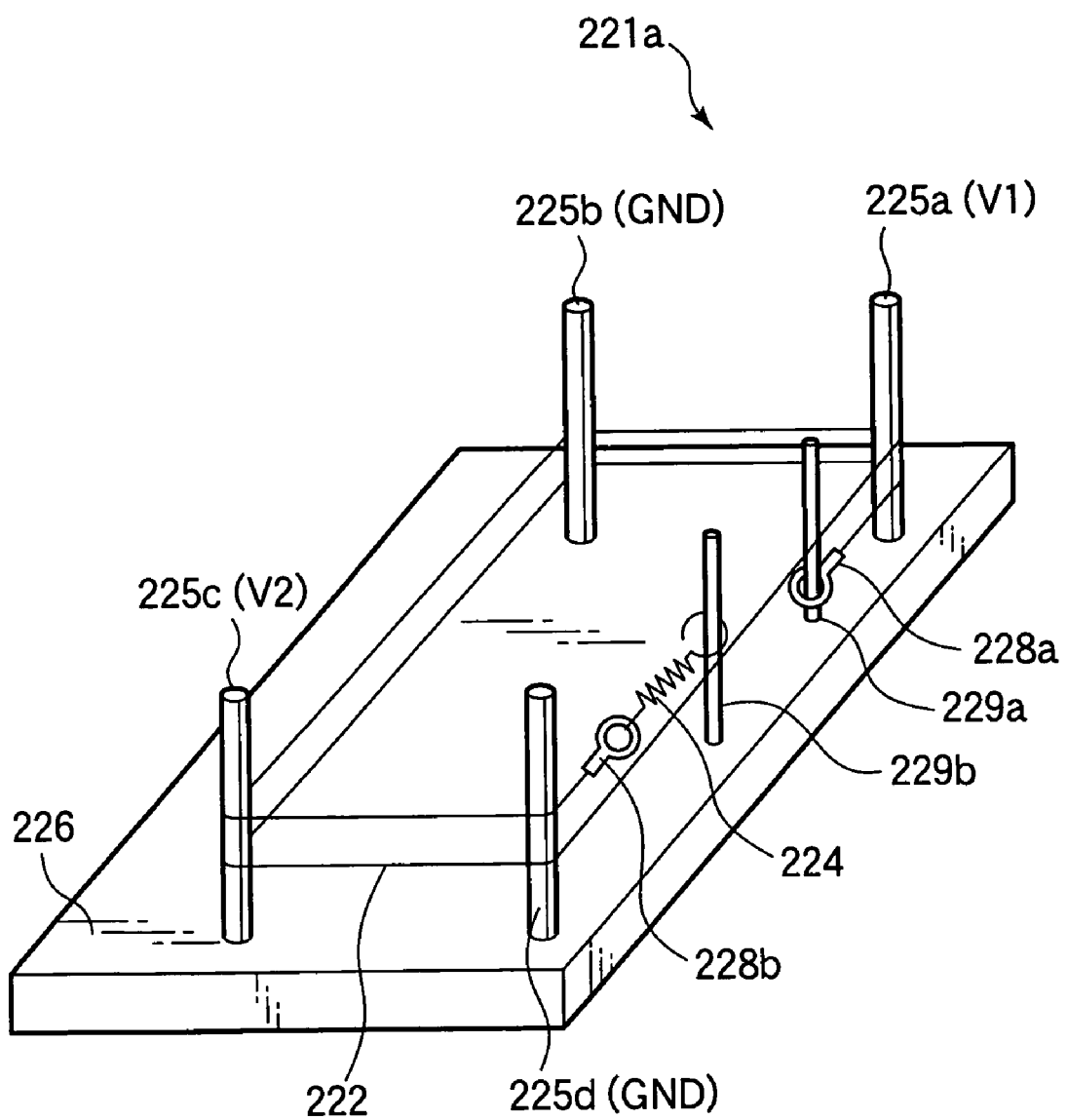
FIG. 43 is a perspective view showing another configuration example of the driving device according to Embodiment 15 of the present invention.

Moreover, as shown in FIG. 43, in the case where the shape memory alloy member 222 is wound around the bending members 225a through 225d in a plurality of turns, the current flows the same sections (between the bending members 225a and 225b) of the shape memory alloy member 222 in parallel. Therefore, it is possible to provide the same electrical supply as the case in which the shape memory alloy member 222 is wound around the bending members 225a through 225d in one turn (FIG. 42). Further, since the entire length of the shape memory alloy member 222 can be increased, it is possible to obtain a sufficient amount of displacement of the movable body (the crimp contact 228b) even when the deriving device 221b is downsized.

As described above, according to this embodiment, since the current flows through the respective sections of the shape memory alloy member 222, it becomes possible to suppress the voltage to be low, and to enable the choosing of the amount of displacement of the movable body. Particularly, in a portable terminal such as a mobile phone device in which the available voltage is generally limited to be low, the driving device according to this embodiment (operable at low voltage and suitable for downsizing) is greatly valuable.

Embodiment 16

Figure 44:
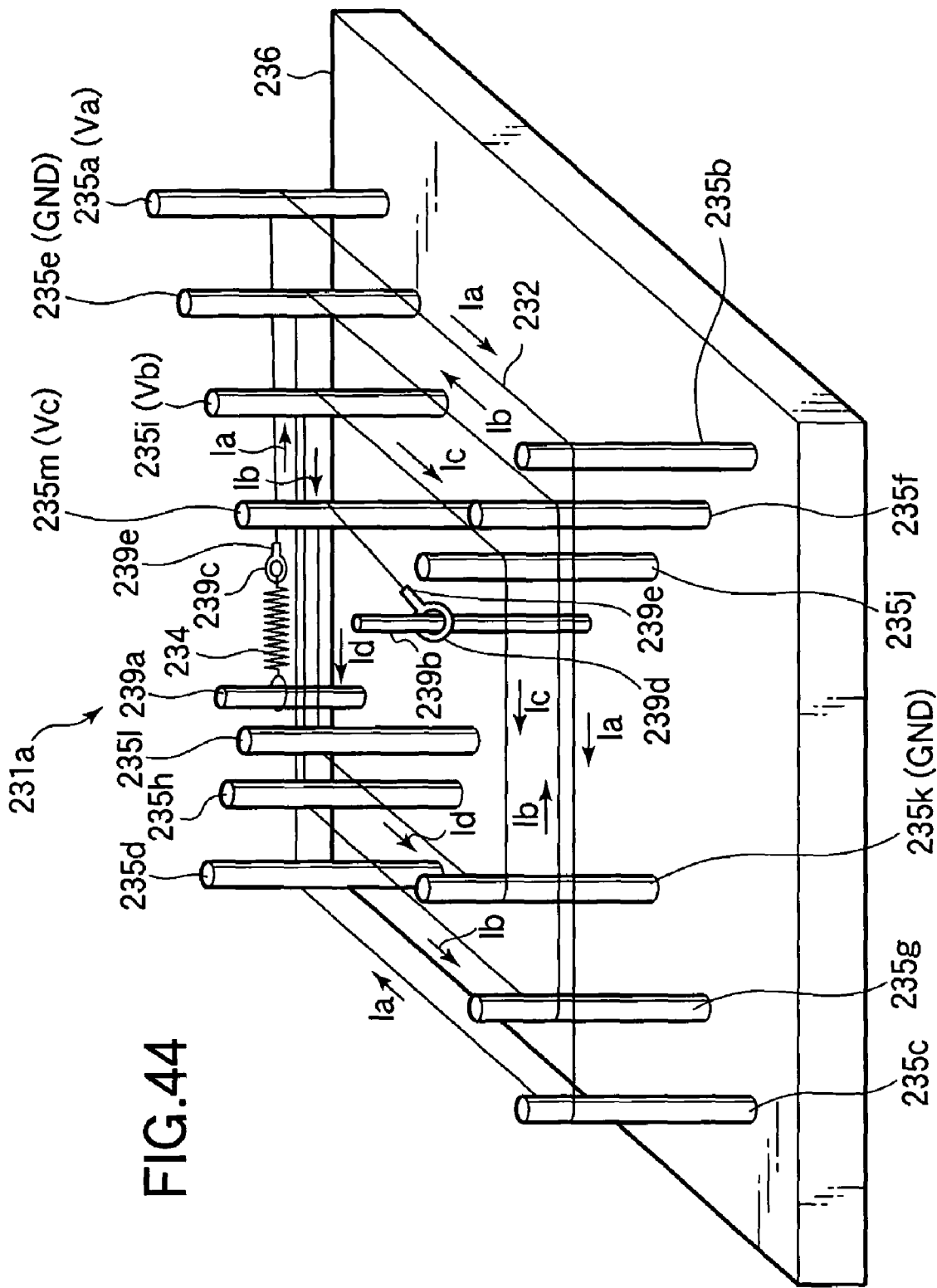
FIG. 44 is a perspective view showing a driving device according to Embodiment 16 of the present invention.

FIG. 44 is a perspective view showing a driving device 231a according to Embodiment 16 of the present invention. In the above described Embodiment 14, the current flows uniformly throughout the entire length of the shape memory alloy member 212. In contrast, in this embodiment, the current varies with sections of the shape memory alloy member 232. This is based on the consideration that a friction load applied to the shape memory alloy member 232 due to the contact with the other components (in addition to the urging force of the resilient member 234) varies according to the position in the longitudinal direction of the shape memory alloy member 232.

Figure 36B:
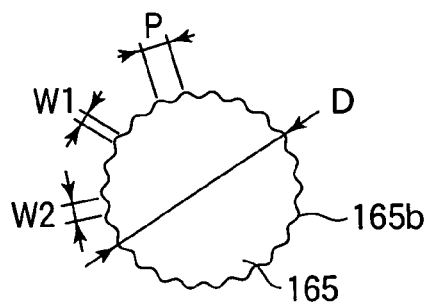
Figure 36C:
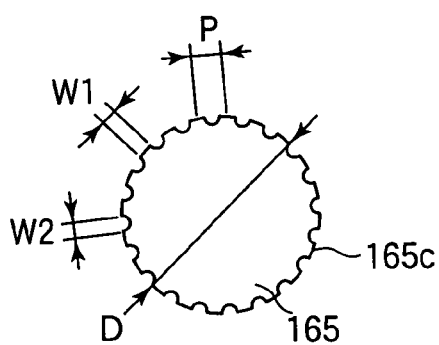
Figure 36D:
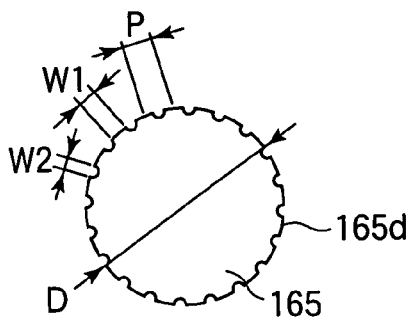
Figure 45:
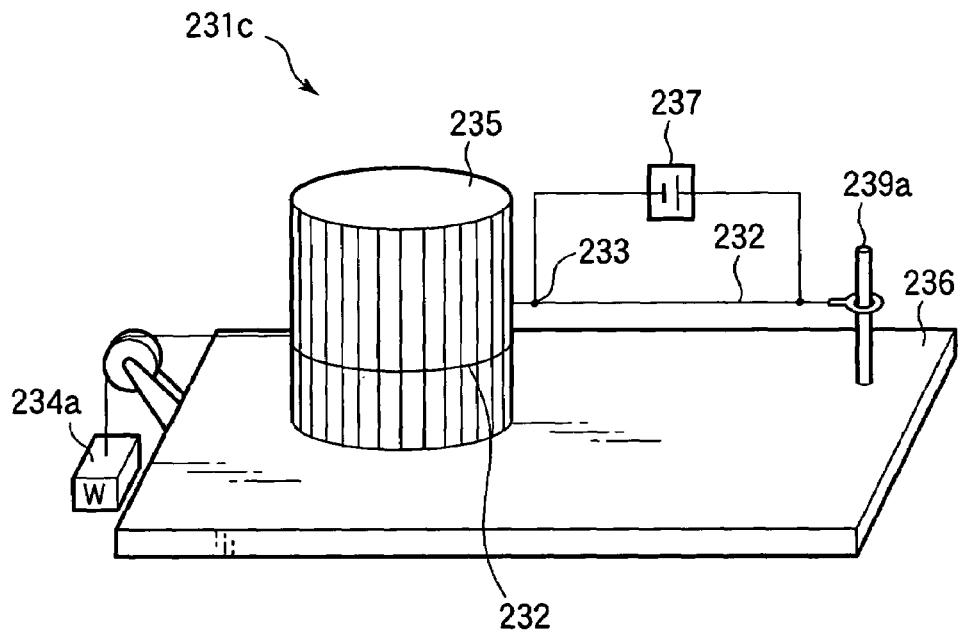
FIG. 45 is a perspective view showing an experiment on the driving device according to Embodiment 16 of the present invention.
Figure 46:
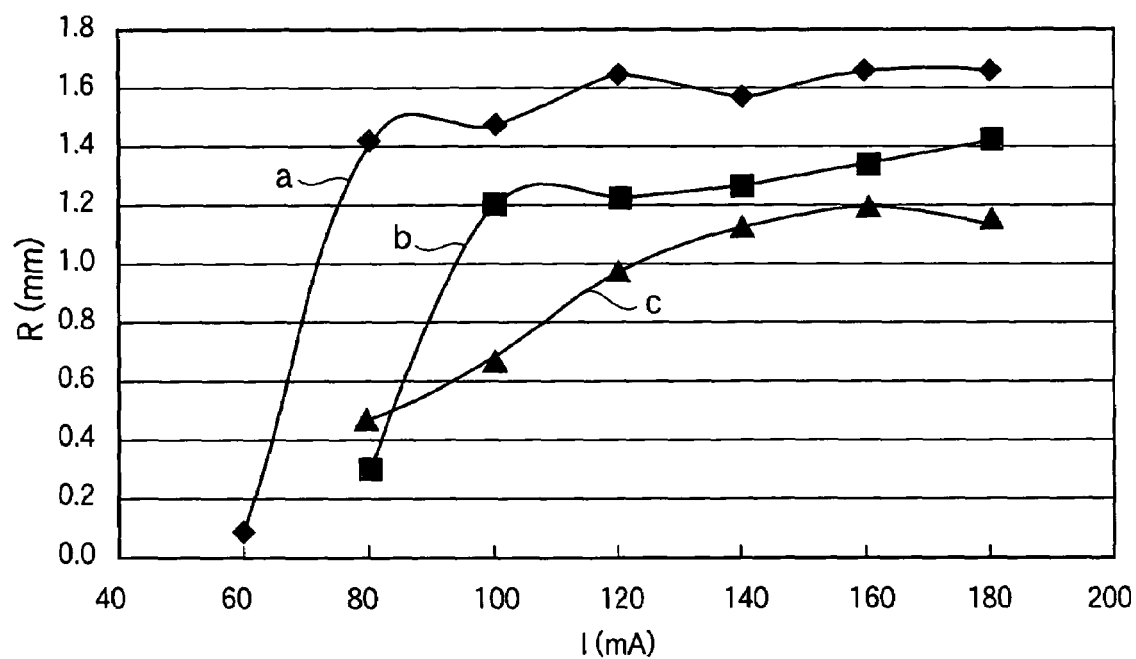
FIG. 46 is a graph showing a result of the experimental shown in FIG. 45, which corresponds to Table 5.

An experiment providing the basis of this embodiment will be described. In the experiment shown in FIG. 45, the shape memory alloy member 232 in the form of a wire is wound around a cylindrical bending member 235 having a contact ratio of 33%. An energizing circuit 237 causes a current to flow only a straight portion of the shape memory alloy member 232 (a portion not wound around the bending member 235). The length of the energized portion of the shape memory alloy member 232 is set to be 50 mm. An end (fixed end) of the energized portion of the shape memory alloy member 232 is fixed to the fixing pin 239a. The amount of displacement of the other end (a movable end 233) of the energized portion is measured. Instead of a resilient member, a weight 234a which weighs 30 g is fixed to the movable end of the shape memory alloy member 232 in order to prevent the change of the load. The bending member 235 is made of POM, and is an approximately cylindrical member having a diameter of 10 mm whose contact ratio is 33% as shown in FIG. 36(b). In order to evaluate the influence of the friction load by winding the shape memory alloy member 232 around the bending member 235, the experiment is carried out in a state where the shape memory alloy member 232 is wound around the bending member 235 in one turn (360 degrees), two turns (720 degrees) and three turns (1080 degrees). As the number of windings increases, the friction load becomes large. Table 5 and FIG. 46 show the result of the measurement of the amount R of displacement of the above described movable end 233 when the current value is varied from 60 mA to 180 mA. In FIG. 46, the vertical axis indicates the amount R (mm) of displacement of the above described movable end 233 of the shape memory alloy member 232, and the horizontal axis indicates a current I (mA) flowing through the shape memory alloy member 232. Moreover, marks a, b and c respectively correspond to data when the shape memory alloy member 232 is wound in one turn (360 degrees), two turns (720 degrees), and three turns (1080 degrees).

TABLE 5

| WINDING ANGLE | CURRENT VALUE (mA) | | | | | | |
| --- | --- | --- | --- | --- | --- | --- | --- |
| (degree) | 60 | 80 | 100 | 120 | 140 | 160 | 180 |
| 360 | 0.097 | 1.420 | 1.473 | 1.637 | 1.581 | 1.662 | 1.662 |
| 720 | — | 0.294 | 1.195 | 1.225 | 1.265 | 1.344 | 1.423 |
| 1080 | — | 0.468 | 0.672 | 0.976 | 1.118 | 1.203 | 1.145 |

Based on Table 5 and FIG. 46, in the case (a) where the shape memory alloy member 232 is wound in one turn, it is understood that there is an extreme point at about 80 mA of current I, and the amount R of displacement does not change greatly when the current exceeds 80 mA. Moreover, in the case (b) where the shape memory alloy member 232 is wound in two turns, it is understood that there is an extreme point at about 100 mA of current I, and the amount R of displacement does not change greatly when the current exceeds 100 mA. In the case (c) where the shape memory alloy member 232 is wound in three turns, it is understood that there is an extreme point at about 160 mA of current, and the amount R of displacement does not change greatly when the current exceeds 160 mA. Based on this result, it is understood that it is possible to suppress the power consumption of the driving device 231, and to obtain the almost maximum amount of displacement, by choosing the optimum current according to the frictional force.

Based on this result, the driving device 231a according to this embodiment will be described. As shown in FIG. 44, in the driving device 231a according to this embodiment, four bending members 235a, 235b, 235c and 235d are disposed on a base 236 respectively on positions corresponding to four tops of a rectangle. Inside the bending members 235a through 235d, four bending members 235e, 235f, 235g and 235h are disposed. Inside the bending members 235e through 235h, four bending member 235i, 235j, 235k and 235l are disposed. At a substantial center of the base 236, a thirteenth bending member 235m and a fixing pin 239b are disposed.

The shape memory alloy member 232 in the form of a wire is wound around the total thirteen bending members 235a through 235m on the base 236. That is, the shape memory alloy member 232 is wound around the most outside bending members 235a through 235d, then wound around the inside bending members 235e through 235h, then wound around further inside bending members 235i through 235l, and bent at the bending member 235m. A crimp contact 239d is fixed to an end (fixed end) of the shape memory alloy member 232, and the crimp contact 239d is fixed to an end of a resilient member 234 in the vicinity of the outer periphery of the base 236. The other end the resilient member 234 is fixed to a fixing pin 239a planted on the base 236.

The bending member 235a through 235m constitute a bending means which bends the shape memory alloy member 232. Portions of the circumferential surfaces of the bending members 235a through 235m contacting the shape memory alloy member 232 constitute a contact portion of the bending means contacting the shape memory alloy member 232. The base 236 constitutes a holding means which holds the bending members 235a through 235m.

An electric potential Va is applied to the bending member 235a closest to the movable end of the shape memory alloy member 232. The bending member 235e at a position where the shape memory alloy member 232 is wound in one turn with respect to the bending member 235a is grounded. In addition, an electric potential Vb is applied to the bending member 235i at a position where the shape memory alloy member 232 is wound in two turns with respect to the bending member 235a. The bending member 235k at the position where the shape memory alloy member 232 is wound in two turns and half is grounded. An electric potential Vc is applied to the bending member 235m closest to a fixed end of the shape memory alloy member 232. As a result, a current Ia flows through the section from the bending member 235a to the bending member 235e of the shape memory alloy member 232. A current Ib flows through the section from the bending member 235i to the bending member 235e. Moreover, a current Ic flows through the section from the bending member 235i to the bending member 235k. A current Id flows through the section from the bending member 235m to the bending member 235k. A conductive coil spring is used as the resilient member 234 so that the same voltage (Va) as the bending member 235a is applied to the fixing pin 239a, in order to prevent the current from flowing through the crimp contact 239c. Moreover, the same voltage (Vc) as the bending member 235m is applied to the fixing pin 239b, in order to prevent the current from flowing through the crimp contact 239d. Since the current does not flow through the crimp contacts 239c and 239d as described above, the shape memory alloy member 232 is not expanded and contracted at crimp portions 239e of the crimp contacts 239c and 239d, and therefore the reliability of the connection is enhanced.

In the shape memory alloy member 232, the friction load when the current flows becomes smaller, as the portion is closer to the movable end (the crimp contact 239c). Moreover, as the section through which the current flows is long, the amount of displacement caused by the same current is large, and therefore the necessary current becomes small with regard to the same friction load. In the section from the bending member 235a to the bending member 235e (the section where the current Ia flows), the friction load is larger and the section length is shorter, compared with the section from the bending member 235e to the bending member 235i (the section where the current Ib flows), and therefore the current Ib is set larger than the current Ia. Referring to the experiment result of FIG. 46, the current Ia is set to, for example, 80 mA, and the current Ib is set to, for example, 100 mA. Further, in the section from the bending member 235i to the bending member 235k (the section where the current Ic flows), the friction load is larger and the section length is shorter, compared with the section from the bending member 235e to the bending member 235i (the section where the current Ib flows), and therefore the current Ic is set larger than the current Ib. Furthermore, in the section from the bending member 235m to the bending member 235k (the section where the current Id flows), the friction load is larger and the section length is almost the same, compared with the section from the bending member 235i to the bending member 235k (the section where the current Ic flows), and therefore the current Id is larger than or equals to the current Ic. Referring to the experiment result of FIG. 46, the current Ic and Id are set to, for example, 160 mA.

As described above, by changing the value of the current flowing through the shape memory alloy member 232 in consideration of the friction load according to the winding position of the shape memory alloy member 232, it is possible to suppress a power consumption, and to obtain the maximum amount of displacement.

In the configuration shown in FIG. 44, although the movable end 239c (and the resilient member 234) is disposed on the outermost side, the fixed end 239d can be disposed on the outermost side and the movable end 239c on the innermost side. However, it is possible to obtain larger displacement at a low power consumption, when the movable end 239c is disposed on the outermost side. This is because, when the movable end 239c is disposed on the outermost side, the length of the outer portion of the shape memory alloy member 232 becomes longer (and therefore the amount of displacement becomes larger), and the summation of the load applied by the resilient member 234 and the friction load applied by the bending members becomes relatively small (with respect to the amount of displacement), so that the required current for obtaining the desired amount of displacement can be reduced.

Figure 47:
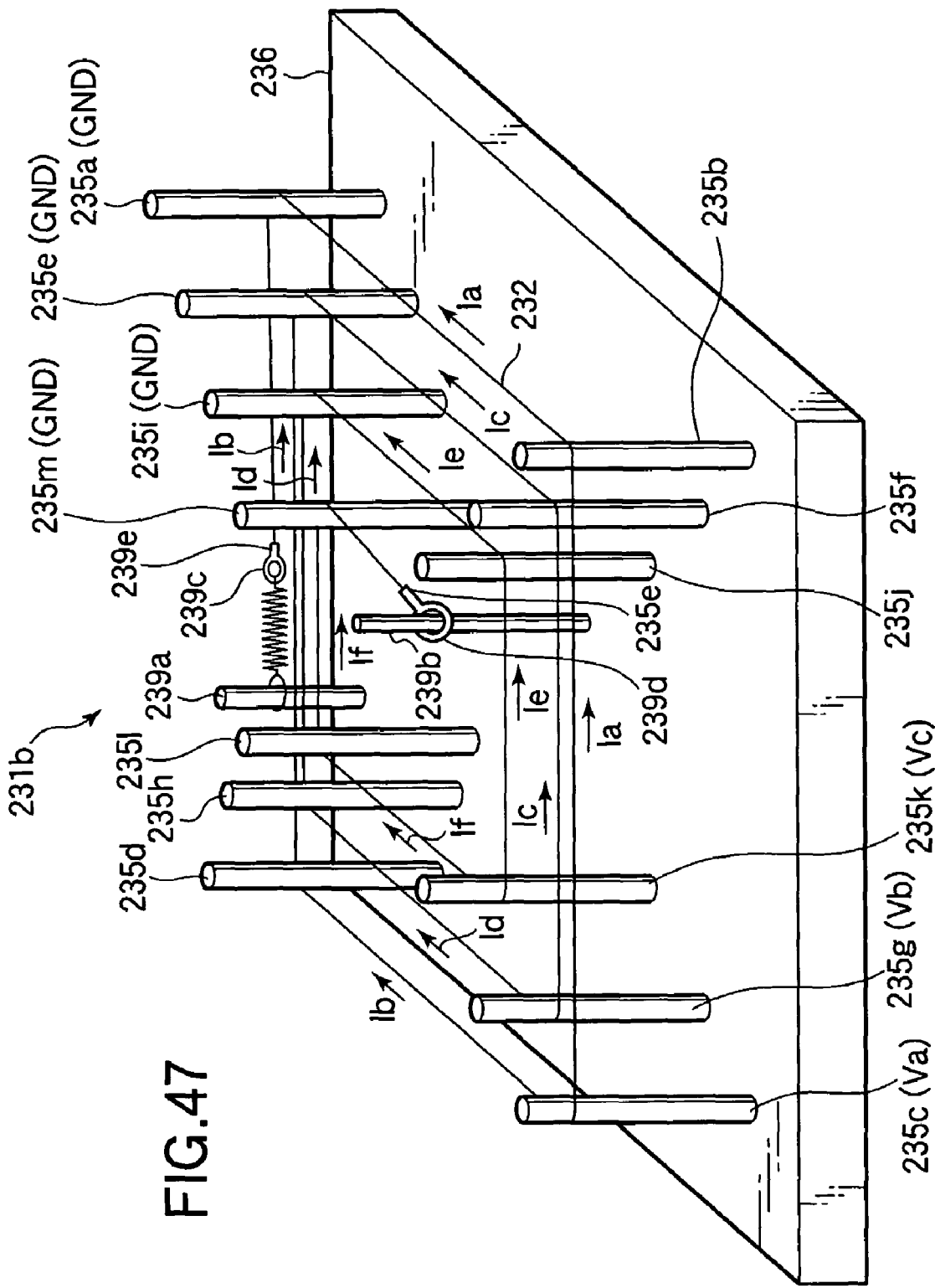
FIG. 47 is a perspective view of another configuration example of the driving device according to Embodiment 16 of the present invention.

FIG. 47 is a perspective view showing another example of electric supply according to this embodiment. In the example shown in FIG. 47, the bending member 235a is grounded, and an electric potential Va is applied to the bending member 235c at a position where the shape memory alloy member 232 is wound a half. Similarly, the bending member 235e at a position where the shape memory alloy member 232 is wound in one turn is ground. An electric potential Vb is applied to the bending member 235g of the position where the shape memory alloy member 232 is wound in one turn and a half. In addition, the bending member 235i at a position where the shape memory alloy member 232 is wound in two turns is grounded. An electric potential Vc is applied to the bending member 235k at a position where the shape memory alloy member 232 is wound in two turns and half. In addition, the bending member 235i at a position where the shape memory alloy member 232 is wound in three turns is grounded. As a result, the current Ia flows from the bending member 235c to the bending member 235a, and the current Ib flows from the bending member 235c to the bending member 235e. Moreover, the current Ic flows from the bending member 235g to the bending member 235e, and the current Id flows from the bending member 235g to the bending member 235i. In addition, the current Ie flows from the bending member 235k to the bending member 235i, and the current If flows from the bending member 235k to the bending member 235m. The values of the respective current can be set as $Ia \leq Ib \leq Ic \leq Id \leq Ie \leq If$. For example, based on the experimental result of FIG. 46, the current Ia and the current Ib can be set to about 80 mA, the current Ic and the current Id can be set to about 100 mA, and the current Ie and the current If can be set to about 160 mA. In the example shown in FIG. 47, both of a constant voltage circuit and a constant current circuit can be used as a power supply circuit.

Moreover, instead of causing the current Ia through If to flow, it is possible to cause the current to partially flow. With respect to the entire length of the shape memory alloy member 232, a part where the current flows and a part where the current does not flow can be selectable, so that the amount of the displacement of the shape memory alloy member 232 can be varied.

Figure 48:
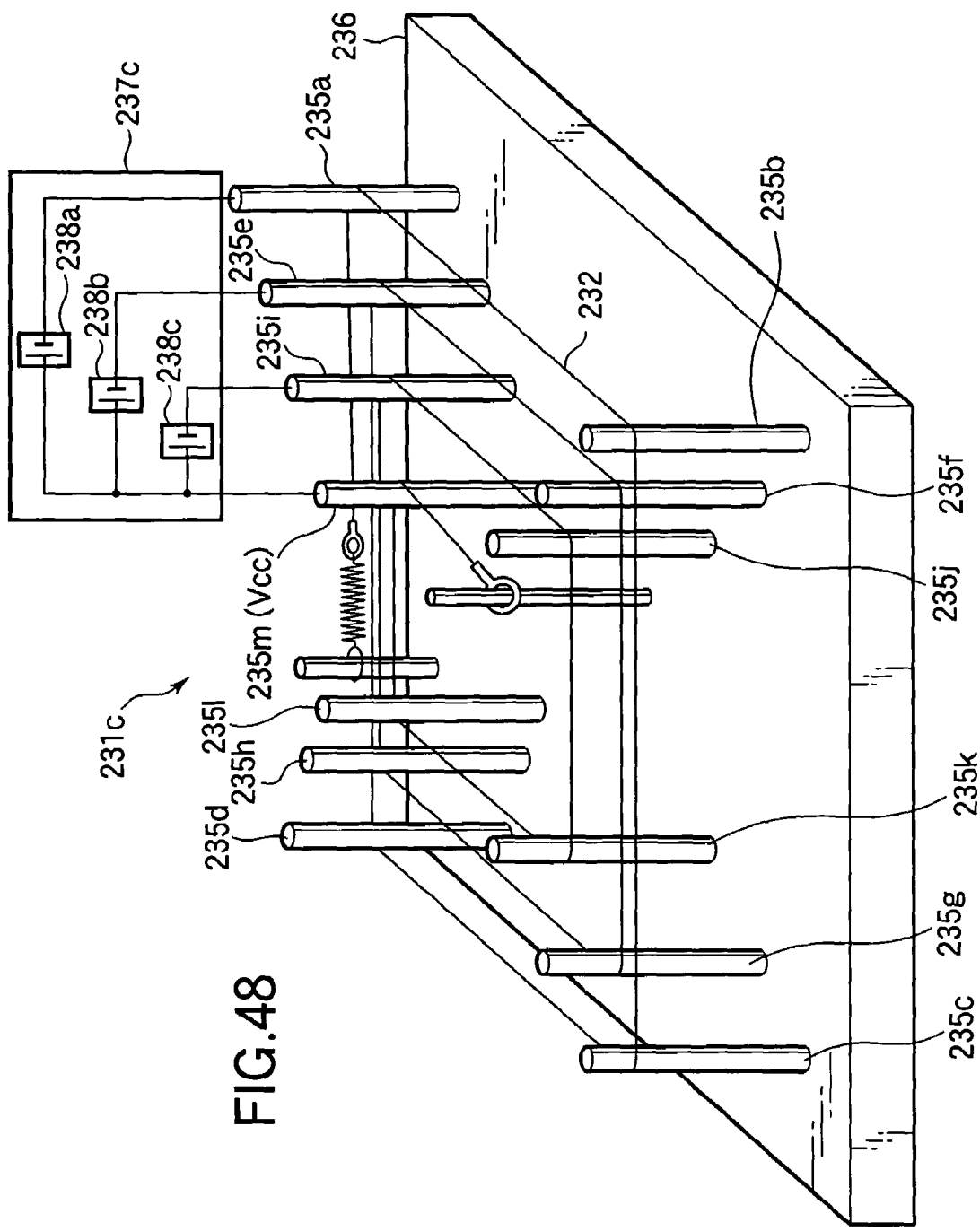
FIG. 48 is a perspective view showing the driving device according to Embodiment 16 of the present invention.

FIG. 48 is a perspective view showing a driving device 231c according to this embodiment. The energizing circuit 237c has constant current circuits 238a, 238b and 238c. A terminal of the constant current circuit 238a is connected to the bending member 235m, and the other terminal of the constant current circuit 238a is connected to the bending member 235a. A terminal of the constant current circuit 238b is connected to the bending member 235m, and the other terminal of the constant current circuit 238b is connected to the bending member 235e. A terminal of the constant current circuit 238c is connected to the bending member 235m, and the other terminal of the constant current circuit 238c is connected to the bending member 235i. Between the bending member 235m and the bending member 235i, the constant current circuits 238a, 238b and 238c cause the current Ia+Ib+Ic to flow. Between the bending member 235i and the bending member 235e, the constant current circuits 238a and 238b cause the current Ia+Ib to flow. Between the bending member 235e and the bending member 235a, the constant current circuits 238a causes the current Ia to flow. That is, in the shape memory alloy member 232, the current flowing between the bending member 235m and the bending member 235i is the largest, the current flowing between the bending member 235i and the bending member 235e is the second largest, and the current flowing between the bending member 235e and the bending member 235a is the smallest. In concrete, considering the experimental result of FIG. 46, the largest current (Ia+Ib+Ic) can be set to 160 mA, the second largest current (Ia+Ib) can be set to 100 mA, and the smallest current (Ia) can be set to 80 mA. In this case, the current Ib can be set to 20 mA, and the current Ic can be set to 60 mA.

Figure 49:
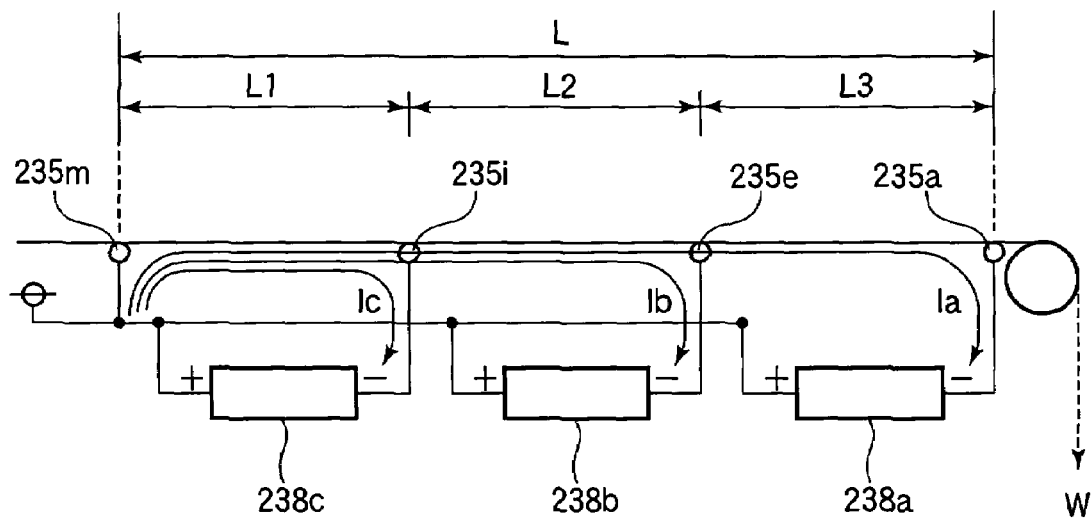
FIG. 49 is a block diagram showing an energizing circuit of the driving device according to Embodiment 16 of the present invention.
Figure 50:
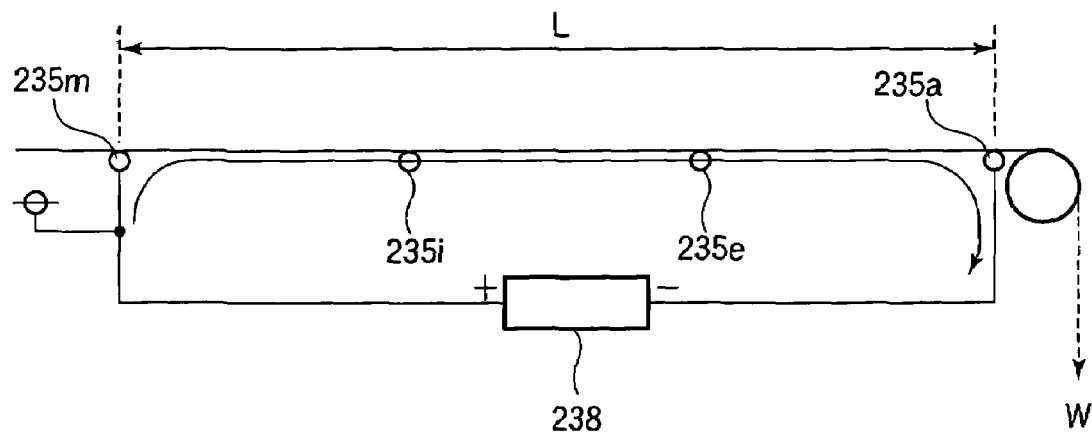
FIG. 50 is a block diagram showing an energizing circuit in the case where a uniform current flows throughout the shape memory alloy member, which is a comparative example with respect to Embodiment 16 of the present invention.

FIG. 49 is a block diagram of the energizing circuit 237c shown in FIG. 48. As shown in FIG. 49, an entire length L of the shape memory alloy member 232 (the length from the bending member 235a to the bending member 235m) is set to be 15 mm. The length L3 between the bending members 235a and 235e of the shape memory alloy member 232, the length L2 between the bending members 235e and 235i, and the length L1 between the bending members 235i and 235m are respectively set to 5 mm. The resistance of the shape memory alloy member 232 is set to 0.5 Ω/mm. If the current Ia+Ib+Ic (160 mA) flows between the bending member 235m and the bending member 235i of the shape memory alloy member 232, the current Ia+Ib (100 mA) flows between the bending member 235i and the bending member 235e, and the current Ia (80 mA) flows between the bending member 235e and the bending member 235a, the entire power consumption is 0.105 W. In contrast, in a block chart of a comparative example shown in FIG. 50, when a constant current 160 mA flows throughout the entire length L (15 mm) of the shape memory alloy member 232, the power consumption is 0.192 W. Base on this result, it is understood that it becomes possible to decrease the power consumption to 55% by separately supplying the current as shown in FIG. 49.

Figure 51:
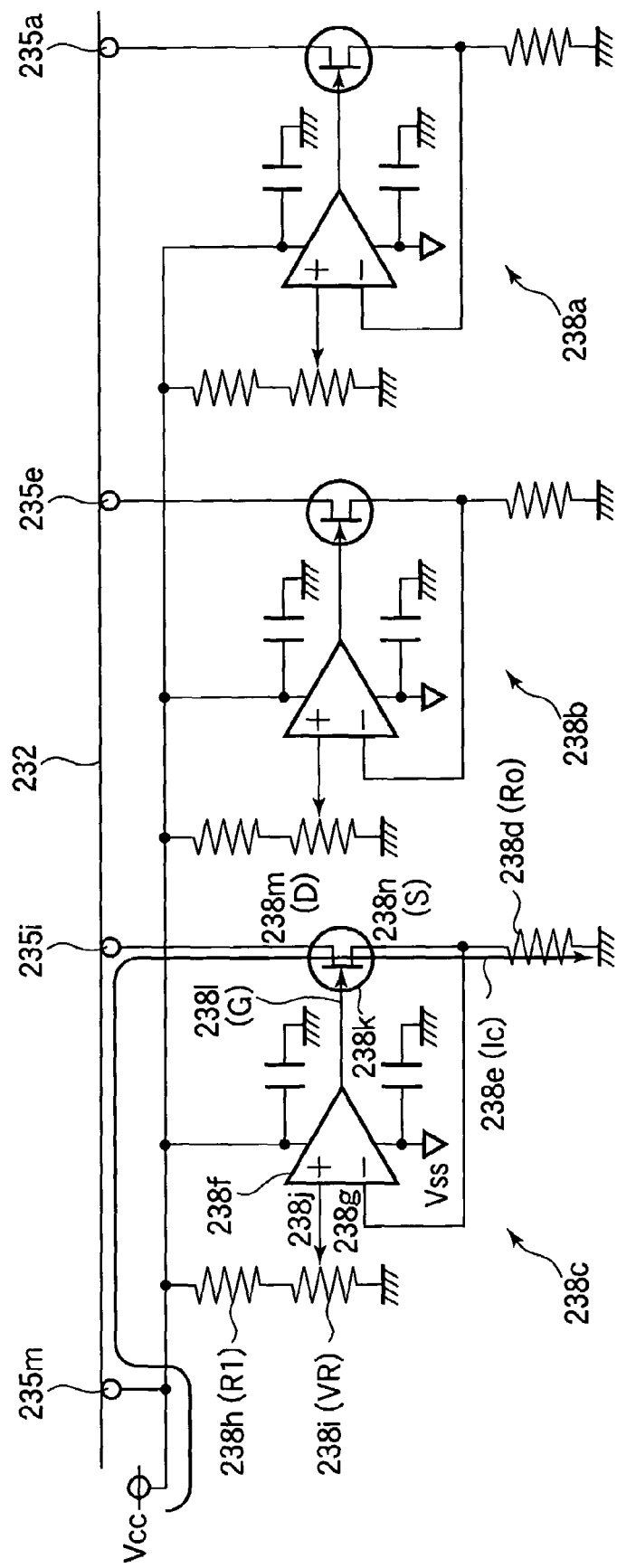
FIG. 51 is a circuit diagram of an energizing circuit shown in FIG. 49.

FIG. 51 is a circuit diagram for illustrating the constant current circuits 238a through 238c shown in FIG. 48. In the constant current circuit 238c, a resistance 238d (R0) is a current value detection resistance. When the current 238e (IC) flows through the resistance 238d (R0), the potential difference of Ic×R0 is caused between both ends of the resistance 238d (R0) This potential difference is an input voltage to a minus input terminal 238g of an operational amplifier 238f. Moreover, an input voltage (reference voltage) to a plus input terminal 238j of the operational amplifier 238f is determined by a resistance 238h (R1) and a variable resistance 238i (VR). The operational amplifier 238f operates to change the electric potential of a G-terminal 238l of an FET (field-effect transistor) 238k, and to adjust the current flowing from a D-terminal 238 m to a S-terminal 238n so that the electric potential of the minus input terminal 238g of the operational amplifier 238f is the same as the electric potential of the plus input terminal 238j. As a result, the electric potential of the minus input terminal 238g of the operational amplifier 238f becomes constant, and the current (Ic=V/R0) 238e becomes constant, irrespective of the resistance of the shape memory alloy member 232. The constant current circuits 238a and 238b operate in a similar manner to the constant current circuit 238c.

The constant current circuit 238a though 238c are described as being sink-type circuits, but not limited to this. It is possible to use a source-type circuit. In this case, a ground electric potential is applied to the bending member 235m closest to the fixed end of the shape memory alloy member 2, and the directions of the respective currents Ia, Ib and Ic are opposite to those shown in FIG. 49.

As described above, according to this embodiment, since the current flows through the respective portions of the shape memory alloy member 232 in accordance with the friction load or the like, it becomes possible to obtain a large amount of displacement at a small power consumption.

Embodiment 17

Figure 52:
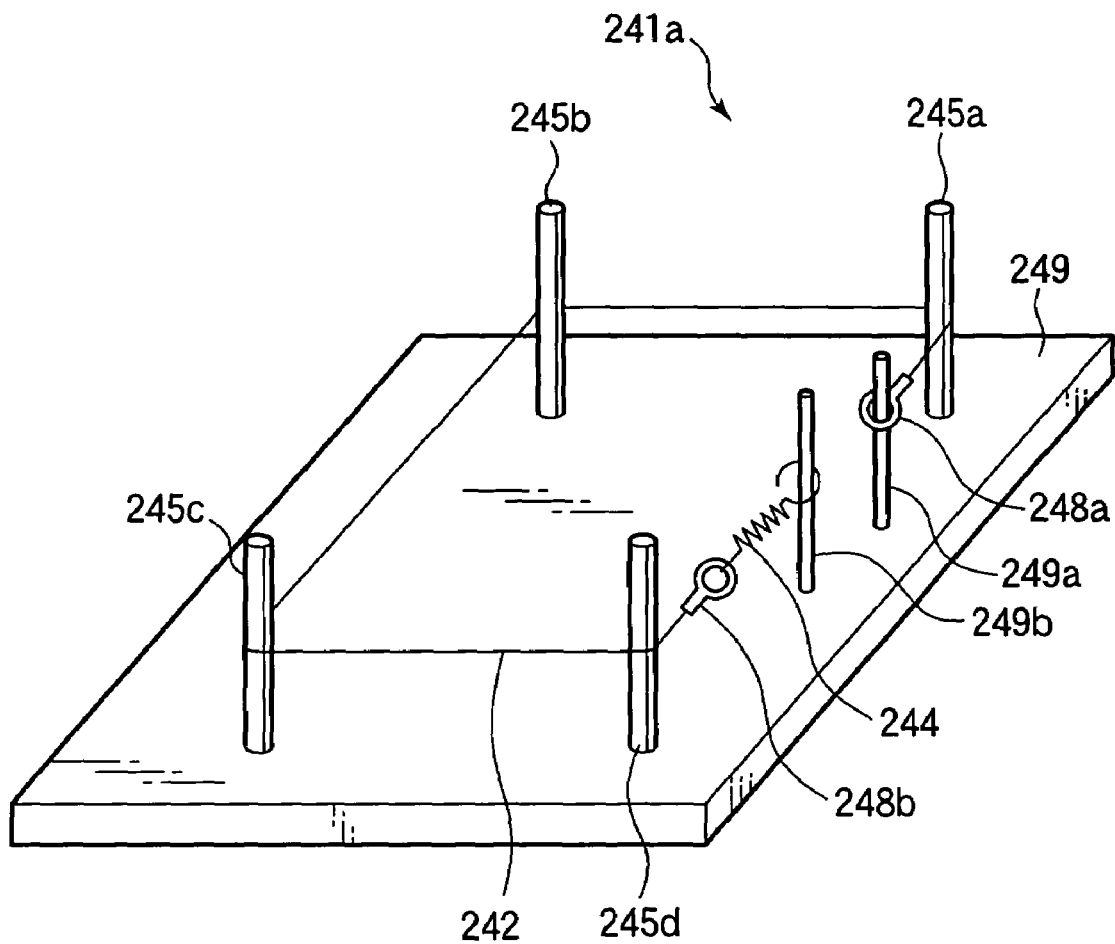
FIG. 52 is a perspective view showing a driving device according to Embodiment 17 of the present invention.

FIG. 52 is a perspective view showing a configuration of a driving device 241a according to Embodiment 17 of the present invention. In the above described Embodiments 14 through 16, the shape memory alloy member is wound around a plurality of pin-shaped bending members, and the current is supplied to the shape memory alloy member via the bending members. In this embodiment, the pin-shaped bending members are further mechanically and electrically connected to an electric circuit board.

As shown in FIG. 52, in the driving device 241a, pin-shaped bending members 245a, 245b, 245c and 245d are planted on an electric circuit board 249 in such a manner that the bending members 245a, 245b, 245c and 245d are mechanically connected to the electric circuit board 249. Further, among the bending members 245a, 245b, 245c and 245d, at least the bending members 245a and 245d are electrically connected to the electric circuit board 249. Between the bending members 245a and 245d, fixing pins 249a and 249b are planted in this order from the side closer to the bending member 245a.

An end (fixed end) of the shape memory alloy member 242 is fixed to a fixing pin 249a by means of a crimp contact 248a, and the shape memory alloy member 242 is wound around the bending member 245a, 245b, 245c and 245d at 90 degrees for each. The other end (movable end) of the shape memory alloy member 242 is fixed to an end of the resilient member 244 by means of a crimp contact 248b, and the other end of the resilient member 244 is fixed to the fixing pin 249b. Other configuration is the same as Embodiment 14.

The bending members 245a through 245d constitute a bending means which bends the shape memory alloy member 242. Portion of the circumferential surfaces of the bending members 245a through 245d contacting the shape memory alloy member 242 constitute a contact portion of the bending means contacting the shape memory alloy member 242. The electric circuit board 249 constitutes a holding means which holds the bending members 245a through 245d.

In the above described configuration, the movable body (the crimp contact 248b) can be displaced by causing the current to flow through the shape memory alloy member 242 by means of the electric circuit board 249 via the bending members 245a and 245d so that the shape memory alloy member 242 is heated and contracted.

According to this embodiment, the bending members 245a through 245d are held by the electric circuit board 249, and therefore it is not necessary to provide a separate base. Thus, the number of components can be reduced, with the result the downsizing of the driving device can be easily accomplished. Particularly, if this driving device 241a is applied to the above described Embodiments 14 through 16 (FIGS. 40, 42 through 44 and 47 through 48), it becomes possible to form the energizing circuit (for example, the energizing circuit 237 of FIG. 40 or the energizing circuit 217c of FIG. 48) on the electric circuit board 249. Therefore, it becomes easy to supply electricity to the bending members 215, 225 and 235 (FIGS. 40, 42 through 44 and 47 through 48). Moreover, since the bases 216, 226 and 236 (FIGS. 40, 42 through 44 and 47 through 48) can be composed of the electric circuit board 249, the number of components can be reduced, and the downsizing of the driving device can be easily accomplished.

Figure 53:
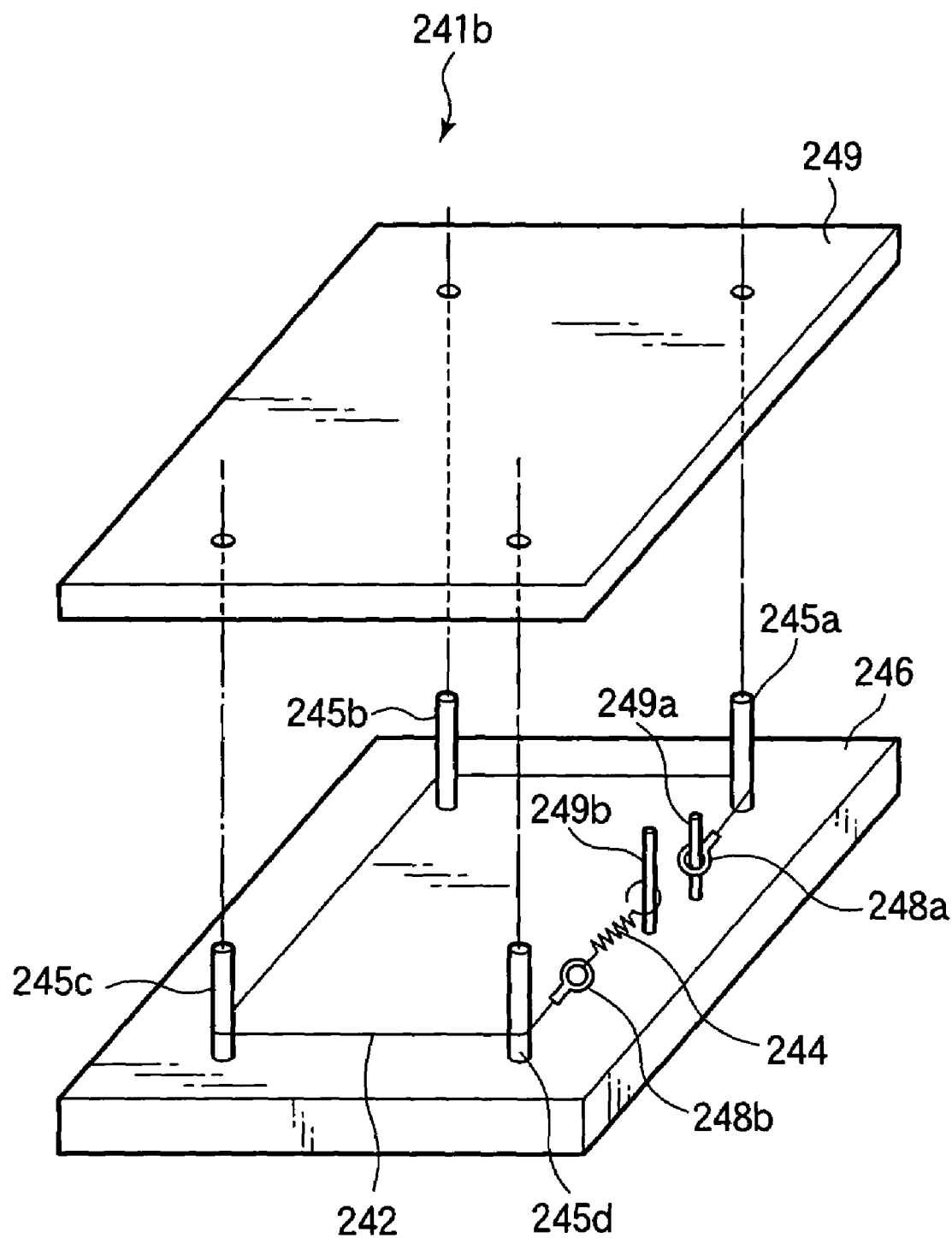
FIG. 53 is a perspective view showing another configuration example of the driving device according to Embodiment 17 of the present invention.

FIG. 53 is a perspective view showing another configuration example of the driving device according to this embodiment. In the driving device 241b shown in FIG. 53, the bending members 245a, 245b, 245c and 245d are planted on the base 246. Between the bending members 245a and 245d, the fixing pins 249a and 249b are planted in this order from the side closer to the bending member 245a. An end (fixed end) of the shape memory alloy member 242 is fixed to the fixing pin 249a by means of the crimp contact 248a, and the shape memory alloy member 242 is wound around the bending member 245a, 245b, 245c and 245d at abut 90 degrees for each. The other end (movable end) of the shape memory alloy member 242 is fixed to an end of a resilient member 244 by means of a crimp contact 248b, and the other end of the resilient member 244 is fixed to the fixing pin 249b.

In the driving device 241b shown in FIG. 53, in addition, an electric circuit board 249 is provided on the side opposite to the base 246 with respect to the shape memory alloy member 242. The bending members 245a through 245d are mechanically connected to the electric circuit board 249. The pin-shaped bending members 245a through 245d engage four penetration holes punched on the electric circuit board 249. Moreover, among the bending members 245a through 245d, the bending members 245a and 245d needed for energizing the shape memory alloy member 242 are electrically connected to electric circuit board 249. It is also possible to connect all bending members 245a through 245d to the electric circuit board 249 electricity and mechanically.

In the above described driving device 241a of FIG. 52, the bending members 245a through 245d are connected to the electric circuit board 249. Therefore, when the driving force generated by the expansion and contraction of the shape memory alloy member 242 is relatively small, the bending members 245a through 245d can be stably held. However, when the driving force generated by the expansion and contraction of the shape memory alloy member 242 is relatively large, it is difficult to stably hold the bending members 245a through 245d, and therefore the reliability of the electric connection may decrease. In contrast, according to the driving device 241b shown in FIG. 53, the bending member 245a through 245d are held by the base 246, and therefore it is possible to stably hold the bending members 245a through 245d by designing the base 246 according to the load exerted on the bending members 245a through 245d. Moreover, the mechanical connection of the electric circuit board 249a nd the bending members 245a through 245d helps the electric circuit board 249 to hold the bending members 245a through 245d, and therefore it is possible to stably hold the bending members 245a through 245d even when the force exerted on the bending members 245a through 245d is relatively large. Moreover, by placing the electric circuit board 249 on the side opposite to the base 246 with respect to the shape memory alloy member 242, it is possible to prevent the shape memory alloy member 242 from dropping out of the bending members 245a through 245d.

In the case of the driving device 241b, it is also possible to use a seat-like flexible board, so-called the FPC (Flexible Printed Circuit) board, because the electric circuit board 249 is not needed to have a strength.

Embodiment 18

Figure 54:
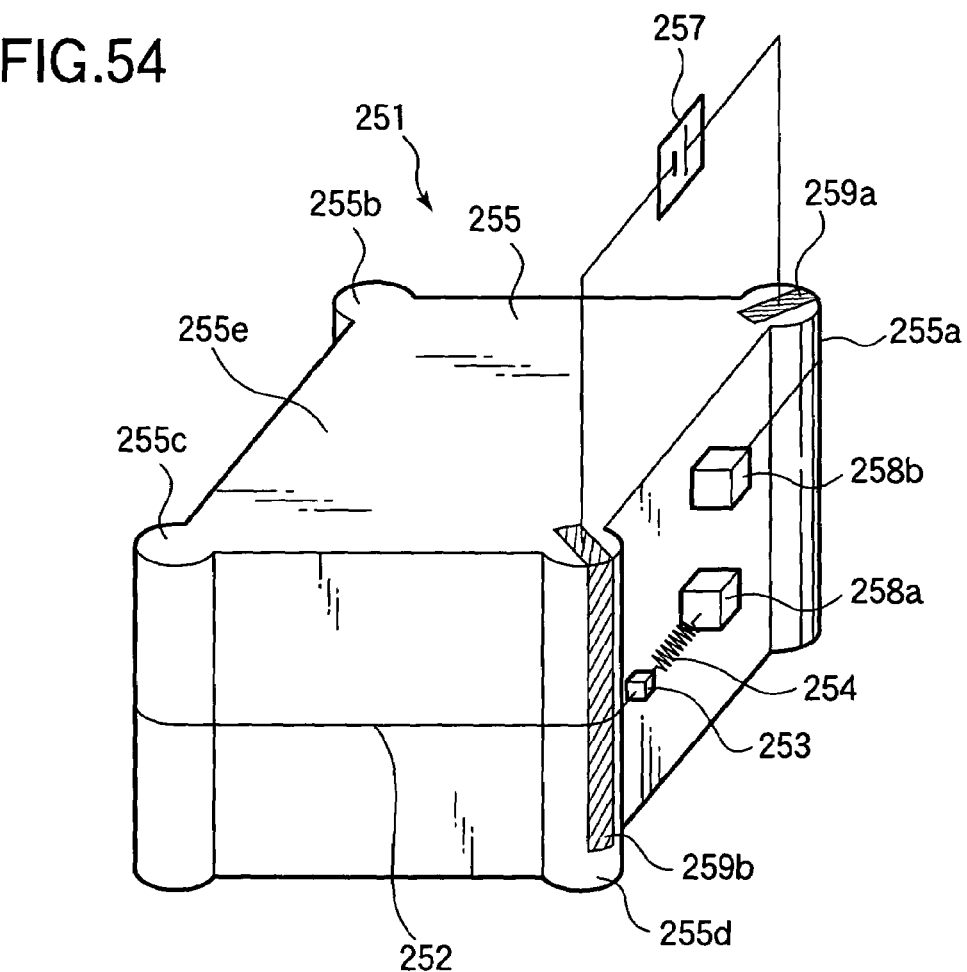
FIG. 54 is a perspective view showing a driving device according to Embodiment 18 of the present invention.

FIG. 54 is a perspective view showing the configuration of a driving device 251 according to Embodiment 18 of the present invention. In the above described Embodiments 14 through 17, the shape memory alloy member is wound around the pin-shaped bending members (for example, the bending members 215a through 215d shown in FIG. 40). In contrast, in the driving device 251 according to this embodiment, a shape memory alloy member 252 is wound around a bending member 252 composed of a structural body made of a non-conductive member (for example, a plastic) on which a conductive member is formed.

As shown in FIG. 54, the driving device 251 has a bending member 255 made by forming four approximately cylindrical projections 255a through 255d on four corners of a structural body 255e made of an insulation material (for example, a plastic) in the form of, for example, a quadrangular column. On a surface of the projections 255a and 255d side of the bending member 255, fixing members 258b and 258a are formed in this order from the side closer to the projection 255a. An end (fixed end) of the shape memory alloy member 252 is fixed to the fixing member 258b of the bending member 255, and the shape memory alloy member 252 is wound around the projections 255a, 255b, 255c and 255d at 90 degrees for each. The other end (movable end) of the shape memory alloy member 252 is fixed to an end of the resilient member 254 via a movable body 253, and the other end of the resilient member 254 is fixed to the fixing member 258a.

The bending member 255 has a conductive member 259a on the projection 255a closest from the fixed end of the shape memory alloy member 252, and has another conductive member 259b on the projection 255d closest from the movable end of the shape memory alloy member 252. An energizing circuit 257 is connected to the conductive members 259a and 259b. The energizing circuit 257 causes the current to flow through the shape memory alloy member 252 via the conductive members 259a and 259b, so that the shape memory alloy member 252 is heated and the movable member 253 fixed to the movable end is displaced. Although the energizing circuit 257 is illustrated to be apart from the bending member 255 in FIG. 54, it is possible to form the energizing circuit 257 on the surface of the bending member 255, and to form a solid circuit board.

The bending member 255 having the projections 255a through 255d constitute a bending means which bends the shape memory alloy member 252. Portions of the circumferential surfaces of the projections 255a through 255d contacting the shape memory alloy member 252 constitute a contact portion of the bending means contacting the shape memory alloy member 252. The bending member 255 constitutes a holding means which holds the projections 255a through 255d.

In the above described configuration, the movable body 253 can be displaced by causing the current to flow through the shape memory alloy member 252 by means of the energizing circuit 257 via the bending members 259a and 259b so that the heating shape memory alloy member 252 is heated and contracted.

According to this embodiment, since the shape memory alloy member 252 is wound around the contact portions 258a through 258d integrally formed with the bending member 255, it is possible to enhance the rigidity of the contact portions 258a through 258d. Therefore, even when a load applied to the contact portions 258a through 258d is large, it is possible to prevent the deformation of the contact portions 258a through 258d, and to enhance the reliability of the electrical connection between the conductive members 259a and 259b and the energizing circuit 257. Particularly, compared with the case in which the shape memory alloy member 252 is wound around pin-shaped bending members (for example, FIG. 52), the strength of the mechanical connection between the energizing circuit 257 and the conductive members 259a and 259b is high, and the reliability of the electrical connection is high. Further, since the energizing circuit 257 is formed on the bending member 255 to form a solid circuit, it is not necessary to employ a configuration in which the pin-shaped bending members 245a through 245d is sandwiched between the base 246 and the electric circuit board 249a shown in FIG. 53. As a result, it is possible to accomplish the downsizing of the driving device, while maintaining the reliabilities of the electrical connection and the mechanical connection.

Embodiment 19

Figure 55:
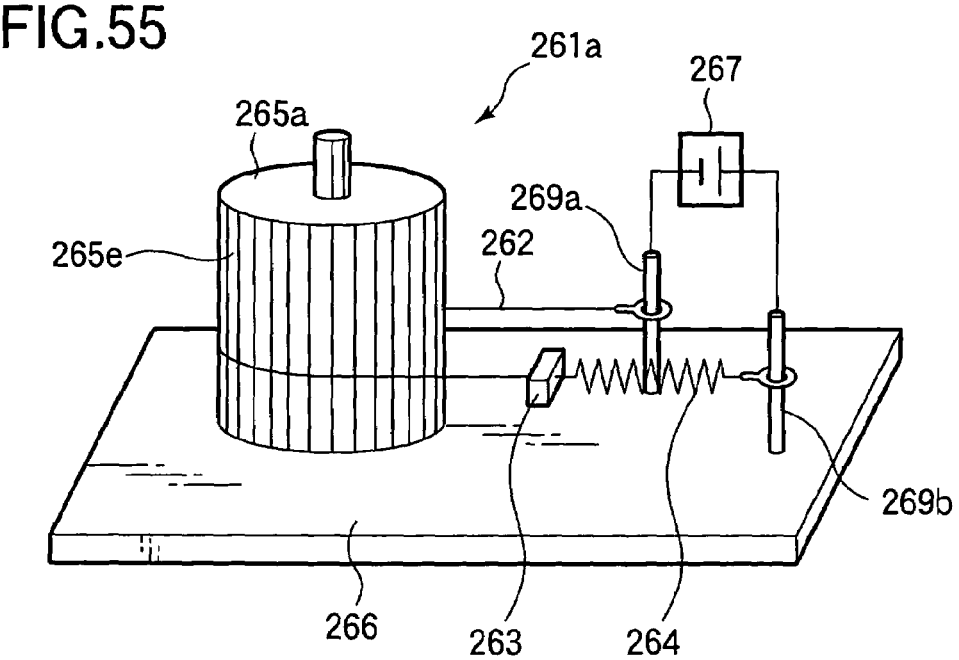
FIG. 55 is a perspective view of showing a driving device according to Embodiment 19 of the present invention.

FIG. 55 is a perspective view showing the configuration of a driving device 261a according to Embodiment 19 of the present invention. In the driving device 261a shown in FIG. 55, a bending member 265a respectively in the form of a cylinder having minute convex portions 265e on the circumferential surface thereof is rotatably supported on a base 266. An end (fixed end) of a shape memory alloy member 262 is fixed to a fixing pin 269 a provided on the base 266, and the shape memory alloy member 262 is wound around the bending member 265a at about 180 degrees in such a manner that the shape memory alloy member 262 contacts the convex portions 265e of the bending member 265a. The other end (movable end) of the shape memory alloy member 262 is fixed to an end of a resilient member 264 via a movable body 263, and the other end of the resilient member 264 is fixed to a fixing pin 269b planted on the base 266. The energizing circuit 267 is connected with the fixing pins 269a and 269b. Other configuration is the same as Embodiment 1.

The bending member 265a constitutes a bending means which bends the shape memory alloy member 262. Portions of the convex portions 265e of the bending member 265a contacting the shape memory alloy member 262 constitutes a contact portion of the bending means contacting the shape memory alloy member 262. The base 266 constitutes a holding member for holding the bending member 265a.

In the above described configuration, the movable body 263 can be displaced by causing the current to flow through the shape memory alloy member 262 by means of the energizing circuit 267 via the fixing pins 269a and 269b so that the shape memory alloy member 262 is heated and contracted.

Figure 56A:
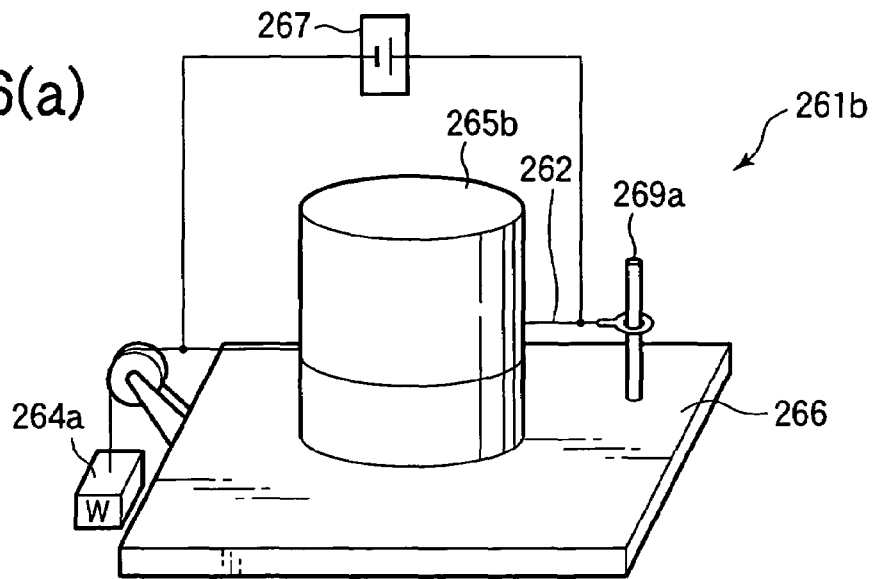
FIGS. 56(a), (b) and (c) are perspective views respectively showing three kinds of experimental arrangements for carrying out experiments on the driving device according to Embodiment 19 of the present invention.
Figure 56B:
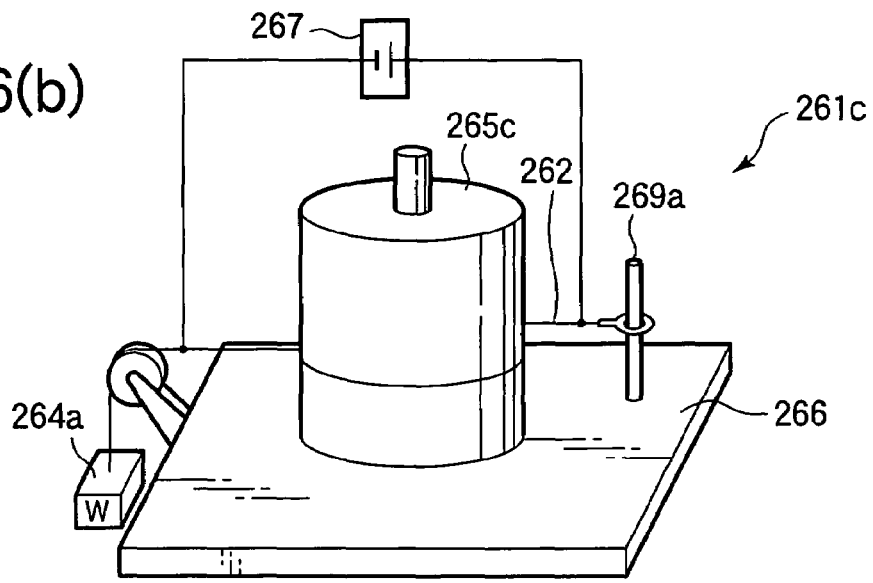
Figure 56C:
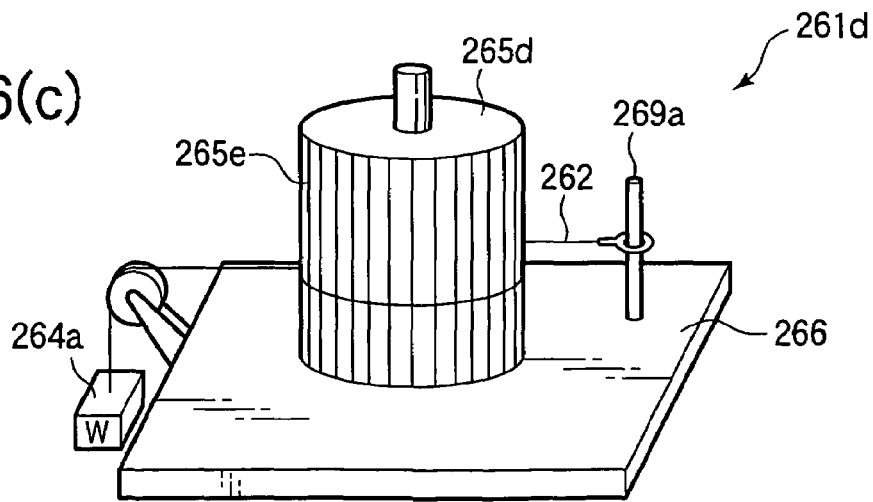

FIGS. 56(a) through (c) are perspective views showing experimental arrangements 261b, 261c and 261d for verifying the effect of the driving device 261a. In the experimental arrangement 261b shown in FIG. 56(a), a wire-shaped memory alloy member 262 is wound around a cylindrical bending member 265b having a diameter of 10 mm which is not rotatable and which has no convex portions. An end (fixed end) of the shape memory alloy member 262 is fixed to a fixing pin 269a, and a weight 264a which weighs 50 g is fixed to the other end (movable end) of the shape memory alloy member 262. When the energizing circuit 267 causes a direct current of 140 mA to flow through an area of the shape memory alloy member 262 including a portion wound around the bending member 265b, the amount of displacement of the movable end of the shape memory alloy member 262 is measured. In the experimental arrangement 261c shown in FIG. 56(b), a cylindrical bending member 265c having a diameter of 10 mm which has no convex portion is rotatably supported on the base 266, and the other conditions are the same as those of the experimental arrangement 261b of FIG. 56(a). In the experimental arrangement 261d shown in FIG. 56(c), a bending member 265d having a diameter of 10 mm which has convex portions 265e on the circumferential surface thereof is rotatably supported on the base 266, and the other conditions are the same as those of the experimental arrangement 261b of FIG. 56(b). The contact ratio of the bending member 25 (ratio of a length with which the convex portion 265e contacts the shape memory alloy member 262 with respect to an entire circumferential length of the bending member 265d) is 33%. The bending members 261b, 261c and 261d shown in FIGS. 56(a) through (c) are made of POM.

Figure 57:
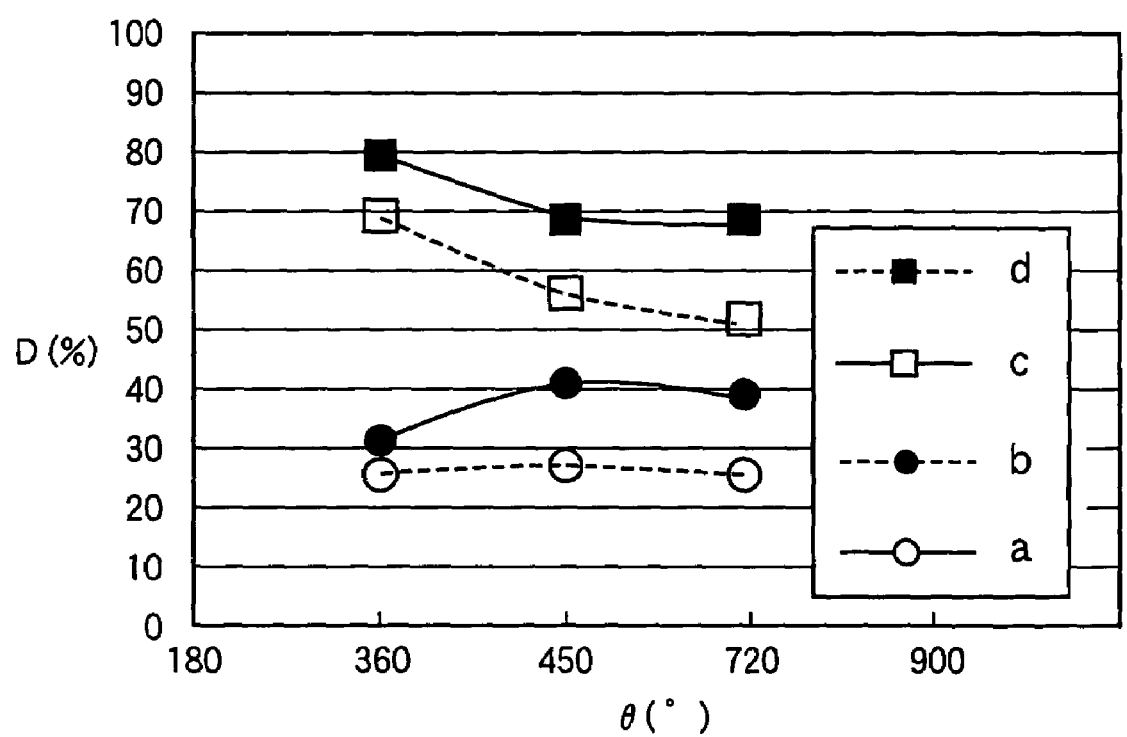
FIG. 57 is a graph showing a result of the experiment using the experimental arrangements shown in FIG. 56, which corresponds to Table 6.

Using the experimental apparatuses shown in FIGS. 56(a) through (c), the amount of displacement on a movable end of the shape memory alloy member 262 is measured on condition that the winding angle is set to 360 degrees (one turn), 450 degrees (1 turn and half) and 720 degrees (two turns). A further experiment is carried out on condition that the rotation of the bending member 265d is locked in the experimental arrangement 261d shown in FIG. 56(c). The result thereof is shown in Table 6 and FIG. 57. In FIG. 57, the vertical axis indicates a displacement ratio H (%), and the horizontal axis indicates a winding angle θ (degrees). In FIG. 57, the mark a indicates the data when the non-rotatable cylindrical bending member 265b (FIG. 56(a)) is used. The mark b indicates the data when the rotatable cylindrical bending member 265c (FIG. 56(b)) is used. The mark c indicates the data when the non-rotatable bending member (not shown) having a contact ratio of 33% (FIG. 56(c)) is used. The mark d indicates the data when the rotatable bending member 265b having a contact ratio of 33% (FIG. 56(c)) is used.

TABLE 6

| ROTATION OF BENDING MEMBER (CONTACT RATIO) | DISPLACEMENT RATIO (%) | | | |
|---|---|---|---|---|
| | 1 TURN | 1.5 TURNS | 2 TURNS | AVERAGE |
| NON-ROTATABLE (33%) | 69.2 | 56.0 | 51.8 | 59.0 |
| ROTATABLE (33%) | 79.0 | 70.2 | 68.1 | 72.4 |
| NON-ROTATABLE (100%) | 24.8 | 26.6 | 25.3 | 25.6 |
| ROTATABLE (100%) | 30.9 | 41.1 | 38.8 | 36.9 |

Based on FIG. 57, it is understood that, when the rotatable bending member 265c (the mark b) is used instead of the non-rotatable bending member 265b (the mark a), the displacement of the shape memory alloy 262 increases approximately 1.2 to 1.5 times. Moreover, when the rotatable bending member 265d (the mark d) having the contact ratio of 33% is used, the displacement of the shape memory alloy 262 increases approximately 2.7 to 3.2 times.

Based on the above described result, according to this embodiment, it becomes possible to increase the amount of displacement of the movable body 263 by using the rotatable bending member 261a having convex portions on the circumferential surface thereof. While the driving devices having wire-shaped shape memory alloy members wound around pulleys are disclosed in Japanese Laid-Open Patent Publication Nos. HEI 8-776743 and HEI 10-148174, it becomes possible to obtain a large amount of displacement by forming convex portions on these pulleys so as to reduce the contact ratio.

The rotatable bending member is not limited to a cylindrical shape, but can be in the form of a polygonal column such as a triangular column as was described in Embodiment 12, and further can be made of a plurality of pins disposed along a closed path.

Embodiment 20

Figure 58:
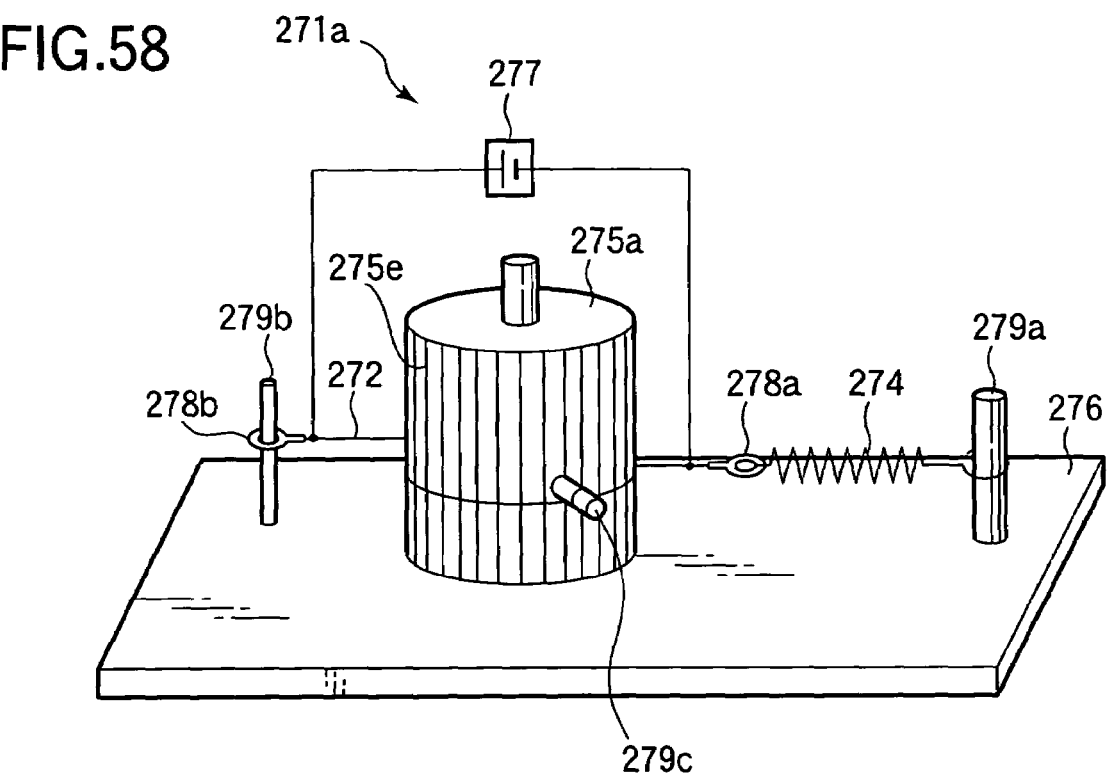
FIG. 58 is a perspective view showing a driving device according to Embodiment 20 of the present invention.

FIG. 58 is a perspective view showing the configuration of a driving device 271a according to Embodiment 20 of the present invention. The driving device 271a according to this embodiment is different from the driving device 261a (FIG. 55) according to Embodiment 19 in that a shape memory alloy member 272 is wound around a pin 279c planted on a circumferential surface of the bending member 275a.

As shown in FIG. 58, the driving device 271a has a rotatable bending member 275a in the form of an approximately cylindrical shape having a lot of minute convex portions 275e formed on the circumferential surface thereof. On the circumferential surface of this bending member 275a, a pin (protrusion) 279c is provided, in addition to the convex portion 275e. The pin 279c protrudes in the radial direction of the bending member 275a, in addition to the convex portion 275e. An end (fixed end) of the shape memory alloy member 272 in the form of a wire is fixed to a fixing pin 279b on a base 276 by means of a crimp contact 278b. The shape memory alloy member 272 is wound around bending member 275a at, for example, 360 degrees. Moreover, the shape memory alloy member 272 is also wound around the pin 279c at, for example, 360 degrees while the shape memory alloy member 272 is wound around the bending member 275a. The other end (movable end) of the shape memory alloy member 272 is fixed to an end of a resilient member 274 by means of a crimp contact 278a, and the other end of resilient member 274 is fixed to a fixing pin 279a formed on the base 276.

The bending member 275a constitutes a bending means which bends the shape memory alloy member 272. The pin 279c constitutes a protrusion that protrudes from the bending member 275a so that the shape memory alloy member 272 is wound around the pin 279c. Portions of the convex portions 275e of the bending member 275a contacting the shape memory alloy member 272 constitute a contact portion of the bending means contacting the shape memory alloy member 272. The base 276 constitutes a holding means which holds the bending member 275a.

In the above described configuration, the movable body (the crimp contact 278a) can be displaced by causing the current to flow through the shape memory alloy member 272 by means of an energizing circuit 277 so that the shape memory alloy member 272 is heated and contracted. With this, the bending member 275a also rotates. When the current flowing through the shape memory alloy member 272 is stopped, the shape memory alloy member 272 is cooled and expanded to its original length, so that the movable body (the crimp contact 278a) returns to its original position, and the bending member 275a returns to its original rotational position.

Although the above described Embodiment 19 (FIG. 55) is effective when the rotational position of the bending member 265 can be arbitrary as a pulley, this embodiment is effective when the rotational position of the bending member 265 is limited.

Figure 59:
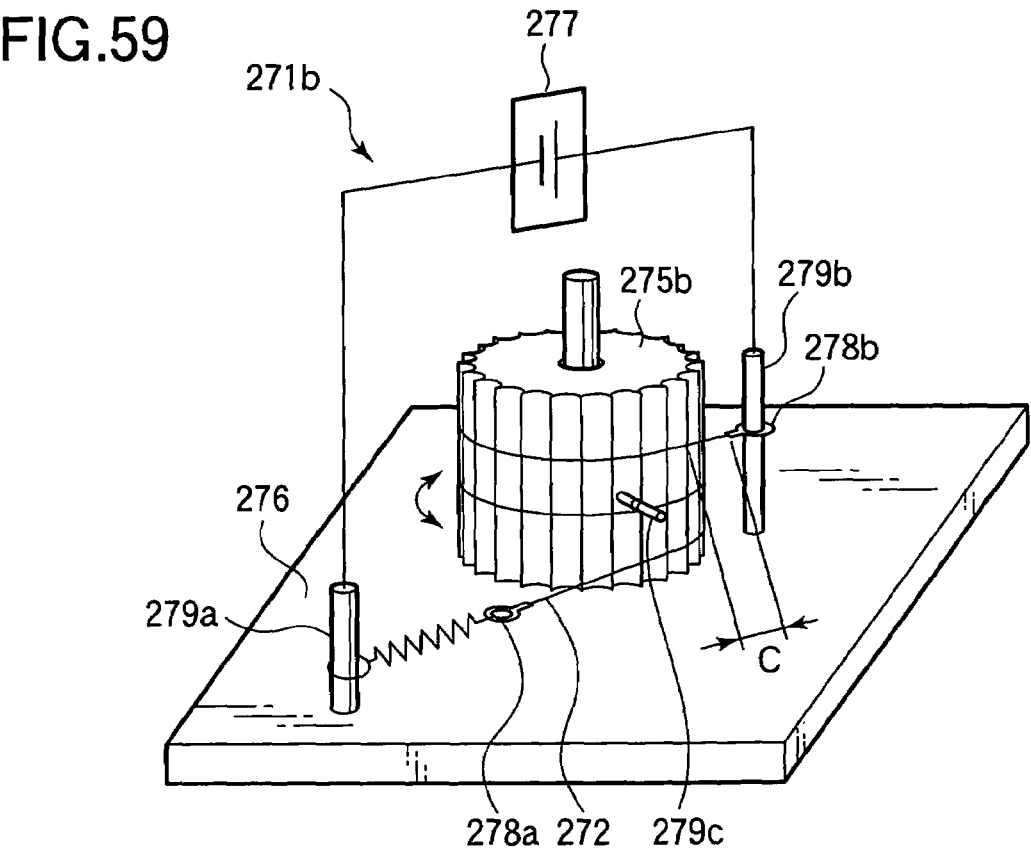
FIG. 59 is a perspective view showing an experimental arrangement for carrying out an experiment on the driving device according to Embodiment 20 of the present invention.

FIG. 59 is a perspective view showing an experimental arrangement 271b for measuring the amount of displacement of the movable body of the driving device 271a according to Embodiment 20. The experimental arrangement 271b includes a bending member 275b rotatably provided on a base 276, and the bending member 275b has convex portions and a pin 279c on the circumferential surface thereof. The contact ratio of the bending members 275b is 33%. An end (fixed end) of the shape memory alloy member 272 is fixed to a fixing pin 279b fixed to the base 276 by means of a crimp contact 278b. The shape memory alloy member 272 is wound around the bending member 275b at about 360 degrees, then wound around the pin 279c at about 360 degrees, and further wound around the bending member 275b at about 360 degrees. The other end (movable end) of the shape memory alloy member 272 is fixed to an end of a resilient member 274 composed of a coil spring by means of a crimp contact 278a, and the other end of the resilient member 274 is fixed to a fixing pin 279a planted on the base 276. An energizing circuit 277 is connected to the fixing pins 279a and 279b, so that a current flows through the shape memory alloy member 272 via the fixing pins 279a and 279b. The shape memory alloy member 272 has a diameter of about 60 μm and a length of about 83 mm.

The urging force of the resilient member 274 is about 392× $10^{-3}$ N when the shape memory alloy member 272 is not energized. The current caused to flow through the shape memory alloy member 272 by means of the energizing circuit 277 is 140 mA. The length c of the shape memory alloy member 272 from the bending member 275b to the crimp contact 278a is about 1.5 mm.

Figure 60:
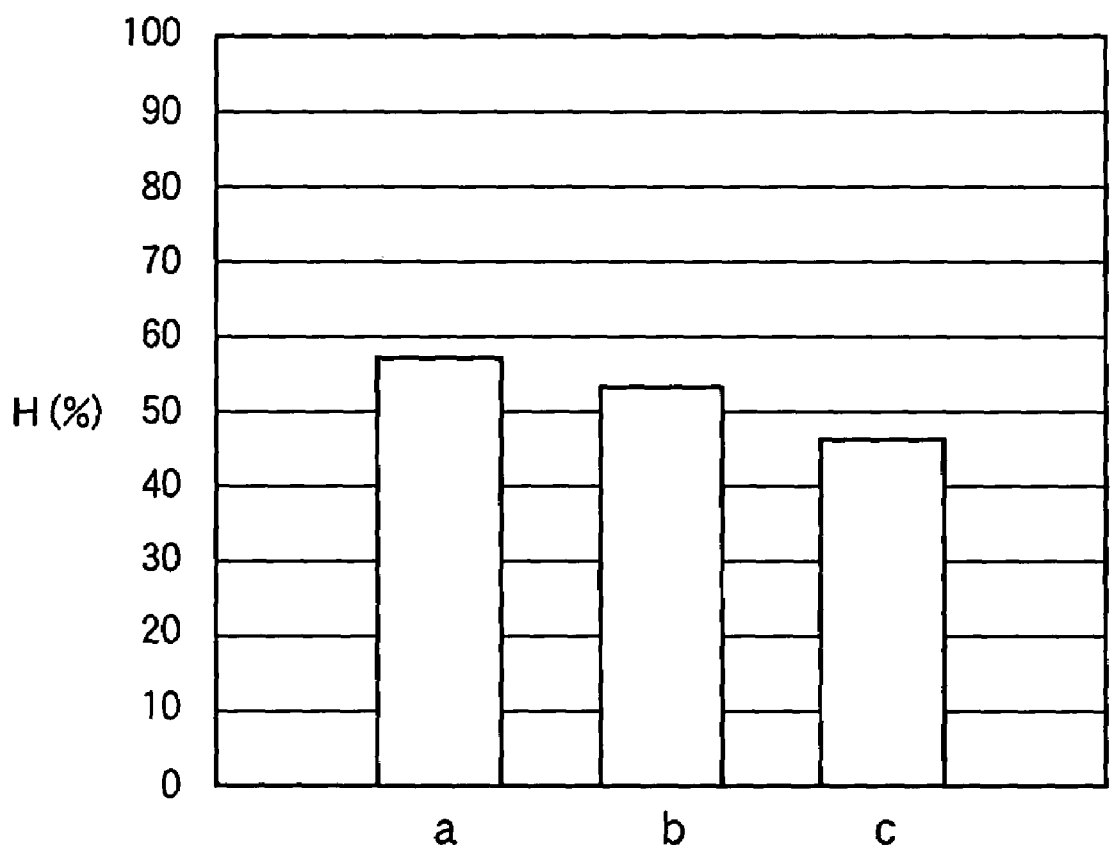
FIG. 60 is a graph showing a result of the experimental using the experimental arrangement shown in FIG. 59, which corresponds to Table 7.

Using the experimental arrangement shown in FIG. 59, the amount of displacement of the crimp contact 278a (when the energizing is carried out by the energizing circuit 277) is measured. Additionally, the amount of displacement is measured also in the case where the shape memory alloy member 272 is not wound around the pin 279c, or in the case where the rotation of the bending member 275b is locked. The result thereof is shown in Table 7 and FIG. 60. In FIG. 60, the vertical axis indicates the displacement ratio H (%). In the horizontal axis, the mark b indicates data in the case where the shape memory alloy member 272 is wound around the pin 279c as shown in FIG. 59. The mark a indicates data in the case where the shape memory alloy member 272 is not wound around the pin 279c. The mark c indicates data in the case where the rotation of the bending member 275b is locked (the shape memory alloy member 272 is not wound around the pin 279c).

TABLE 7

| WINDING AROUND PIN | BENDING MEMBER ROTATABLE/ NOT ROTATABLE | DISPLACEMENT RATIO (%) |
|---|---|---|
| WINDING | ROTATABLE | 56.9 |
| NO WINDING | ROTATABLE | 53.5 |
| NO WINDING | NOT ROTATABLE | 46.8 |

Based on FIG. 60, it is understood that it is possible to obtain the almost same amount of displacement when the shape memory alloy member 272 is wound around the pin 279c (mark b) and when the shape memory alloy member 272 is not wound around the pin 279c (mark a). Moreover, it is understood that in both of these cases (marks a and b), it is possible to obtain a larger amount of displacement than in the case where the rotation of the bending member 275b is locked (mark c). That is, it is understood that the decrease in the amount of displacement due to the winding of the shape memory alloy member 272 around the pin 279c (i.e., the fixing of the shape memory alloy member 272 to the bending member 275) is very small, and almost the same advantage as Embodiment 19 can be obtained.

As described above, according to this embodiment, it is possible to obtain the same advantage as Embodiment 19 even in the case where the rotational position of the bending member 275 is limited (not arbitrary).

The rotatable bending member 275a is not limited to the cylindrical shape, but may be in the form of a polygonal column such as a triangular column as was described in Embodiment 12. In such a case, it is possible to obtain the same advantage.

Embodiment 21

Figure 61A:
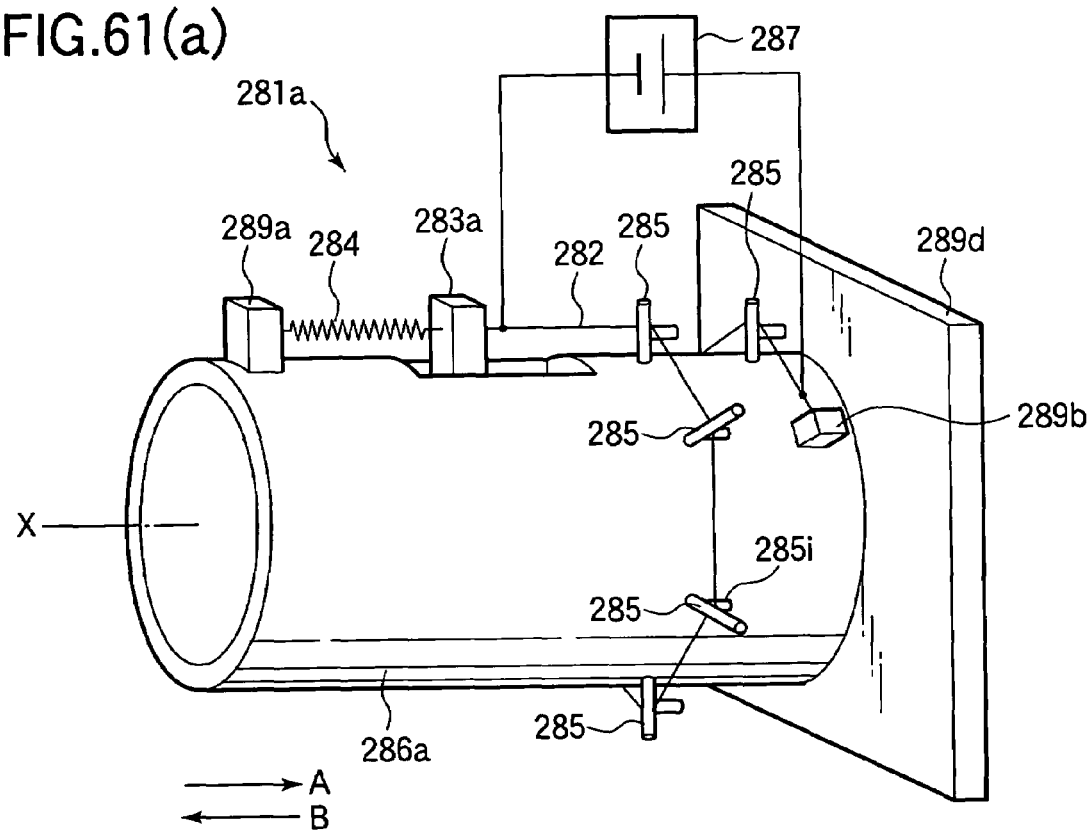
FIG. 61(a) is a perspective view showing a driving device according to Embodiment 21 of the present invention.

FIG. 61(a) is a perspective view of a configuration example (referred to as a driving device 281a) in the case where the driving devices 1, 11, 21 and 31 (FIGS. 1, 2 and 9 through 11) are applied to a lens drive in a camera. The camera to which this driving device 281a is applied has a cylindrical barrel 286a and a circuit board 289d provided on a side (rear side) of the barrel 286a opposite to an object. A lens 283e (FIG. 64(a))

is fixed to a tip of the barrel 286a. A lens 283b (FIG. 64(a)) held by a lens frame 283a is provided in the barrel 286a. The lens frame 283a is movably supported by guide axes 283c and 283d (FIG. 64(a)) along an optical axis X of the lens. A part of the lens frame 283a penetrates a groove axially formed on the barrel 286a and projects outward. Moreover, the circuit board 289d has a solid state image sensing device 289c (FIG. 64(a)) at a position where the image is focused by lens 283e and 283b.

On the circumferential surface of the barrel 286a, a plurality of pin-shaped bending members 285 are planted. These bending members 285 are disposed at intervals in a circumferential direction of the barrel 286a. The bending member 285 has a main part that projects in the radial direction of the barrel 286a and an orthogonal member that projects from the main part in the direction almost parallel to the axial direction of the barrel 286a.

An end (fixed end) of a shape memory alloy member 282 in the form of a wire is fixed to a fixing member 289b in the vicinity of the rear end of the barrel 286a. The shape memory alloy member 282 turns around the barrel 286a almost in one turn in such a manner that the shape memory alloy member 282 is wound around the bending members 285, and further extends in the axial direction of the barrel 286a. The other end (movable end) of the shape memory alloy member 282 is fixed to the rear end of the above described lens frame 283a. An end of a resilient member 284 is fixed to a front end of the lens frame 283a, and the other end of this resilient member 284 is fixed to a fixing member 289a provided in the vicinity of the front end of the barrel 286a. An energizing circuit 287 is connected to both ends of the shape memory alloy member 282.

When the energizing circuit 287 causes the current to flow through the shape memory alloy member 282 to heat the shape memory alloy member 282, the shape memory alloy member 282 is contracted resisting the urging force of the resilient member 284, so that the lens frame 283a moves rearward (direction of an arrow A). When the energizing of the shape memory alloy member 282 is stopped, the shape memory alloy member 282 is cooled and expanded to its original length, so that the lens frame 283a moves frontward (direction of an arrow B) by means of the urging force of the resilient member 284. As a result, the lens 283b (FIG. 64(a)) moves in the direction of the optical axis X, and, for example, a zooming operation or a focusing operation is carried out.

As constructed above, it becomes possible to dispose the shape memory alloy member 282 whose entire length is long (i.e., a amount of displacement is large) around the barrel 286a without increasing the length of the barrel 286a of the camera. Moreover, since the shape memory alloy member 282 is wound around the pin-shaped bending members 285, it is possible to reduce the ratio of the length with which the shape memory alloy member 282 contacts the bending members 285 to the entire circumferential length of the barrel 286a (i.e., a contact ratio). As a result, it is possible to reduce the decrease in the amount of displacement, compared with the case in which the shape memory alloy member 282 is linearly disposed.

Figure 61B:
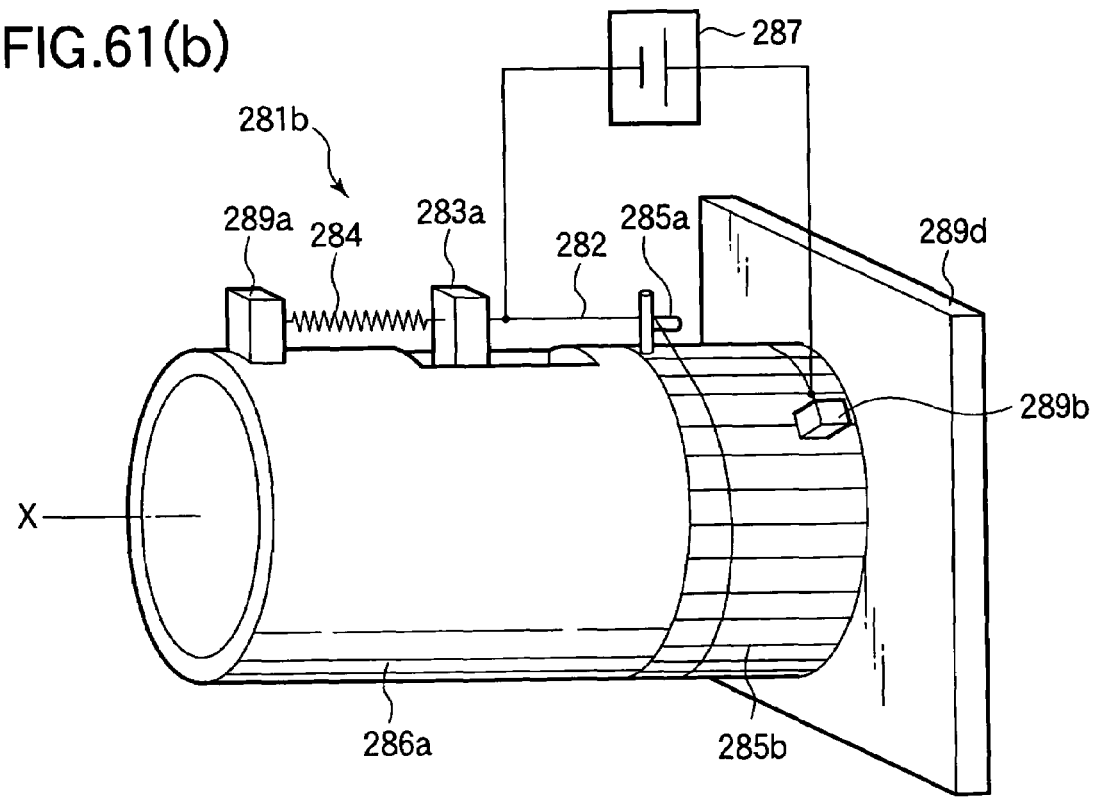
FIG. 61(b) is a perspective view showing another configuration example of the driving device according to Embodiment 21 of the present invention.

FIG. 61(b) is a perspective view showing a configuration example (referred to as a driving device 281b)in the case where the driving device 51 (FIG. 14) of Embodiment 6 is applied to the lens drive of the camera. In this driving device 281b, a large number of convex portions 285b similar to the convex portions 54a (FIG. 14) described in Embodiment 6 are formed in the circumferential direction of the barrel 286a. Only one bending member 285a, for example, is formed on the rear side of the lens frame 283a. An end (fixed end) of the shape memory alloy member 282 is fixed to a fixing member 289b, and the shape memory alloy member 282 is wound around the barrel 286a in almost one turn in such a manner that the shape memory alloy member 282 contacts the convex portions 285b, and then the shape memory alloy member 282 is wound around the bending member 285a at about 90 degrees. The other end (movable end) of the shape memory alloy member 282 is fixed to the lens frame 283a. Each convex portion 285b is elongated in the axial direction of the barrel 286a. Other configuration is the same as the driving device 281a shown in FIG. 61(a).

Using the driving device 281b, it becomes possible to dispose the shape memory alloy member 282 whose entire length is long (i.e., a amount of displacement of the movable end is large) around the barrel 286a without increasing the length of the barrel 286a of the camera. Moreover, since the shape memory alloy member 282 is wound around the bending member 285a and the convex portion 285b, it is possible to reduce the ratio of the length with which the shape memory alloy member 282 contacts the bending member 285a and the convex portions 285b to the entire circumferential length of the barrel 286a (i.e., a contact ratio). As a result, it is possible to reduce the decrease in the amount of displacement, compared with the case in which the shape memory alloy member 282 is linearly disposed.

Figure 62A:
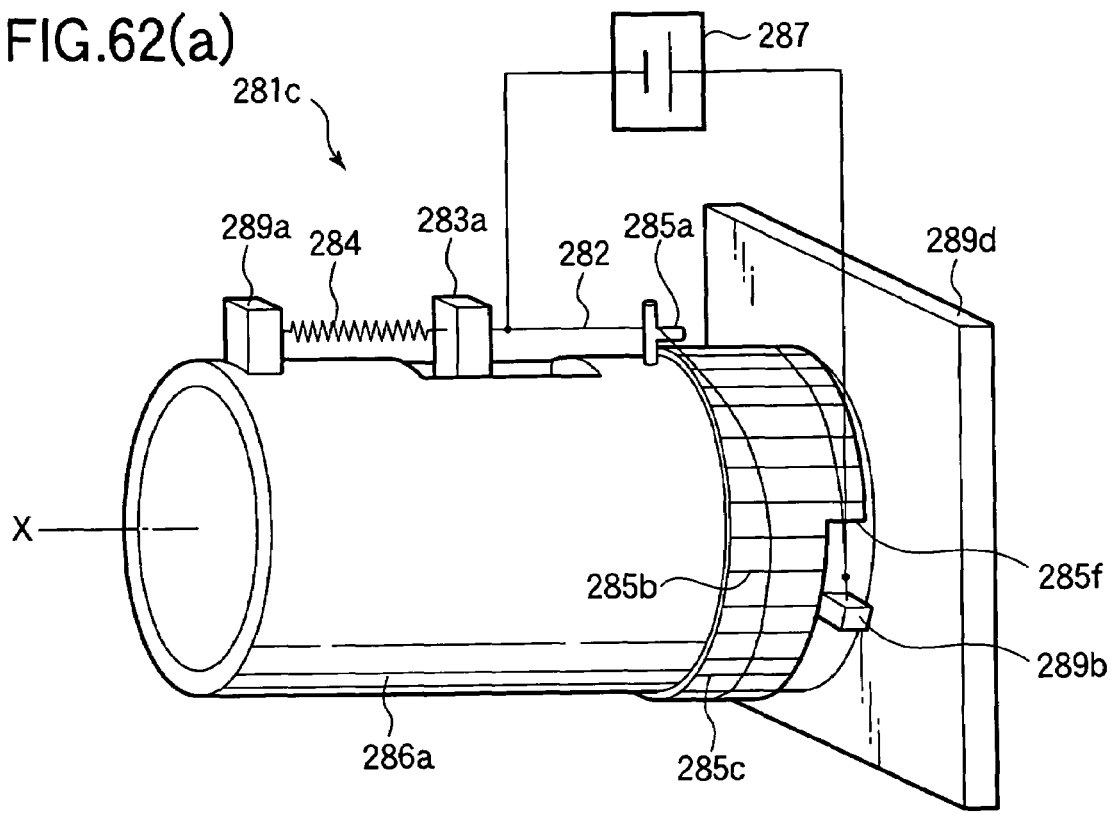
FIG. 62(a) is a perspective view showing still another configuration example of the driving device according to Embodiment 21 of the present invention.

FIG. 62(a) is a perspective view showing a configuration example (referred to as a driving device 281c)in the case where the driving device 261a (FIG. 55) of Embodiment 18 is applied to the lens drive of the camera. In this driving device 281c, a cylindrical ring 285c is provided on the circumference of the barrel 286a, and the cylindrical ring 285c is rotatable in the circumferential direction of the barrel 286a. A number of convex portions 285b described with reference to FIG. 61(b) are formed on a circumference of the cylindrical ring 285c at intervals in the circumferential direction of the cylindrical ring 285c. An end (fixed end) of the shape memory alloy member 282 is fixed to a fixing member 289b. The shape memory alloy member 282 is wound around the cylindrical ring 285c in almost one turn in such a manner that the shape memory alloy member 282 contacts the convex portions 285b, and then the shape memory alloy member 282 is wound around the bending member 285a at about 90 degrees. The other end (movable end) of the shape memory alloy member 282 is fixed to the lens frame 283a. The cylindrical ring 285c has a cutaway portion 285f in order not to interfere with the fixing member 289b when the cylindrical ring 285c rotates. Other configuration is the same as the driving device 281b shown in FIG. 61(b).

According to this driving device 281c, the contact ratio is small and the cylindrical ring 285c is rotatable, and therefore it is possible to increase the amount of displacement of the shape memory alloy member 282 as was described in Embodiment 18.

Figure 62B:
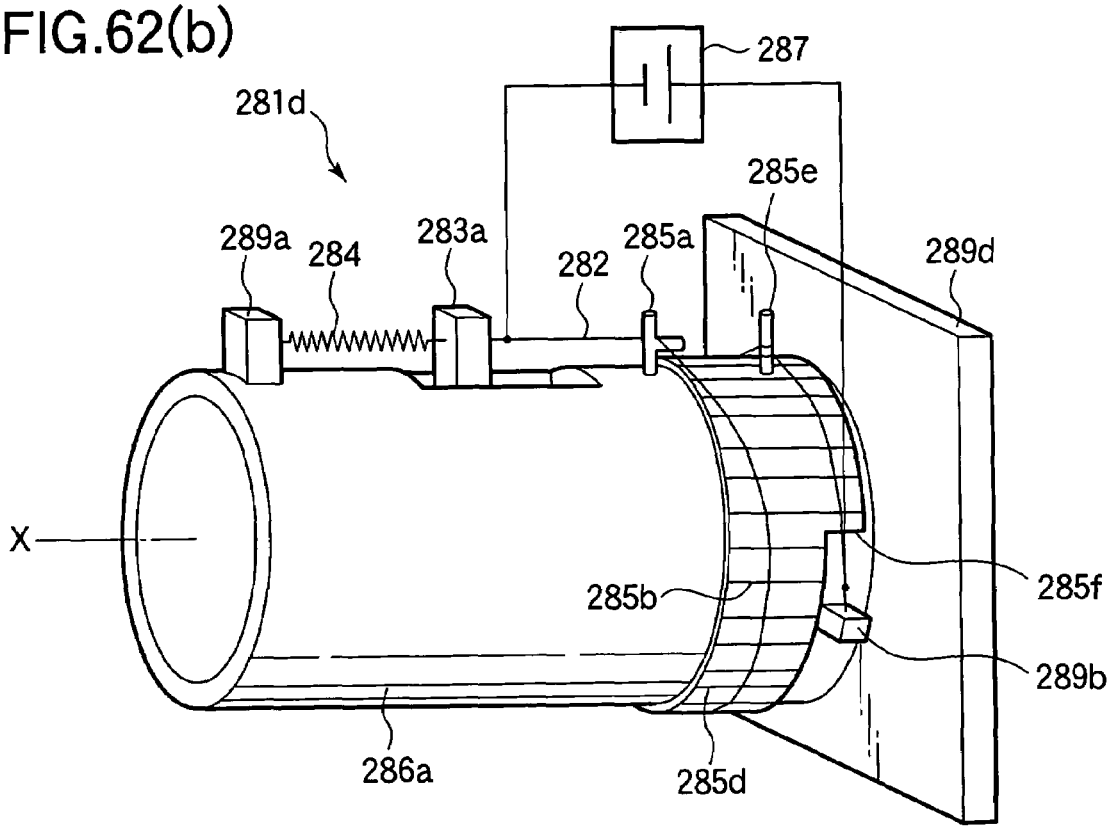
FIG. 62(b) is a perspective view showing yet another configuration example of the driving device according to Embodiment 21 of the present invention.

FIG. 62(b) is a perspective view showing a configuration example (referred to as a driving device 281d)in the case where the driving device 271a (FIG. 58) of Embodiment 19 is applied to the lens drive of the camera. In this driving device 281d, the pin-shaped bending member 285e is planted on the circumferential surface of the cylindrical ring 285d, and is located behind the bending member 285a planted on the circumferential surface of the barrel 286a. The shape memory alloy member 282 is wound around the convex portions 285b to turn around the cylindrical ring 285c in ¼ turn, and then wound around the bending member 285e. The shape memory alloy member 282 is further wound around the convex portions 285b to turn around the cylindrical ring 285c in almost one turn, and-then bent by the bending member 285 at 90 degrees. Other compositions are the same as those of the driving device 281c shown in FIG. 62(a).

According to the driving device 281d, the positional relationship between the shape memory alloy member 282 and the cylindrical ring 285d is regulated by the pin-shaped bending member 285e, and therefore the rotational position of the cylindrical ring 285d does not deviate even if the shape memory alloy member 282 is repeatedly expanded and contracted. Therefore, it is possible to keep constant the positional relationship between the fixing member 289b that fixes the fixed end of the shape memory alloy member 282 and the cutaway portion 285f of the cylindrical ring 285d.

Figure 63A:
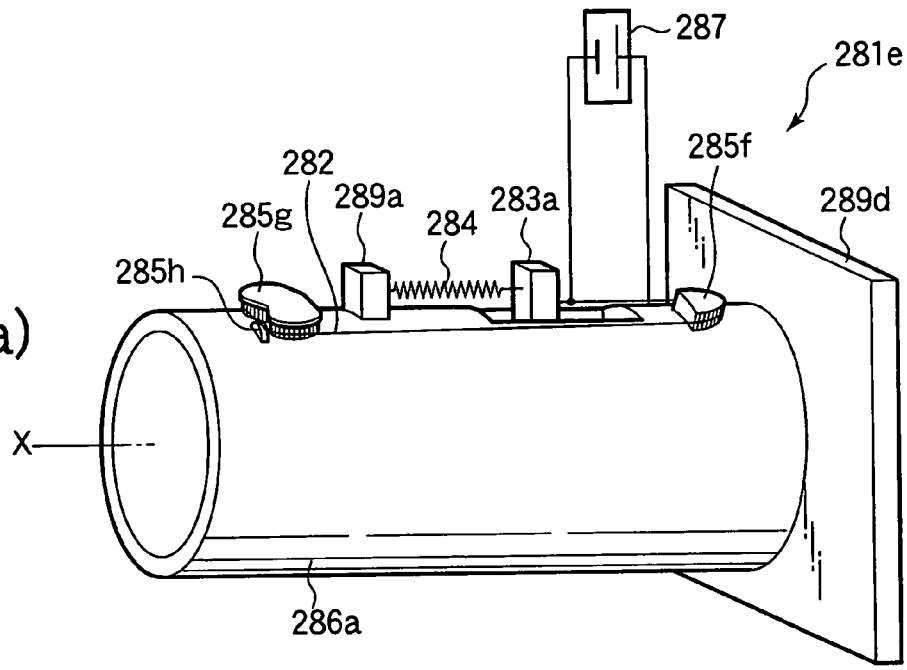
FIG. 63(a) is a perspective view showing still another configuration example of the driving device according to Embodiment 21 of the present invention.
Figure 63B:
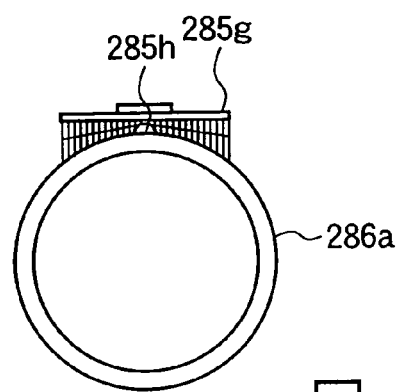
FIG. 63(b) is a front view thereof.
Figure 63C:
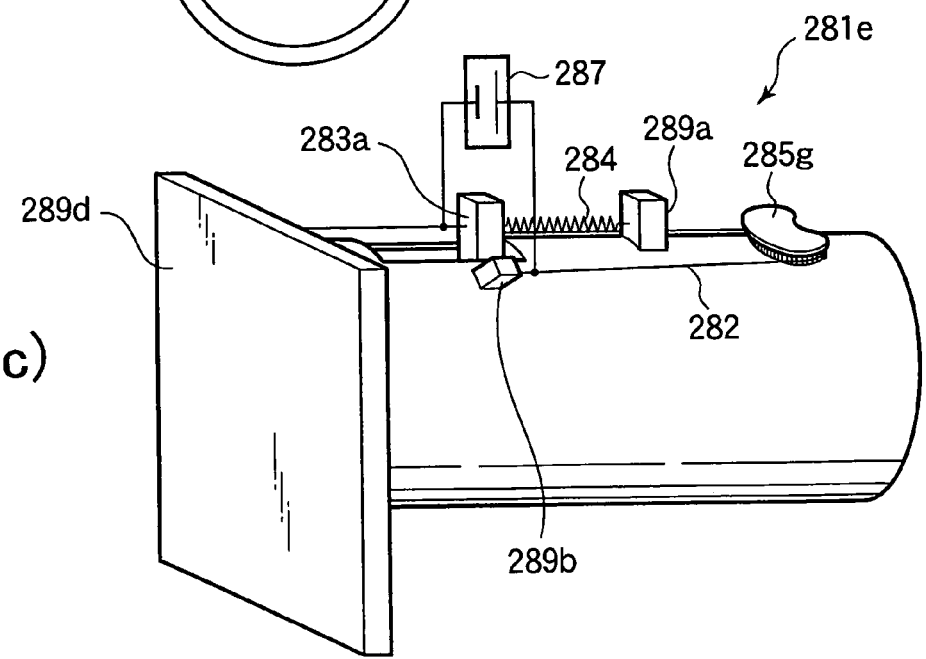
FIG. 63(c) is perspective view seen in the different direction.

FIGS. 63(a) and (b) are a perspective view and a front view showing a configuration example (referred to as a driving device 281e) in the case where the driving devices 41 and 151 of Embodiments 5 and 11 (FIGS. 12 and 26) is applied to the lens driving of the camera. FIG. 63(c) is another perspective view of the driving device 281e seen from the direction different from FIG. 63(a).

As shown in FIGS. 63(a) and (b), the driving device 281e has a bending member 285g formed in the vicinity of the front end of a barrel 286a, and a bending member 285f formed in the vicinity of the rear end of the barrel 286a. The lens frame 283a is disposed between the bending members 285g and 285f in the axial direction of the barrel 286a. A bending member 285h is formed on and projects from the circumferential surface of the barrel 286a, and is located on a further front position with respect to the bending member 285g. A number of minute convexes are formed on the circumferential surfaces of the bending members 285g, 285f and 285h, which contact the shape memory alloy member 282. On the circumferential surface of the barrel 286a, a fixing member 289b is disposed on a position shifted from the lens frame 283a in the circumferential direction of the barrel 286a. A fixing member 289a is provided between the lens frame 283a and the bending member 285g. A resilient member 284 is provided between the fixing member 289a and the lens frame 283a.

An end (fixed end) of the shape memory alloy member 282 is fixed to the fixing member 289b (FIG. 63(c)). The shape memory alloy member 282 is led frontward from the fixing member 289b in the axial direction of the barrel 286a. In the vicinity of the front end of the barrel 286a, the shape memory alloy member 282 is bend by the bending member 285g at about 180 degrees, and is led rearward almost in the axial direction of the barrel 286a. Moreover, the shape memory alloy member 282 is wound by the bending member 285f at about 180 degrees in the vicinity of the rear end of the barrel 286a, and is led frontward almost in the axial direction of the barrel 286a. The other end (movable end) of the shape memory alloy member 282 is fixed to the lens frame 283a. As shown in FIG. 63(b), where the shape memory alloy member 282 is wound around the bending member 285g at 180 degrees, the shape memory alloy member 282 also contacts the bending member 285h, so that the shape memory alloy member 282 does not contact the circumferential surface of the barrel 286a.

According to the driving device 286a, it is possible to dispose the shape memory alloy member 282 whose entire length is long (i.e., the amount of displacement of the movable end is large) around the barrel 286a without increasing the length of the barrel 286a of the camera. Moreover, because the shape memory alloy member 282 is wound around the bending member 285h, 285g, and 285f having minute convex portions on the outer sides thereof, it is possible to suppress the decrease in the amount of displacement.

In the above described Embodiment 12, it has been described that, if the bending member is in the form of a polygonal column, an almost triangular column (whose cross section is almost triangle) is preferable. However, if the bending member is not in the form of the polygonal column, the configuration in which the shape memory alloy member is wound around two bending members is advantageous in terms of reducing the contact ratio (to thereby suppress the decrease in the amount of displacement) while keeping the contact length between one bending member and the shape memory alloy member as was described in Embodiment 3. The above described driving device 281e is an example of such a configuration being applied to the lens driving.

Next, in order to facilitate the understanding of the effect of the driving device according to this embodiment, a configuration example in the case where a driving device in which a shape memory alloy member is linearly disposed is used for driving the lens in the camera will be described.

Figure 64A:
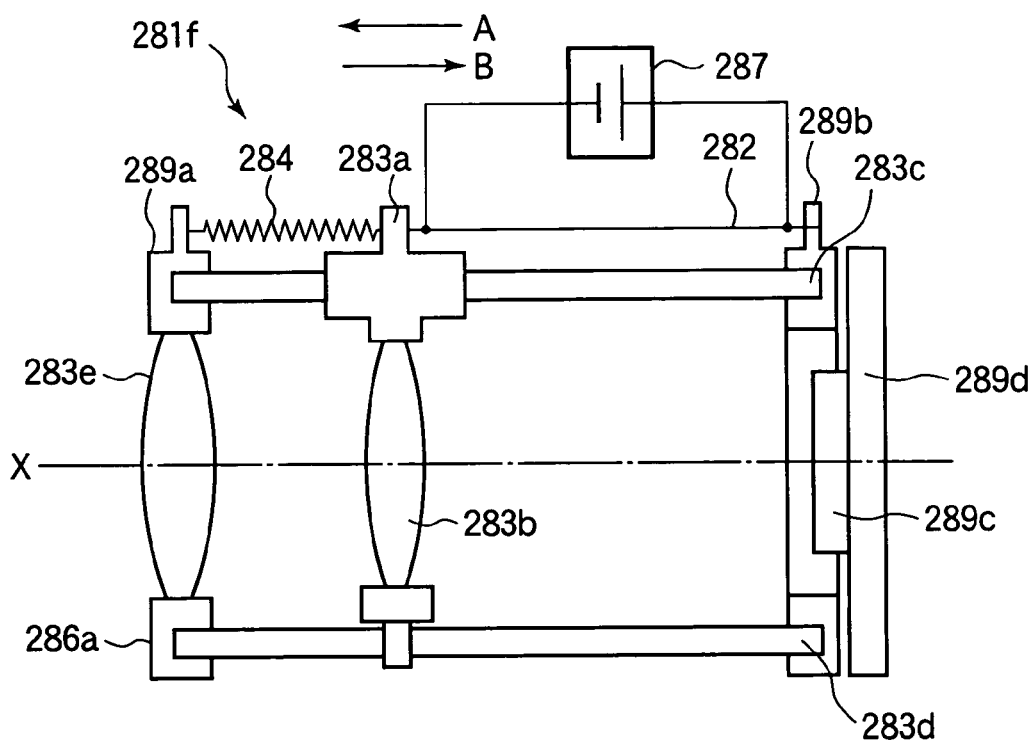
FIGS. 64(a) and 64(b) are a sectional view and a perspective view showing a configuration example in the case where the conventional driving device is applied to drive a lens of a camera, which is a comparative example with respect to Embodiment 21.
Figure 64B:
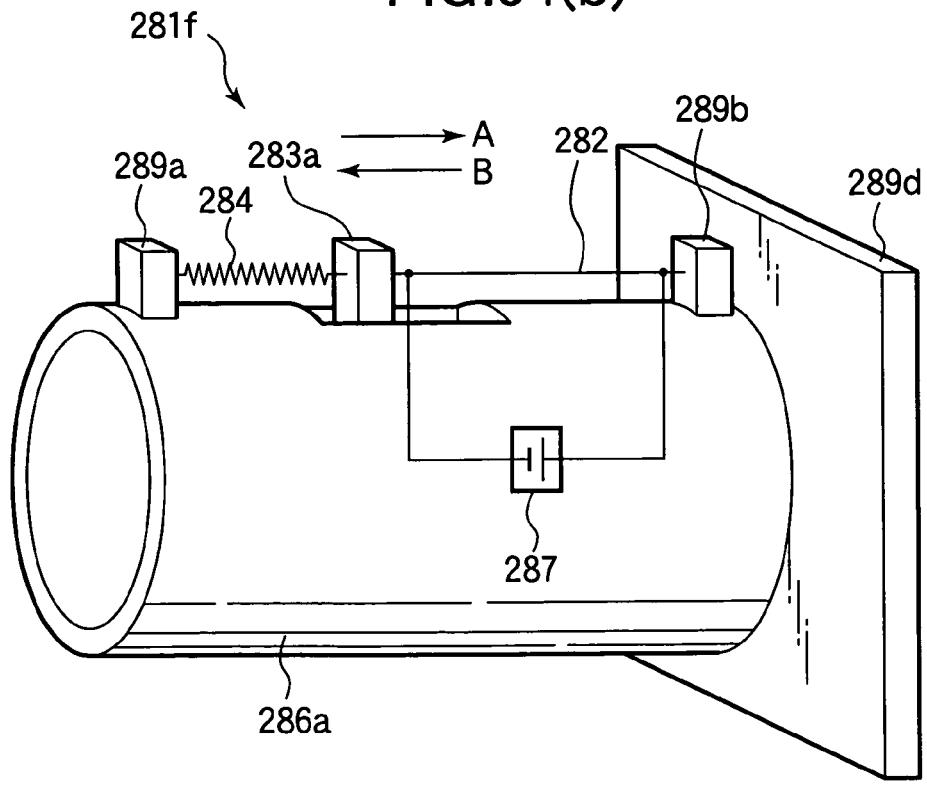

FIGS. 64(a) and (b) are a side sectional view and a perspective view showing the configuration example (referred to a driving device 281f) in the case where the driving device in which the shape memory alloy member 2 is linearly disposed is used for driving the lens of the camera. In this driving device 281f, an end (fixed end) of a shape memory alloy member 282 is fixed to a fixing member 289b provided in the vicinity of the rear end of the barrel 286a and the other end (movable end) of the shape memory alloy member 282 is fixed to a lens frame 283a. A fixing member 289a is provided in the vicinity of the front end of the barrel 286a, and a resilient member 284 is provided between the fixing member 289a and the lens frame 283a. An energizing circuit 287 is connected to both ends of the shape memory alloy member 282. However, in such a configuration, because the shape memory alloy member 282 is linearly disposed on the barrel 286a, only a shape memory alloy member 282 whose entire length is short can be provided in the camera whose length is short in the direction of the barrel 286a. Moreover, if the shape memory alloy member 282 whose entire length is short is provided, there is a problem that a sufficient driving distance of the lens 283b can not be obtained, since the amount of displacement of the shape memory alloy member 282 is about 3 through 5% with respect to the entire length of the shape memory alloy member 282.

In contrast, according to the driving device 281a (FIG. 61(a)) of this embodiment and the driving devices 281b through 281e (FIGS. 61(b) through 63(c)) of other example of this embodiment, the shape memory alloy member 282 whose entire length is long can be wound around the circumferential surface of the barrel 286a by means of the bending member 285 (or the bending members 285a through 285h). Therefore, even in a small-sized camera, there is an advantage that a sufficient driving length of the lens 283b is ensured by using the shape memory alloy member 282 whose entire length is long.

In the above described Embodiments 1 through 21, although the shape memory alloy member is heated and deformed by causing the direct current to flow through the shape memory alloy member, the embodiments are not limited to this. It is also possible to use an alternating current instead of the direct current. Moreover, it is possible to cause a pulse current to flow through the shape memory alloy member to heat the shape memory alloy member as disclosed in Japanese Laid-Open Patent Publication No. HEI 6-324740, and it is possible to use a heater to heat the shape memory alloy member as disclosed in Japanese Laid-Open Patent Publication No. HEI 6-32296. Furthermore, it is possible to use other components to heat the shape memory alloy member, as disclosed in Japanese Laid-Open Patent Publication No. HEI 5-224136. Further, it is possible to heat the shape memory alloy member by means of a change in environmental temperature, as disclosed in Japanese Laid-Open Patent Publication Nos. 2000-318698, HEI 5-118272, 2003-28337, HEI 7-14376 and HEI 8-179181.

Moreover, in a configuration in which the shape memory alloy member is bent by the bending member and is heated to obtain the amount of displacement, the decrease in the amount of displacement is large when the contacting part between the shape memory alloy member and the bending member is large, and the decrease in the amount of displacement is small when the contacting part between the shape memory alloy member and the bending member is small, as described above. This seems to be because, in the contacting part between the shape memory alloy member and the bending member, the heat is drawn from the shape memory alloy member via the bending member, so that the temperature increase of the shape memory alloy member is suppressed. With consideration given to this, it is effective to heat the shape memory alloy member by energizing in terms of obtaining a large amount of displacement. Moreover, in the case where the temperature increase of the bending member is slow (in the case where the heat of the shape memory alloy member does not tend to be drawn), it is also effective to heat the shape memory alloy member by means of the change in environmental temperature, an external heater and the like. In contrast, in a configuration that indirectly heats the shape memory alloy member by means of heat transfer by heating a member around which the shape memory alloy member is wound (for example, a configuration disclosed in Japanese Laid-Open Patent Publication No. HEI 5-224136), it is not possible to obtain a sufficient amount of displacement.

Besides the reduction of the contacting part between the shape memory alloy member and the bending member, it is also possible to suppress the decrease in the amount of displacement of the shape memory alloy member by using a material having a low coefficient of thermal conductivity as the bending member (or the contact portion contacting the shape memory alloy member).

Moreover, in the above described Embodiments 1 through 21, although a tension coil spring is used as a resilient member for urging the shape memory alloy member, the resilient member is not limited to this. It is also possible to use a compressive coil spring, a torsion coil spring, a plate spring, a rubber or the like. Furthermore, the resilient member is not limited to a conductive material such as metal. If a material other than the conductive material is used as the resilient member, and if the shape memory alloy member is heated by energizing, it is only necessary to energize between both ends of the shape memory alloy member. Furthermore, instead of using the resilient member, it is possible to employ various methods for urging the shape memory alloy member, for example, urging the movable body by means of gravity.

The invention claimed is:

1. A driving device comprising:
a bendable shape memory alloy member;
an urging member which applies a tension to said shape memory alloy member in a longitudinal direction thereof; and
a bending member which bends said shape memory alloy member, said bending member having a plurality of contact portions composed of convex portions formed integrally with said bending member,
wherein said contact portions contact said shape memory alloy member so that a tension is applied to said shape memory alloy member in a longitudinal direction thereof.

2. The driving device according to claim 1, wherein said bending member has a cross section of substantially polygonal shape.

3. The driving device according to claim 1, wherein said bending member is rotatable.

4. The driving device according to claim 1, wherein said bending member has a protrusion that further protrudes from said contact portion, and said shape memory alloy member is further bent by said projection.

5. A driving device comprising:
a bendable shape memory alloy member;
an urging member which applies a tension to said shape memory alloy member in a longitudinal direction thereof; and
a plurality of pin-shaped members disposed along a closed path,
wherein said pin-shaped members contact said shape memory alloy member so that a tension is applied to said shape memory alloy member in a longitudinal direction thereof.

6. A driving device comprising:
a bendable shape memory alloy member;
an urging member which applies a tension to said shape memory alloy member in a longitudinal direction thereof; and
a bending member which bends said shape memory alloy member, said bending member having a structural body and a plurality of projections formed integrally with said structural body,
wherein said projections contact said shape memory alloy member so that a tension is applied to said shape memory alloy member in a longitudinal direction thereof.

7. The driving device according to claim 6, wherein said projections have a plurality of convex portions on circumferential surfaces thereof, and a plurality of convex portions contact said shape memory alloy member.

8. The driving device according to claim 6, wherein said bending member further has a protrusion that protrudes from said structural body, and said shape memory alloy member is bent by contacting said protrusion.

9. A driving device comprising:
a bendable shape memory alloy member;
an urging member which applies a tension to said shape memory alloy member in a longitudinal direction thereof;
a bending member which bends said shape memory alloy member, said bending member having three or more contact portions contacting said shape memory alloy member; and
an energizing circuit for causing a current to flow through said shape memory alloy member,
wherein said contact portions contact said shape memory alloy member so that a tension is applied to said shape memory alloy member in the longitudinal direction thereof, and
wherein said energizing circuit causes a current to flow through said shape memory alloy member via two contact portions, among said three or more contact portions, respectively closest to both ends of said shape memory alloy member.

10. A driving device comprising:
a bendable shape memory alloy member;
an urging member which applies a tension to said shape memory alloy member is a longitudinal direction thereof;

a bending member which bends said shape memory alloy member, said bending member having three or more contact portions contacting said shape memory alloy member, wherein said contact portions contact said shape memory alloy member so that a tension is applied to said shape memory alloy member in the longitudinal direction thereof, and wherein said energizing circuit causes a current to flow through said shape memory alloy member via two contact portions adjacent to each other, among said three or more contact portions.

11. A driving device comprising:

a bendable shape memory alloy member;

an urging member which applies a tension to said shape memory alloy member in a longitudinal direction thereof;

a bending member which bends said shape memory alloy member, said bending member having a plurality of contact portions contacting said shape memory alloy member; and an energizing circuit for causing a current to flow through said shape memory alloy member, wherein said contact portions contact said shape memory alloy member so that a tension is applied to said shape memory alloy member in the longitudinal direction thereof; and wherein said energizing circuit cause a current to flow through said shape memory alloy member via said contact portions so that the current flowing through said shape memory alloy member differs according to a position in a longitudinal direction of said shape memory alloy member.

12. The driving device according to claim 9, wherein said contact portions are pin-shaped members.

13. The driving device according to claim 9, wherein said contact portions are conductive portions formed on a surface of a structural body made of insulation material.

14. The driving device according to claim 10, wherein said contact portions are pin-shaped members.

15. The driving device according to claim 10, wherein said contact portions are conductive portions formed on a surface of a structural body made of insulation material.

16. The driving device according to claim 11, wherein said contact portions are pin-shaped members.

17. The driving device according to claim 11, wherein said plurality of contact portions are conductive portions formed on a surface of a structural body made of insulation material.

* * * * *